(12) United States Patent
Arey

(10) Patent No.: US 12,346,937 B2
(45) Date of Patent: Jul. 1, 2025

(54) SYSTEM AND METHOD TO HELP ENABLE CREATION OF, DISTRIBUTION OF, AND/OR ACCESS TO CONTENT

(71) Applicant: Scott Shiao Arey, Dallas, TX (US)

(72) Inventor: Scott Shiao Arey, Dallas, TX (US)

(*) Notice: Subject to any disclaimer, the term of this patent is extended or adjusted under 35 U.S.C. 154(b) by 17 days.

(21) Appl. No.: 18/140,076

(22) Filed: Apr. 27, 2023

(65) Prior Publication Data

US 2024/0086974 A1    Mar. 14, 2024

Related U.S. Application Data

(60) Provisional application No. 63/335,352, filed on Apr. 27, 2022.

(51) Int. Cl.
| | |
|---|---|
| *G06Q 30/00* | (2023.01) |
| *G06K 7/10* | (2006.01) |
| *G06Q 30/0241* | (2023.01) |
| *G06Q 30/0251* | (2023.01) |

(52) U.S. Cl.
CPC ..... *G06Q 30/0276* (2013.01); *G06K 7/10297* (2013.01); *G06Q 30/0267* (2013.01)

(58) Field of Classification Search
None
See application file for complete search history.

(56) References Cited

U.S. PATENT DOCUMENTS

| | | | | |
|---|---|---|---|---|
| 5,493,105 A * | 2/1996 | Desai | ..................... | G06K 13/08 |
| | | | | 235/375 |
| 5,640,565 A * | 6/1997 | Dickinson | .............. | G06Q 10/10 |
| 7,232,073 B1 * | 6/2007 | de Jong | .................. | G06F 9/445 |
| | | | | 235/382 |
| 9,324,079 B2 * | 4/2016 | Moulin | .................. | G06Q 30/00 |
| 11,361,310 B1 * | 6/2022 | Tuscano | ................ | G06Q 20/02 |
| 2007/0207780 A1 * | 9/2007 | McLean | ................ | G06Q 30/02 |
| | | | | 455/414.1 |

(Continued)

FOREIGN PATENT DOCUMENTS

EP    2341699 A1 *    7/2011    ......... G06Q 20/3278

OTHER PUBLICATIONS https://www.youtube.com/watch?v=SIBbu55pAbU—How to program NFC Business Cards—Digital business card w/ NFC tools—That Drone Guy TY—Dec. 18, 2020 (Year: 2020).*

(Continued)

*Primary Examiner* — Christopher Stroud

(57) ABSTRACT

Particular embodiments described herein provide for a system to help enable the creation of, distribution of, and/or access to content. The system can save created content on an electronic device, create a content identifier associated with the content, write the content identifier to a content distribution card, and send the content and content identifier associated with the content to a network element. When the content distribution card is brought near a content consumer's user's device, the content consumer's user device can read the content identifier from the content distribution card, communicate the content identifier to the network element, and receive the content associated with the content identifier. In some examples, the content distribution card is a promotional card for a musician and the content is a sample of the musician's work

20 Claims, 39 Drawing Sheets

(56) References Cited

U.S. PATENT DOCUMENTS

| | | | |
|---|---|---|---|
| 2008/0209205 A1* | 8/2008 | Rowley | H04L 9/321 |
| | | | 713/153 |
| 2009/0006211 A1* | 1/2009 | Perry | G06Q 30/0269 |
| | | | 705/14.66 |
| 2011/0093316 A1* | 4/2011 | Baker | G06Q 30/02 |
| | | | 705/14.4 |
| 2011/0197057 A1* | 8/2011 | Koch | G06F 21/1014 |
| | | | 713/150 |
| 2014/0162596 A1* | 6/2014 | Adchan | G06Q 20/341 |
| | | | 455/406 |
| 2016/0188547 A1* | 6/2016 | Cruzada | G06F 40/186 |
| | | | 715/749 |
| 2018/0341936 A1* | 11/2018 | Manansingh | G06F 13/4081 |
| 2019/0172055 A1* | 6/2019 | Hale | G06K 19/06187 |
| 2021/0012301 A1* | 1/2021 | Manansingh | G06K 19/07732 |
| 2021/0342664 A1* | 11/2021 | Balgañón Canela | |
| | | | H04W 12/069 |

OTHER PUBLICATIONS https://web.archive.org/web/20210617172343/https://developer.apple.com/documentation/xcode/allowing-apps-and-websites-to-link-to-your-content/—Allowing Apps and Websites to Link to Your Content—2021 (Year: 2021).*

* cited by examiner

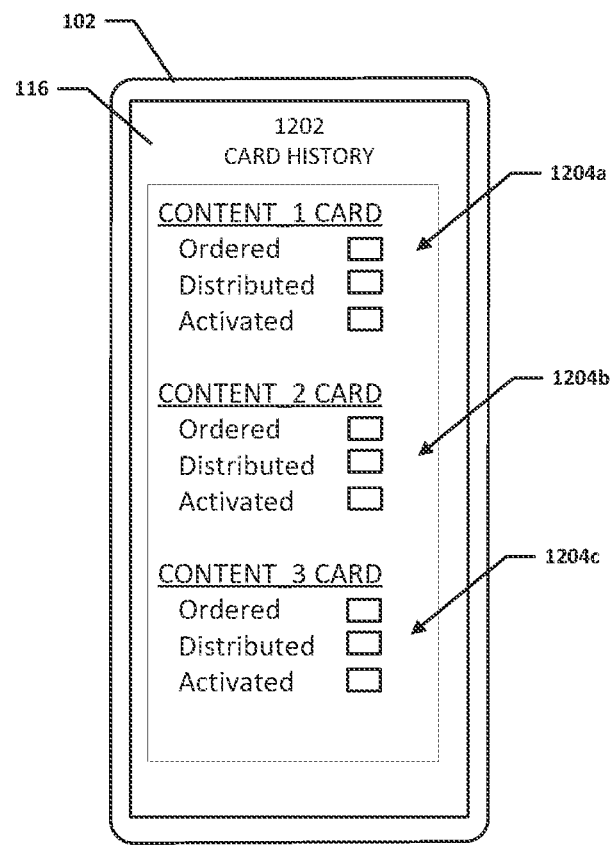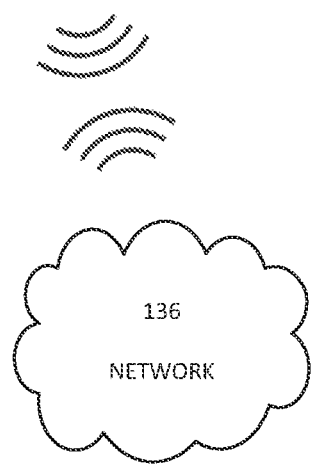
FIGURE 12

140
NETWORK CONTENT DATABASE

| 1602 CONTENT ID | 1604 LOCATION OF CONTENT | 1606 OWNER | 1608 RULES | 1610 ACCESS COUNT | 1612 LICENSED USERS |
|---|---|---|---|---|---|
| ID-1 | Location_1 | Owner_1 | Rule_1, Rule_2 | #### | #### |
| ID-2 | Location_2 | Owner_2 | Rule_1 | #### | #### |
| ID-3 | Location_3 | Owner_1 | Rule_3 | #### | #### |
| ID-4 | Location_4 | Owner_1 | Rule_1, Rule_3 | #### | #### |
| ID-5 | Location_5 | Owner_4 | Rule_4 | #### | #### |
| ID-6 | Location_6 | Owner_2 | Rule_1, Rule_5 | #### | #### |
| ID-7 | Location_7 | Owner_5 | Rule_2 | #### | #### |

FIGURE 16

| 138 NETWORK USER DATABASE | | | | |
|---|---|---|---|---|
| 1702 USER ID | 1704 DEVICE ID | 1706 CONTENT OWNED | 1708 CONTENT ACCESS FREQUENCY | 1710 LAST CONTENT ACCESS DATE |
| User_1 ID | Device_1 ID | Content_1<br>Content_2 | Content_1 - 2<br>Content_2 - 6 | Content_1 - DATE<br>Content_2 - DATE |
| User_2 ID | Device_2 ID<br>Device_3 ID | Content_2<br>Content_3<br>Content_4 | Content_2 - 2<br>Content_3 - 6<br>Content_4 - 7 | Content_2 - DATE<br>Content_3 - DATE<br>Content_4 - DATE |
| User_3 ID | Device_4 ID | Content_1<br>Content_3<br>Content_4 | Content_1 - 2<br>Content_3 - 6<br>Content_4 - 7 | Content_1 - DATE<br>Content_3 - DATE<br>Content_4 - DATE |
| User_4 ID | Device_5 ID | Content_2<br>Content_5 | Content_2 - 2<br>Content_5 - 7 | Content_2 - DATE<br>Content_5 - DATE |
| User_5 ID | Device_6 ID<br>Device_7 ID | Content_1<br>Content_6 | Content_1 - 2<br>Content_6 - 7 | Content_1 - DATE<br>Content_6 - DATE |
| User_6 ID | Device_8 ID | Content_1<br>Content_4<br>Content_5 | Content_1 - 2<br>Content_4 - 6<br>Content_5 - 7 | Content_1 - DATE<br>Content_4 - DATE<br>Content_5 - DATE |
| User_7 ID | Device_9 ID | Content_2<br>Content_3<br>Content_6 | Content_2 - 2<br>Content_3 - 6<br>Content_6 - 7 | Content_2 - DATE<br>Content_3 - DATE<br>Content_6 - DATE |

FIGURE 17

SYSTEM AND METHOD TO HELP ENABLE CREATION OF, DISTRIBUTION OF, AND/OR ACCESS TO CONTENT

CROSS-REFERENCE TO RELATED APPLICATIONS

This disclosure relates to Provisional Application No. 63,335,352, entitled "DIGITAL KEY SECURITY DEVICE" filed in the United Stated Patent and Trademark Office on Apr. 27, 2022, which is hereby incorporated by reference in its entirety.

TECHNICAL FIELD

This disclosure relates in general to the field of computing, and more particularly, to a content creator system to help enable the creation of, distribution of, and/or access to content.

BACKGROUND

The creation of, distribution of, and/or access to content can be difficult to manage, especially for local artists and in particular for local musical artists. Singers, musicians and songwriters can spend weeks producing a single song and they should receive a fair amount of compensation for their hard work and the value they add to society. However, most musical artists are getting underpaid due to a variety of reasons. Some of the reasons include copyright infringement, streaming services, labels taking advantage of their work, and the inability to reach potential fans or customers who may purchase their music.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 12 is a simplified block diagram of a portion of a system to help enable the creation of, distribution of, and/or access to content, in accordance with an embodiment of the present disclosure;

FIG. 16 is a simplified block diagram illustrating examples details of a portion of a system to help enable the creation of, distribution of, and/or access to content, in accordance with an embodiment of the present disclosure;

FIG. 17 is a simplified block diagram illustrating example details of a portion of a system to help enable the creation of, distribution of, and/or access to content, in accordance with an embodiment of the present disclosure;

Figure 1:
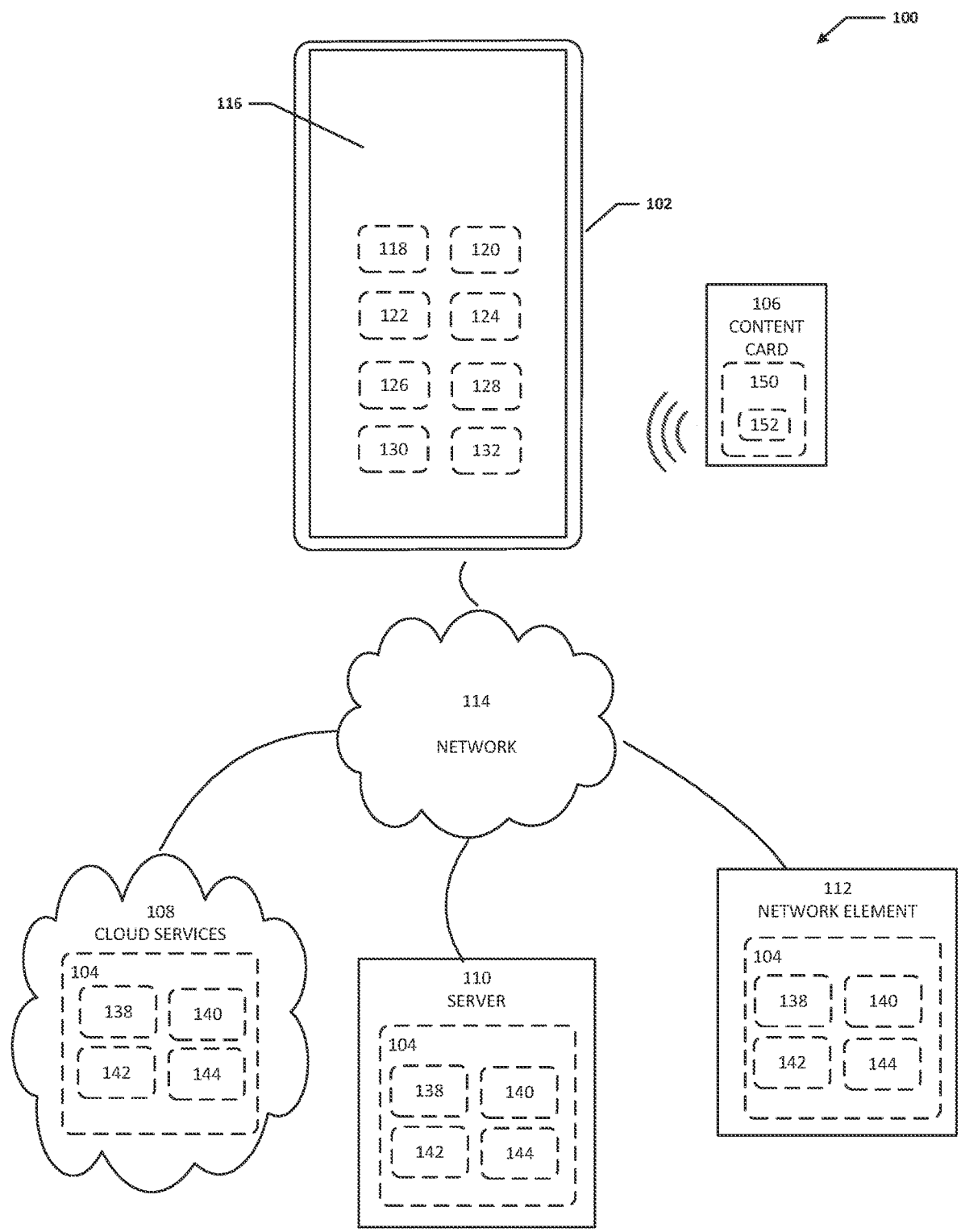
FIG. 1 is a simplified block diagram of a system to help enable the creation of, distribution of, and/or access to content, in accordance with an embodiment of the present disclosure.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling a content creator system to help enable the creation of, distribution of, and/or access to content, in accordance with an embodiment of the present disclosure. The term "content" includes a digital representation of music, art, sounds, videos, writings, tickets, or other substantive information or creative material that can be perceived. Note that all the content references herein are intended as examples only and other pieces or types of content may be used. Also, where applicable, the content referenced herein is intended to represent an authorized licensed copy of the content (note that content that is in the public domain does not require a copyright license). The application is not intended to support unlicensed use of content, unauthorized use of content, or illegal user activity related to the content.

Overview

In an example, a system to help enable the creation of, distribution of, and/or access to content can include a content distribution card. The content distribution card can include a content identifier. The content identifier can be used to access content associated with the content distribution card. An electronic device can include a reader that reads the content identifier on the content distribution card. After the electronic device has obtained the content identifier from the content distribution card, the content identifier is sent to a network content creation and distribution system located in cloud services, a server, or one or more network elements. Note that the term "network element" includes cloud services and/or one or more servers. The network content creation and distribution system uses the content identifier to search a network content database and determine the location of the content associated with the content identifier. The cloud services, the server, or the one or more network elements that received the content identifier from the electronic device then sends the content associated with the content identifier to the electronic device where the content is presented to the content consumer user. For example, if the content is music, the music can be played through speakers on the electronic device.

The system can also include a content creator application to allow a user to view content they have created, view any events they have scheduled, enter a marketplace where the user can trade, buy, or sell goods and services, and where the user can manage content distribution cards. For example, if the user is a musician, the content creator home page interface can allow the content creator user to view songs and albums they have created, view any concerts or events they have scheduled, enter a marketplace where the user can trade, buy, or sell goods and services, and where the user can manage content distribution cards (e.g., the content distribution card 106) that include their music.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus twenty percent (±20%) variation.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one example" or "an example" in the present disclosure means that a particular feature, structure, or characteristic described in connection with the embodiment is included in at least one example or embodiment. The appearances of the phrase "in one example" or "in an example" are not necessarily all referring to the same examples or embodiments.

FIG. 1A is a simplified block diagram of a system 100 configured to help enable the creation of, distribution of, and/or access to content, in accordance with an embodiment of the present disclosure. In an illustrative example, the system 100 can include an electronic device 102 and a network content creation and distribution system 104. In some examples, the system 100 can also include a content distribution card 106. The network content creation and distribution system 104 can be located in cloud services 108, a server 110, and/or one or more network elements 112. The electronic device 102 can be in communication with the cloud services 108, the server 110, and/or the one or more network elements 112 using a network 114. Note that the one or more network element 112 can include cloud services and/or one or more servers.

The electronic device 102 can include a display 116, memory 118, one or more processors 120, speakers 122, a communication engine 124, a display engine 126, a content database 128, a content distribution card initialization engine 130, and a content distribution card reader engine 134. One or more of the cloud services 108, the server 110, and/or the one or more network elements 112 can include the network content creation and distribution system 104. The network content creation and distribution system 104 can include a network user database 138, network content database 140, and a network marketplace engine 142. In some examples, one or more of the cloud services 108, the server 110, and/or the network element 112 can include a blockchain engine 144.

The content distribution card 106 can include a short-ranged communication module 150. In some examples, the short-ranged communication module 150 can include a content identifier 152. The short-ranged communication module 150 can be a near field communication (NFC) module, a radio frequency identification (RFID) module, or some other type of short ranged communication module that can be blank or without the content identifier 152 and then used to store the content identifier 152 (e.g., the content distribution card initialization engine 130 can write the content identifier 152 to the content distribution card 106 as described below). In some examples, the short-ranged communication module 150 may be a quick response code (QR code), a bar code, or some other type of symbol, letters, numbers, etc. imprinted onto the content distribution card 106. The content distribution card 106 does not include a power source (e.g., a battery) and can be plastic, pressed paper, or some other rigid or semi-rigid material. In some examples, the dimensions of the content distribution card 106 can be similar to a gift card or a credit card. For example, the content distribution card 106 can have a width of about 3.37 inches and height of about 2.125 inches. In some examples, the content distribution card 106 can have a width between about two (2) inches and about ten (10) inches and ranges therein (e.g., between about 3.5 inches and about five (5) inches or between about five (5) inches and about 7.25 inches), depending on design choice and design constraints. In addition, the content distribution card 106 can have a length between about two (2) inches and about ten (10) inches and ranges therein (e.g., between about 5.75 inches and about eight (8) inches or between about four (4) inches and about 5.5 inches), depending on design choice and design constraints.

The display 116 can display an image, an animation, a video, or any other visual content to a user and may be any of a variety of types of display devices, including without limitation, a touchscreen display, an LCD display, a plasma display, an LED display, an OLED display, a projector, etc. The display engine 126 can be located on a system on chip (SoC) and be configured to help display an image, an animation, a video, or any other visual content on the display 116.

The speakers 122 can produce audio output that can be heard by a listener. More specifically, the speakers 122 can be transducers that convert electromagnetic waves into sound waves. The speakers 122 receive audio input in either an analog or a digital form. Analog speakers simply amplify the analog electromagnetic waves into sound waves. Since sound waves are produced in analog form, digital speakers must first convert the digital input to an analog signal, then generate the sound waves. The communication engine 124 can help facilitate communications, wired or wireless, between the electronic device 102 and the content distribution card 106 and between the electronic device 102 and the network 114. For example, the communication engine 124 can help facilitate writing the content identifier 152 to the content distribution card 106 and can read the content identifier 152 from the content distribution card 106.

The content database 128 can store content on the electronic device 102. The content distribution card initialization engine 130 can be used to help determine what content will be accessed by a content consumer user of the content distribution card 106, create the content identifier 152, and use the communication engine 124 to write the content identifier 152 to the content distribution card 106. In some examples, the content distribution card initialization engine 130 does not generate the content identifier 152. Instead, the content distribution card initialization engine 130 communicates (using the communication engine 124) with the network content creation and distribution system 104 and requests the content identifier 152 from the network content creation and distribution system 104.

The content distribution card reader engine 134 can read, request, or otherwise determine the content identifier 152 from the content distribution card 106. In some examples, the content distribution card reader engine 134 is an NFC or RFID reader. In other examples, the content distribution card reader engine 134 is a scanner that scans or reads the QR code, bar code, or some other type of symbol, letters, numbers, etc. imprinted onto the content distribution card 106 and determines the content identifier 152.

The network content creation and distribution system 104 located in one or more of the cloud services 108, the server 110, and/or the one or more network elements 112 can include the network user database 138, the network content database 140, the network marketplace engine 142, and in some examples, the blockchain engine 144. The network user database 138 can include data related to a user of the system 100 including identity, credentials, personal settings, and profile information, as well as information about a user's electronic device (e.g., the electronic device 102). The network content database 140 can include specific data related to a unique content identifier (e.g., the location of the content associated with the unique content ID, an owner of content associated with the unique content ID, one or more rules related to access of the content associated with the unique content ID, etc.). In some examples, the network content database 140 includes the content that has been uploaded by users of the system 100. In other examples, the content is stored in memory of the cloud services 108, the server 110, and/or the one or more network elements 112 or some other location. The network marketplace engine 142 can help facilitate the buying and selling of goods and services. In some examples, the content and user data are stored in a blockchain. The blockchain engine 144 can help manage the blockchain including adding new blocks to the blockchain, validating the blocks in the blockchain, and controlling access to the content and user data stored in a blockchain. In some examples, at least a portion of the functionality of the electronic device 102 as related to the creation of, distribution of, and/or access to content (e.g., content distribution card initialization engine 130) can be performed by the network content creation and distribution system 104 (e.g., as a web-based type application).

Figure 2:
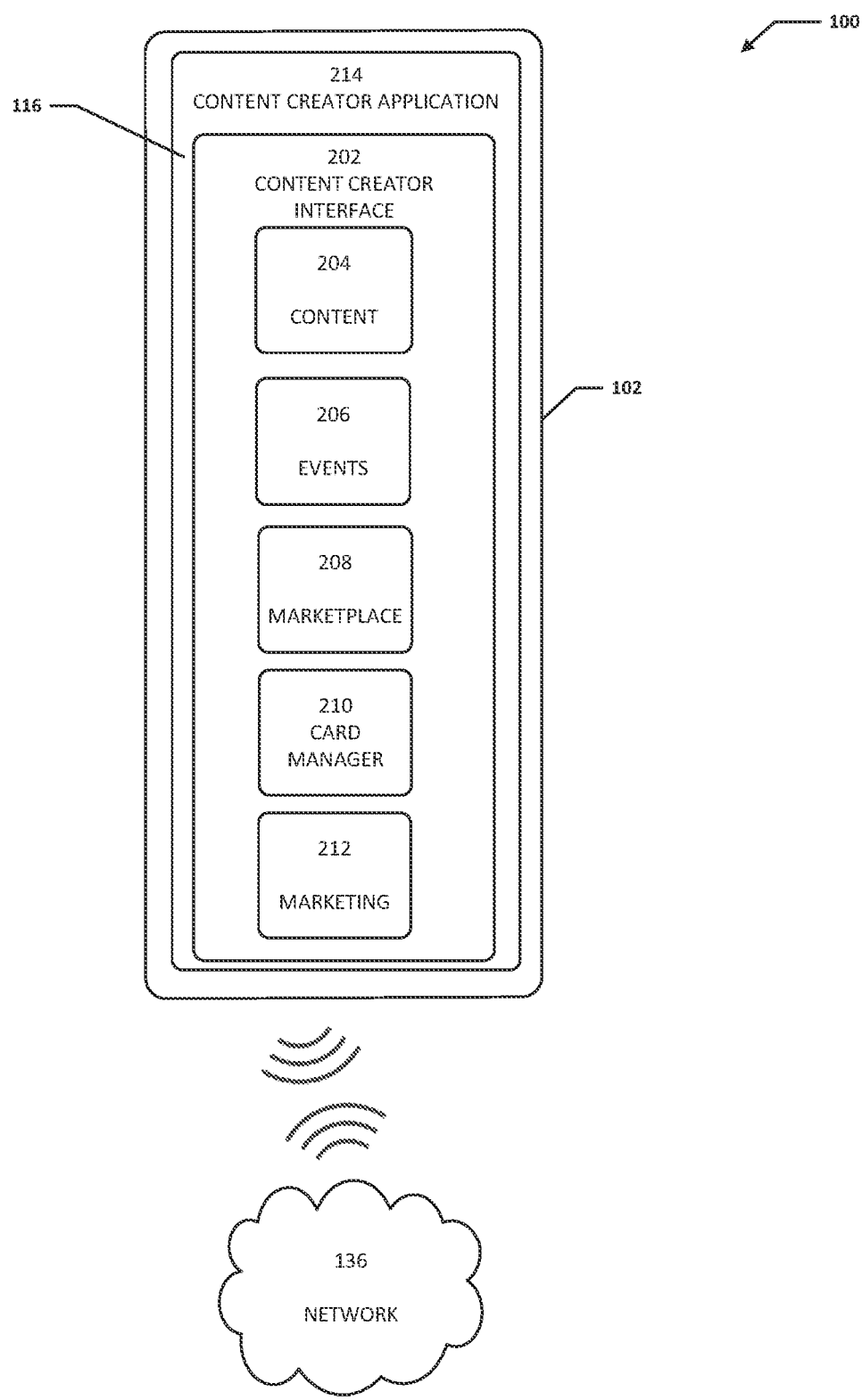
FIG. 2 is a simplified block diagram of a portion of a system to help enable the creation of, distribution of, and/or access to content, in accordance with an embodiment of the present disclosure.

In an illustrated example of a content creator user using the system, the content creator user logs onto the system (e.g., the system 100) using an electronic device (e.g., the electronic device 102) and accesses a content creator home page interface (e.g., the content creator interface page 202 illustrated in FIG. 2). The content creator home page interface can allow the content creator user to view content they have created, view any events they have scheduled, enter a marketplace where the content creator user can trade, buy, or sell goods and services, and where the content creator user can manage content distribution cards (e.g., the content distribution card 106). For example, if the content creator user is a musician, the content creator home page interface can allow the content creator user to view songs and albums they have created, view any concerts or events they have scheduled, enter a marketplace where the content creator user can trade, buy, or sell goods and services, and where the content creator user can manage content distribution cards (e.g., the content distribution card 106) that include their music.

It is to be understood that other embodiments may be utilized and structural changes may be made without departing from the scope of the present disclosure. Substantial flexibility is provided by an electronic device in that any suitable arrangements and configuration may be provided without departing from the teachings of the present disclosure.

For purposes of illustrating certain example techniques of the system 100, the following foundational information may be viewed as a basis from which the present disclosure may be properly explained.

Foundational Information

Beginning in 1903, phonograph records (that is an analog sound storage medium in the form of a flat disc with an inscribed, modulated spiral groove) were available for purchase by the general public as a medium through which to own the recording of a musical content and artwork. Much like lithograph or a printed book, the artist was compensated based on the number of physical copies sold. Contracts for musical artists today still specify by law the "mechanical royalties" they should receive based on physical copies of their work produced and sold. In 1965, 8-track tapes were introduced by the Ford Motor Company™ into three models of vehicles as way to play music in vehicles. This gave the public a method of owning music that could be play in their vehicle in addition to a record, which was confined to home use. In the early 1970's, compact cassette tapes (also called music cassettes or cassette tapes) of recorded music began replacing 8-track tapes in vehicles. Beginning in 1982, compact discs (CDs) began to replace both records and cassette tapes as the primary sound storage medium through which the general public could possess the recording of a musical artwork. Compact discs had the advantage of much greater durability and fidelity than either records or cassettes with an expected 30-year-plus lifespan. For more than 100 years, the general public has been able to possess a musical artwork and replay it at their convenience. For popular music, a consumer's purchase and ownership most often included song lyrics or other supporting printed artwork that was an important part of the product and the consumer's possession of it.

The advance of technologies like the smartphone have decimated the market for records, cassettes, and compact discs. Most new vehicles sold today do not even have an option for a cassette or compact disc player. The dominant market force is "streaming services." Currently, the dominant players in this market in the U.S. are SPOTIFY™, AMAZON MUSIC™, APPLE MUSIC™, PANDORA™, GOOGLEPLAY™, and YOUTUBE MUSIC™. Streaming accounts for more than 90% of the total digital music for recorded music. None of these market participants offer a reasonable ability for the general public to possess the artwork with the same reliability or convenience that was standard in the 100 years before they dominated the music market.

An important part of possession of content is the ability to show others ownership of the content. Pride of ownership or possession is fundamental to the owner's concept of his or her own identity. Prior to the advent of streaming, music artwork collectors would routinely display their collections in their homes. Part of the experience of owning or possessing these artworks was that ability to display and easily play records for friends, acquaintances, and guests in their homes. Owners of music could even lend or gift said musical artworks on request. Streaming services provide great convenience to their subscribers, but have none of the attributes of possession or ownership.

In addition, streaming services of today trade convenience for true control of the music content. With a record, cassette, or CD, the owner could pick up the item they owned and play it on any third-party device. Streaming services typically charge a monthly subscription, allowing the listener to play the music content at the convenience of the service. However, the listener has no ownership rights to the music.

To find the music content a listener wants to play, the listener has to execute a search on the services platform. Musical artists can only make their musical content available on the service if the musical artist themselves pay a fee for placement to the service. The service pays little or nothing to the musical artist. The musical artist has no ability to engage in a commercial transaction directly with the general public to sell control of the music or music artwork to a music listener or an end user. What is needed is a system, method, apparatus, etc. to help enable the creation of, distribution of, and/or access to content.

A system and method to help enable the creation of, distribution of, and/or access to content can resolve these issues (and others). In an example, the system includes a content distribution card, an electronic device, and a network content creation and distribution system. The electronic device can include a content database, a content distribution card initialization engine, and a content distribution card reader engine. The content database can store content on the electronic device. The content distribution card initialization engine can be used to help determine what content will be accessed by content consumer user or an end user of a content distribution card, create a content identifier, and write the content identifier to the content distribution card. In some examples, the content distribution card initialization engine does not generate the content identifier. Instead, the content distribution card initialization engine communicates with a network content creation and distribution system (e.g., the network content creation and distribution system 104) and requests the content identifier from the network content creation and distribution system. The network content creation and distribution system can be located in one or more of cloud services, a server, and/or one or more network elements. The network content creation and distribution system can include a network user database, network content database, and a network marketplace engine, and in some examples, the blockchain engine. The network user database can include data related to a user of the system including identity, credentials, personal settings, and profile information, as well as information about a user's electronic device. In some examples, the network content database includes the content that has been uploaded by users of the system. In other examples, the content is stored in memory of the cloud services, the server, and/or the one or more network elements or some other location. The network marketplace engine can help facilitate the buying and selling of goods and services. In some examples, the content and user data are stored in a blockchain. The blockchain engine can help manage the blockchain including adding new blocks to the blockchain, validating the blocks in the blockchain, and/or controlling access to the content and user data stored in a blockchain After the content distribution card has been initialized, the content distribution card includes a content identifier. The content identifier can be used to access content associated with the content distribution card. A content consumer's electronic device can include a reader that reads the content identifier on the content distribution card. After the content consumer's electronic device has obtained the content identifier from the content distribution card, the content identifier is sent to the network content creation and distribution system located in cloud services, the server, or one or more network elements. The network content creation and distribution system uses the content identifier to search a network content database and determine the location of the content associated with the content identifier. The cloud services, the server, or the one or more network elements that received the content identifier from the electronic device then sends the content associated with the content identifier to the content consumer's electronic device where the content is presented to the content consumer user. For example, if the content is music, the music can be played through speakers on the electronic device.

In a specific example, the content distribution card can include a short-ranged communication module. In some examples, the short-ranged communication module can include a content identifier. The short-ranged communication module can be a near field communication (NFC) module, a radio frequency identification (RFID) module, or some other type of short ranged communication module that can be blank or without the content identifier and then used to store the content identifier. In some examples, the short-ranged communication module may be a quick response code (QR code), a bar code, or some other type of symbol, letters, numbers, etc. imprinted onto the content distribution card. Content creators can use the content distribution card to help them engage in a commercial transaction directly with the content consumer to sell the content to the content consumer to help enable the creation of, distribution of, and/or access to content. For example, local musicians and artists, can use the content distribution card to help them engage in a commercial transaction directly with the content consumer to sell their music or music artwork.

In an example implementation, the electronic device 102 is meant to encompass an electronic device that includes a display, especially a smart phone, wearable, hand held device, computer, laptop, electronic notebook, network elements that have a display, or any other device, component, element, or object that has a display and can be used to store content and write the content identifier to a content distribution card and/or can be used to present content to a content consumer or allow a content consumer access to the content (e.g., a ticket booth or entry gate). The electronic device 102 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. The electronic device 102 may include virtual elements.

In regards to the internal structure associated with the electronic device 102, the electronic device 102 can include memory elements (e.g., memory 118) for storing information to be used in the operations outlined herein. The electronic device 102 may keep information in any suitable memory element (e.g., hard disk, hard drive, volatile memory, non-volatile memory, random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in the electronic device 102 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of the electronic device 102 may include software modules (e.g., the communication engine 124, the display engine 126, the content distribution card initialization engine 130, the content distribution card reader engine 134, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality the network content (e.g., the creation and distribution system 104 and the network marketplace engine 142, etc.). Furthermore, the modules can be implemented as software, hardware, firmware, or any suitable combination thereof. These elements may also include software (or reciprocating software) that can coordinate with other network elements in order to achieve the operations, as outlined herein.

Additionally, the electronic device 102 may include one or more processors that can execute software, logic, or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

The electronic device 102 may be a standalone device or in communication with the cloud services 108, the server 110 and/or the one or more network elements 112 using the network 114. The network 114 represents a series of points or nodes of interconnected communication paths for receiving and transmitting packets of information. The network 114 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the network 114, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

Turning to FIG. 2, FIG. 2 is a simplified block diagram of a portion of the system 100 configured to enable the creation of, distribution of, and/or access to content, in accordance with an embodiment of the present disclosure. As illustrated in FIG. 2, a content creator interface page 202 can be displayed on the display. In some examples, the content creator interface page 202 can be considered a home page of a content creator application 214 for a content creator user. The content creator interface page 202 can include icons or links to specific pages or sections of the content creator application 214. The content creator interface page 202 can also include other page links such as a setting page link, a logout page link, other auxiliary page links, etc. The content creator application 214 can be a part of a content creator/consumer application (e.g., the content creator/consumer application 1902 illustrated in FIG. 19). In some examples, the content creator application 214 is a web-based application accessed using the network 136.

It should be noted that the system may include a login page (not shown) to verify the content creator user and allow the content creator user to access the content creator interface page 202. For example, the login page can be configured to authenticate the content creator user and allow the content creator user to access the content creator interface page 202. The login process can use biometric authentication, alphanumeric authentication, and/or some other type of authentication that can be used to verify the identity of the content creator user. Once the identity of the content creator user is verified, the content creator user can be allowed to access the content creator interface page 202. In some examples, the system does not include a login page. For example, the system may not require a login or the system may use the electronic device's user authentication system. More specifically, if the content creator user is using the electronic device, the system can determine that the content creator user has already been authenticated by the content creator user device.

Figure 3:
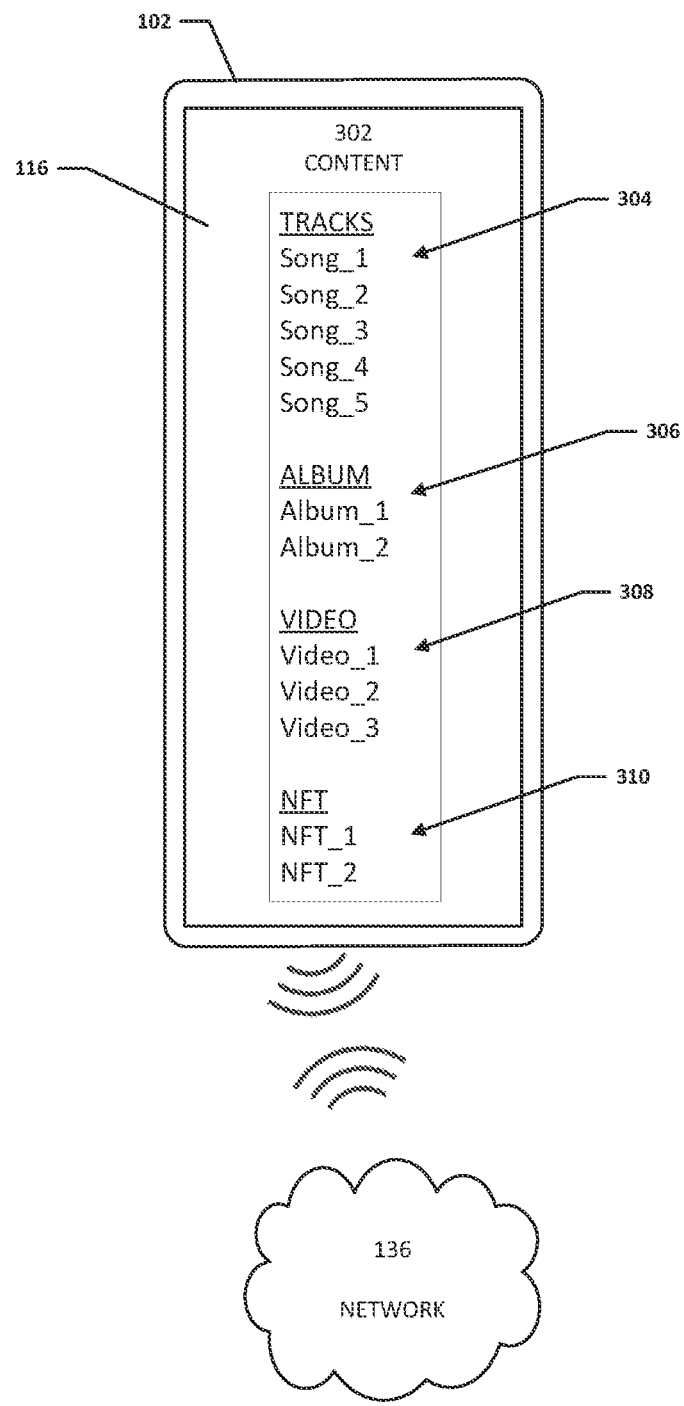
FIG. 3 is a simplified block diagram of a portion of a system to help enable the creation of, distribution of, and/or access to content, in accordance with an embodiment of the present disclosure.
Figure 4:
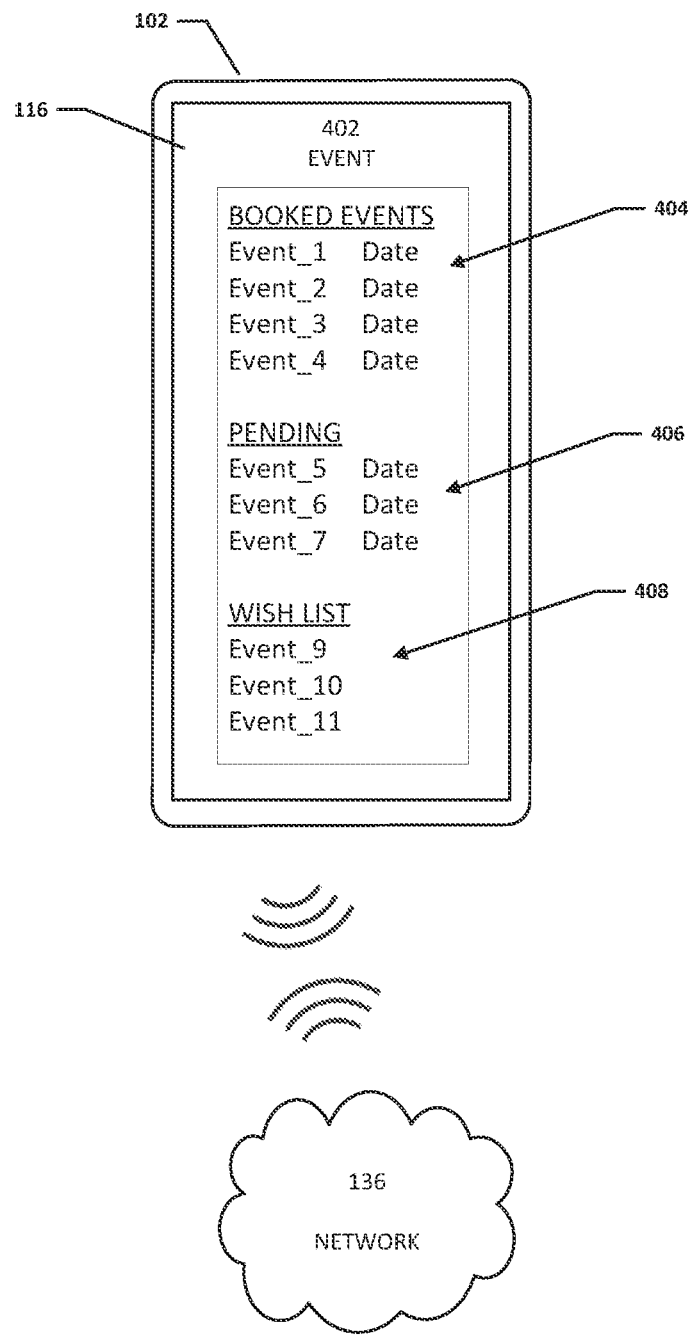
FIG. 4 is a simplified block diagram of a portion of a system to help enable the creation of, distribution of, and/or access to content, in accordance with an embodiment of the present disclosure.
Figure 5:
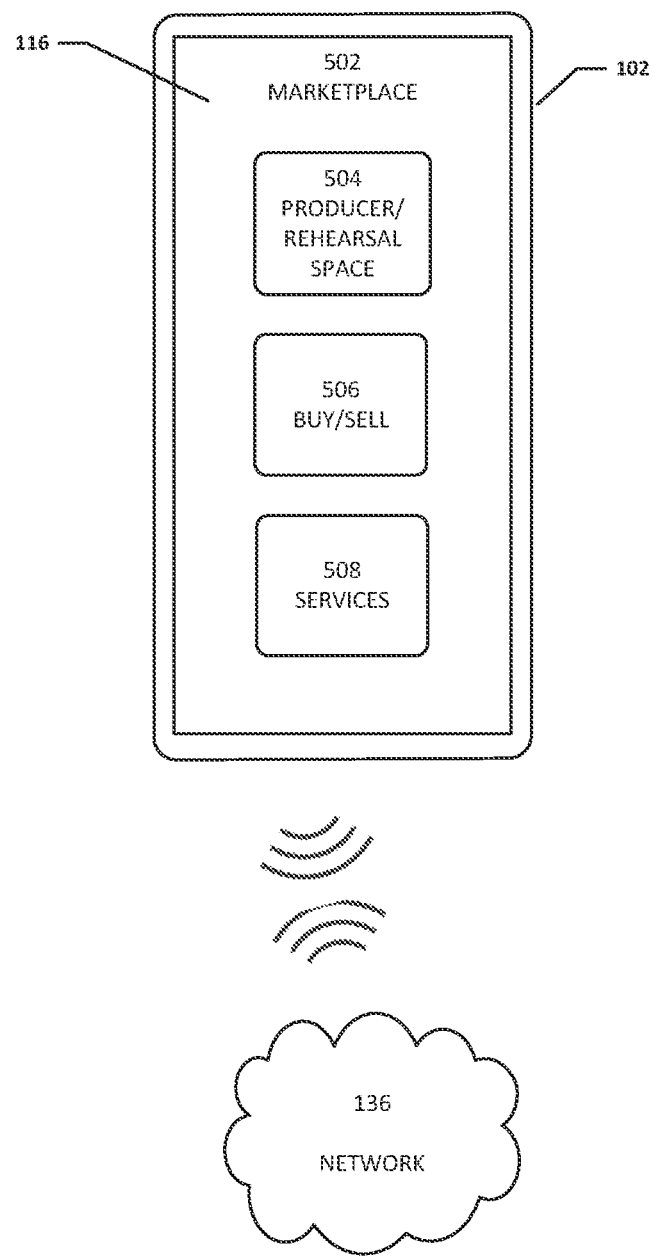
FIG. 5 is a simplified block diagram of a portion of a system to help enable the creation of, distribution of, and/or access to content, in accordance with an embodiment of the present disclosure.
Figure 9:
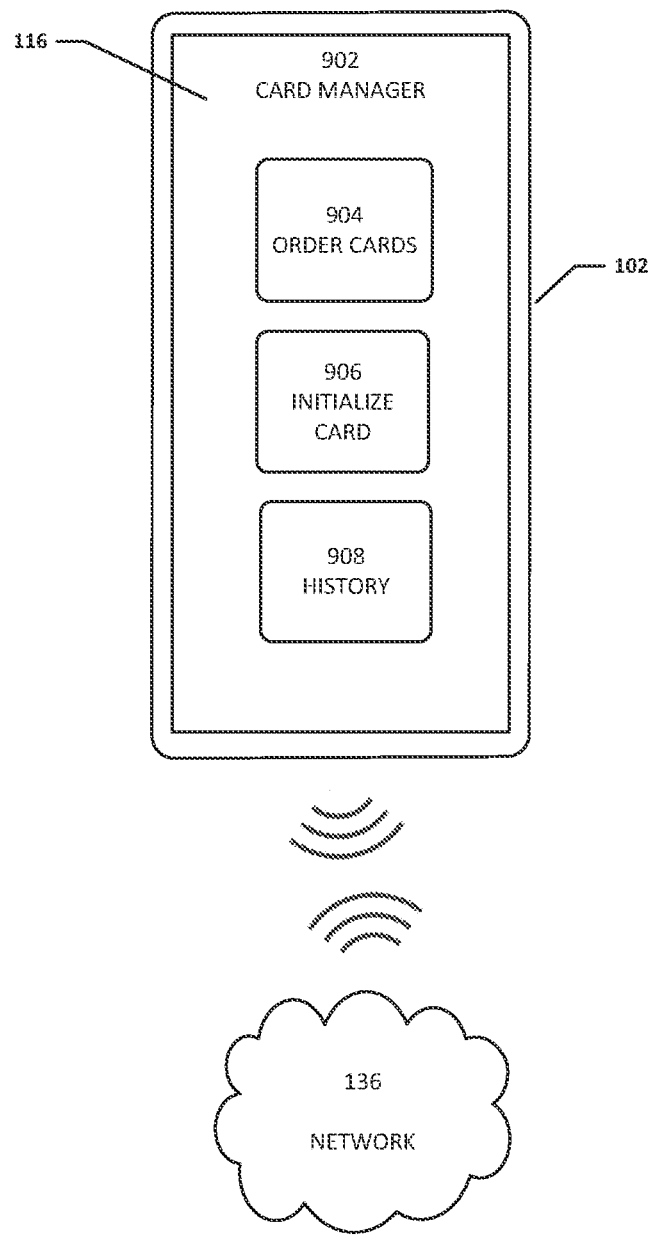
FIG. 9 is a simplified block diagram of a portion of a system to help enable the creation of, distribution of, and/or access to content, in accordance with an embodiment of the present disclosure.
Figure 13:
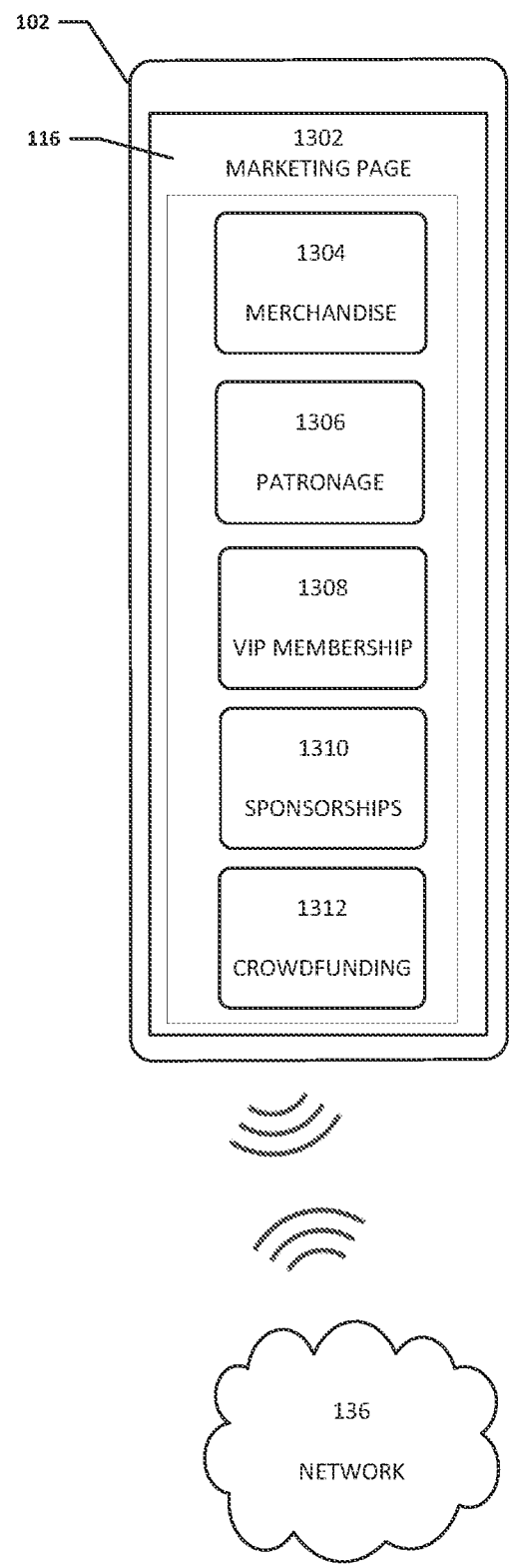
FIG. 13 is a simplified block diagram of a portion of a system to help enable the creation of, distribution of, and/or access to content, in accordance with an embodiment of the present disclosure.

The content creator interface page 202 can include a content page link 204, an events page link 206, a marketplace page link 208, a card manager page link 210, and a marketing page link 212. The content page link 204 can be selected by the content creator user to open a content page (e.g., as illustrated in FIG. 3) where the content creator user can view content associated with the content creator user. The events page link 206 can be selected by the content creator user to open an events page (e.g., as illustrated in FIG. 4) where the content creator user can view events associated with the content creator user. The marketplace page link 208 can be selected by the content creator user to open a marketplace page (e.g., as illustrated in FIG. 5) where the content creator user can view a market place for goods and services and well as manage leases and subleases for studio space and/or rehearsal space. The card manager page link 210 can be selected by the content creator user to open a card manager page (e.g., as illustrated in FIG. 9) where the content creator user can order and manage content distribution cards. The marketing page link 212 can be selected by the content creator user to open a marketing page (e.g., as illustrated in FIG. 13) where the content creator user can manage various marketing strategies and merchandise (e.g., request money, manage patronage, crowd funding, monthly subscriptions, sponsorships, VIP memberships, etc.).

Turning to FIG. 3, FIG. 3 is a simplified block diagram of a content page 302 configured to help enable the creation of, distribution of, and/or access to content, in accordance with an embodiment of the present disclosure. The content page 302 can be accessed by the content creator user using the content page link 204 in the content creator interface page 202 (illustrated in FIG. 2). The content page 302 is a part of the content creator application 214 illustrated in FIG. 2.

As illustrated in FIG. 3, the content page 302 can be displayed on the display 116 of the electronic device 102. The content page 302 can include a list of the content that is associated with the content creator user. For example, if the content creator user is a musician, the content page 302 can include a song or track section 304, an album section 306, a video section 308, and a non-fungible token (NFT) 310 section. The information, data, etc., or at least a portion of the information, data, etc., on the content page 302 can be stored, created, and/or accessed from the cloud services 108 (not shown), the server 110 (not shown), and/or one or more network elements 112 (not shown) using the network 136.

The track section 304 can include one or more songs or music (e.g., a baseline, instrument solo, vocal recordings, etc.) that have been recorded by the content creator user. If the content creator user does not have any songs or music that have been recorded by the content creator user, then the track section 304 may be blank. The album section 306 can include one or more albums that have been created by or for the content creator user. For example, an album may include songs or music that have been recorded by the content creator user. If the content creator user does not have any albums that have been created by or for the content creator user, then the album section 306 may be blank. The video section 308 can include one or more videos that have been created by or for the content creator user. For example, a music video based on one of the songs or music recorded by the content creator user. If the content creator user does not have any videos that have been created by or for the content creator user, then the video section 308 may be blank. The NFT section 310 can include artwork, performances, pictures, video recordings, voice recordings, and other NFTs associated with the content creator user. If the content creator user does not have any NFTs associated with the content creator user, then the NFT section 310 may be blank.

Turning to FIG. 4, FIG. 4 is a simplified block diagram of an event page 402 configured to help enable the creation of, distribution of, and/or access to content, in accordance with an embodiment of the present disclosure. The event page 402 can be accessed by the content creator user using the event page link 206 in the content creator interface page 202 (illustrated in FIG. 2). The event page 402 is a part of the content creator application 214 illustrated in FIG. 2.

As illustrated in FIG. 4, the event page 402 can be displayed on the display 116 of the electronic device 102. The event page 402 can include a booked events section 404, a pending events section 406, and a wish list section 408. The information, data, etc., or at least a portion of the information, data, etc., on the event page 402 can be stored, created, and/or accessed from the cloud services 108 (not shown), the server 110 (not shown), and/or one or more network elements 112 (not shown) using the network 136.

The booked events section 404 can include a listing of booked events. More specifically, the booked events section 404 can include a name of an event venue and the date of the event. The pending events section 406 can include a listing of pending events that may or may not become booked events. More specifically, the pending events section 406 can include a name of an event venue and the possible dates of the pending event. The wish list section 408 can include a listing of events that the content creator user may want to book.

Turning to FIG. 5, FIG. 5 is a simplified block diagram of a marketplace page 502 configured to help enable the creation of, distribution of, and/or access to content, in accordance with an embodiment of the present disclosure. The marketplace page 502 can be accessed by the content creator user using the marketplace page link 208 in the content creator interface page 202 (illustrated in FIG. 2). The marketplace page 502 can include a producer/rehearsal space page link 504, a buy/sell page link 506, and a services page link 508. The marketplace page 502 is a part of the content creator application 214 illustrated in FIG. 2.

As illustrated in FIG. 5, the marketplace page 502 can be displayed on the display 116 of the electronic device 102. The producer/rehearsal space page link 504 can allow the content creator user to access a page and select a producer from a list of producers, communicate with a producer, or engage in other activities associated with a producer. The producer/rehearsal space page link 504 can also allow the content creator user to access a page and manage one or more studio spaces and/or rehearsal spaces. For example, the content creator user can lease or sublease a studio space or rehearsal space and manage reserved studio spaces or rehearsal spaces. The buy/sell page link 506 can allow the content creator user to access a page where the content creator user can buy and sell goods. The services page link 508 can allow the content creator user to access a page where the content creator user can buy and sell services.

Figure 6:
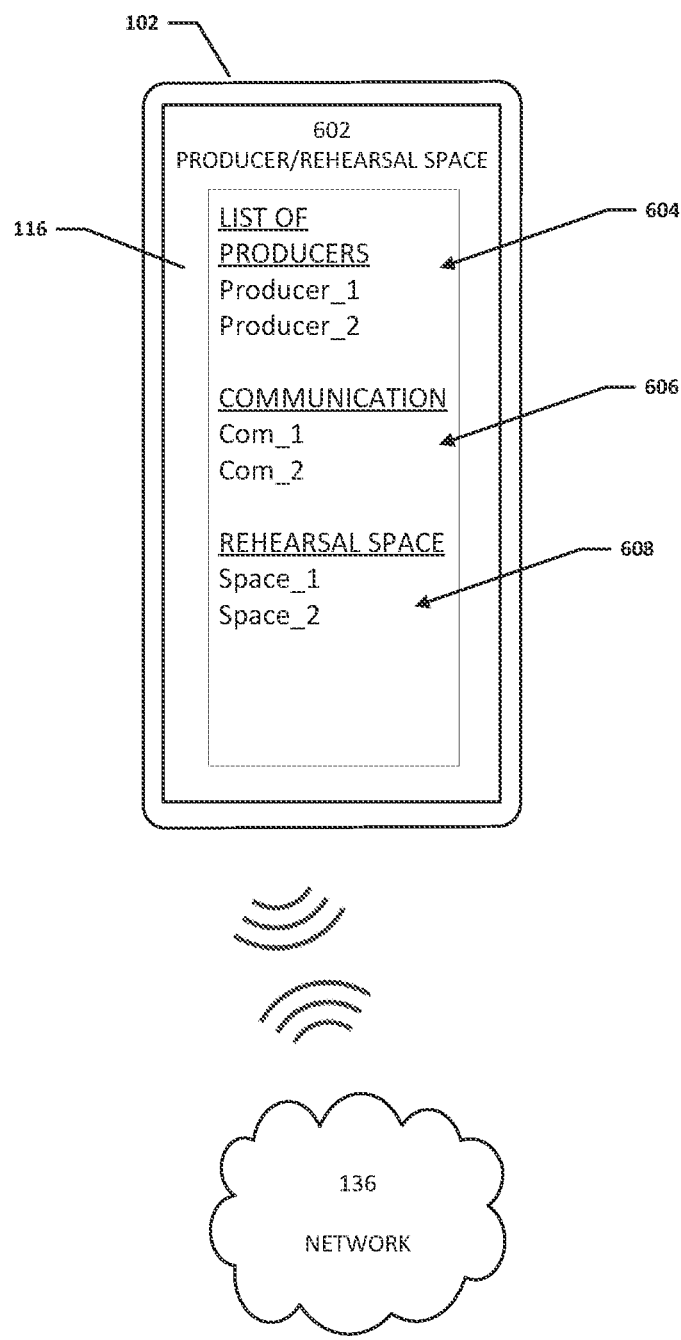
FIG. 6 is a simplified block diagram of a portion of a system to help enable the creation of, distribution of, and/or access to content, in accordance with an embodiment of the present disclosure.

Turning to FIG. 6, FIG. 6 is a simplified block diagram of a producer/rehearsal space page 602 configured to help enable the creation of, distribution of, and/or access to content, in accordance with an embodiment of the present disclosure. The producer/rehearsal space page 602 can be accessed by the content creator user using the producer/rehearsal space page link 504 in the marketplace page 502 (illustrated in FIG. 5). The producer/rehearsal space page 602 is a part of the content creator application 214 illustrated in FIG. 2.

As illustrated in FIG. 6, the producer/rehearsal space page 602 can be displayed on the display 116 of the electronic device 102. The producer/rehearsal space page 602 can include a list of producers section 604, a communication section 606, and a rehearsal space section 608. The information, data, etc., or at least a portion of the information, data, etc., on the producer/rehearsal space page 602 can be stored, created, and/or accessed from the cloud services 108 (not shown), the server 110 (not shown), and/or one or more network elements 112 (not shown) using the network 136.

The list of producers section 604 can include a listing of producers. More specifically, the list of producers section 604 can include a list of names of producers that the content creator user can hire and/or has hired. In some examples, each name of a producer is a link to a bio for the producer to help the content creator user select a producer. The communication section 606 can include a list of communications with a producer. More specifically, the communication section 606 can include one or more conversations or text messages between the content creator user and a producer. The rehearsal space section can allow the content creator user to manage one or more rehearsal spaces and/or studio spaces. For example, the content creator user can use the rehearsal space section 608 to lease or sublease a rehearsal space, manage reserved rehearsal spaces, lease or sublease a studio space, and/or manage reserved studio spaces.

Figure 7:
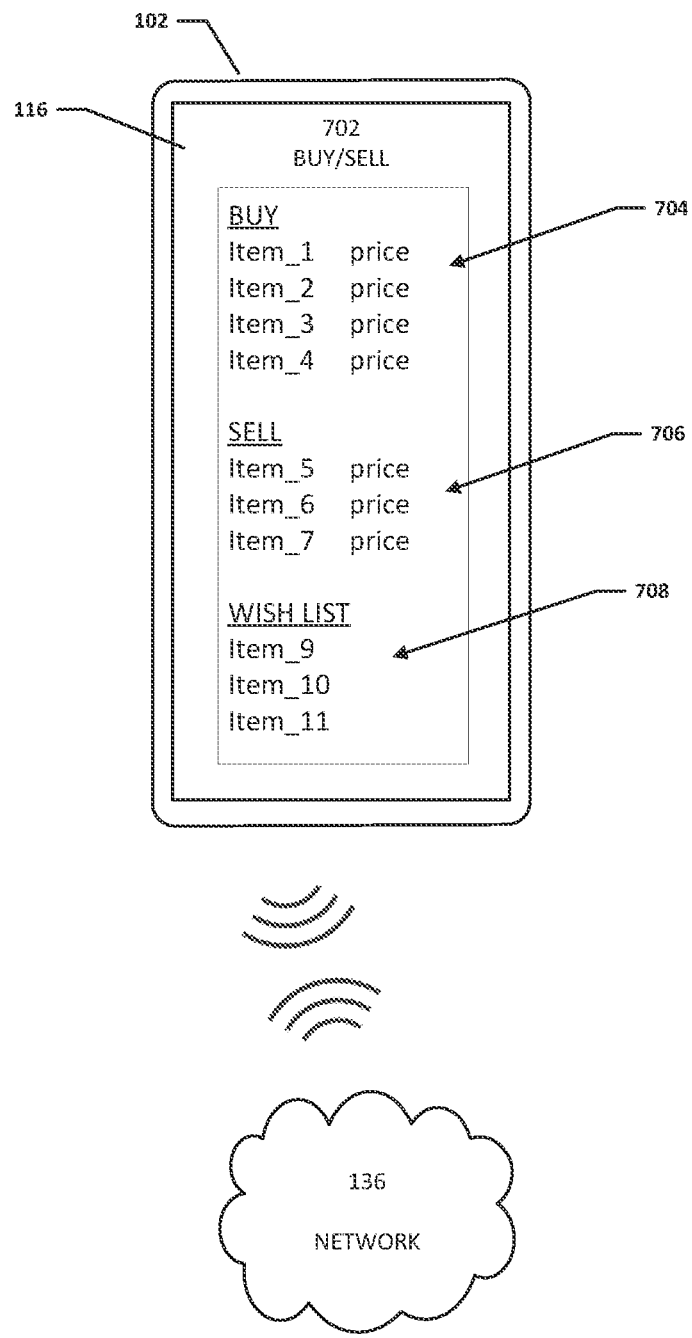
FIG. 7 is a simplified block diagram of a portion of a system to help enable the creation of, distribution of, and/or access to content, in accordance with an embodiment of the present disclosure.

Turning to FIG. 7, FIG. 7 is a simplified block diagram of a buy/sell page 702 configured to help enable the creation of, distribution of, and/or access to content, in accordance with an embodiment of the present disclosure. The buy/sell page 702 can be accessed by the content creator user using the buy/sell page link 506 in the marketplace page 502 (illustrated in FIG. 5). The buy/sell page 702 is a part of the content creator application 214 illustrated in FIG. 2.

As illustrated in FIG. 7, the buy/sell page 702 can be displayed on the display 116 of the electronic device 102. The buy/sell page 702 can include a list of items for purchase section 704, a list of items the content creator user is trying to sell section 706, and a wish list of items section 708. The information, data, etc., or at least a portion of the information, data, etc., on the buy/sell page 702 can be stored, created, and/or accessed from the cloud services 108 (not shown), the server 110 (not shown), and/or one or more network elements 112 (not shown) using the network 136.

The list of items for purchase section 704 can include a listing of items that the content creator user can purchase. More specifically, if the content creator user is a musician, the list of items for purchase section 704 can include music instruments, sound equipment, lighting equipment, rehearsal space, and other items a musician might need. The list of items the content creator user is trying to sell section 706 can include a listing of items that the content creator user is trying to sell. For example, if the content creator user is a musician, the list of items to sell section 706 can include music instruments, sound equipment, lighting equipment, rehearsal space, and other items a musician might sell or sublease in the case of rehearsal space. The wish list of items section 708 can include a list of items the content creator user wants to purchase or needs. For example, the wish list of items section 708 can include one or more items that are not currently available and the content creator user might be willing to purchase the one or more items if and when they are available for sale.

Figure 8:
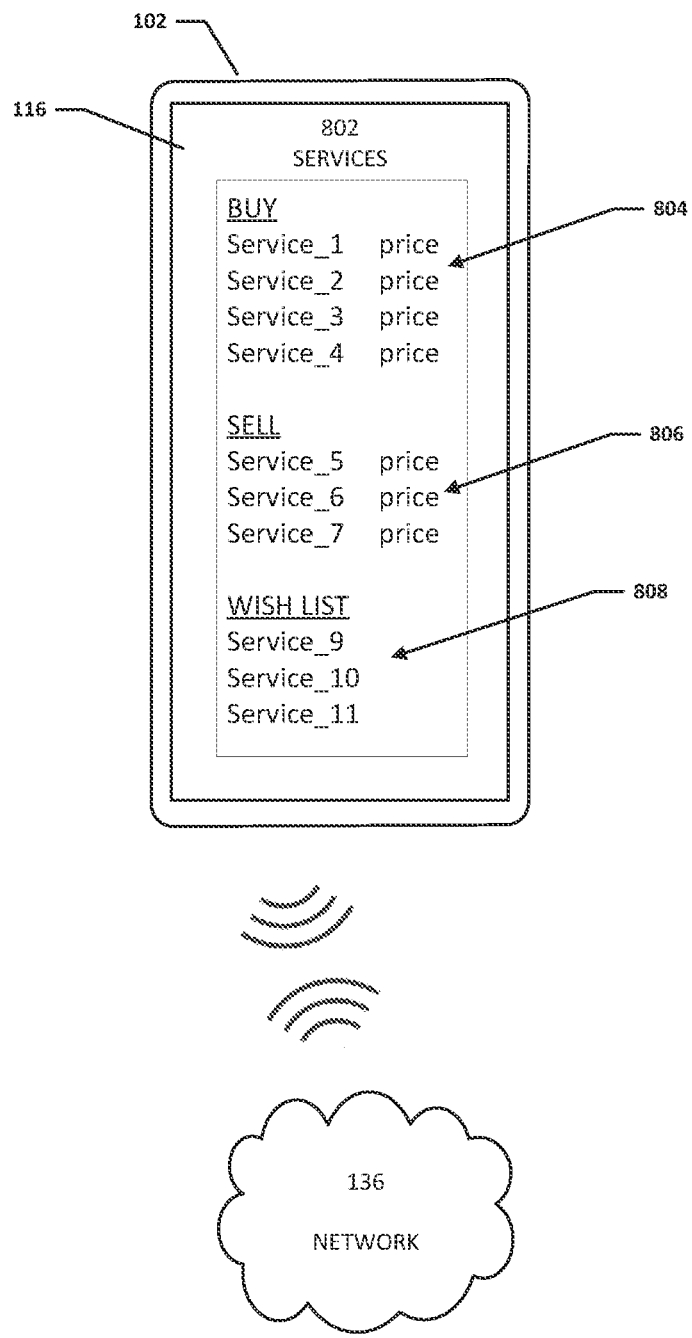
FIG. 8 is a simplified block diagram of a portion of a system to help enable the creation of, distribution of, and/or access to content, in accordance with an embodiment of the present disclosure.

Turning to FIG. 8, FIG. 8 is a simplified block diagram of a services page 802 configured to help enable the creation of, distribution of, and/or access to content, in accordance with an embodiment of the present disclosure. The services page 802 can be accessed by the content creator user using the service page link 508 in the marketplace page 502 (illustrated in FIG. 5). The services page 802 is a part of the content creator application 214 illustrated in FIG. 2.

As illustrated in FIG. 8, the services page 802 can be displayed on the display 116 of the electronic device 102. The services page 802 can include a list of services for purchase section 804, a list of services the content creator user is offering to sell section 806, and a wish list of services section 808. The information, data, etc., or at least a portion of the information, data, etc., on the services page 802 can be stored, created, and/or accessed from the cloud services 108 (not shown), the server 110 (not shown), and/or one or more network elements 112 (not shown) using the network 136.

The list of services for purchase section 804 can include a listing of services that the content creator user can purchase. More specifically, if the content creator user is a musician, the list of services for purchase section 804 can include music lessons, sound engineers, lighting engineers, and other services a musician might need. The list of services the content creator user is trying to sell section 806 can include a listing of services that the content creator user may offer to sell. More specifically, if the content creator user is a musician, the list of services for sell section 806 can include music lessons, and other services the musician might be trying to sell. The wish list of services section 808 can include a list of services the content creator user wants to purchase or needs. For example, the wish list of services section 808 can include one or more services that are not currently available and the content creator user might be willing to purchase the one or more services if and when they are available.

Turning to FIG. 9, FIG. 9 is a simplified block diagram of a card manager page 902 configured to help enable the creation of, distribution of, and/or access to content, in accordance with an embodiment of the present disclosure. The card manager page 902 can be accessed by the content creator user using the card manager page link 210 in the content creator interface page 202 (illustrated in FIG. 2). The card manager page 902 is a part of the content creator application 214 illustrated in FIG. 2.

As illustrated in FIG. 9, the card manager page 902 can be displayed on the display 116 of the electronic device 102.

The card manager page 902 can include an order cards page link 904, an initialize card page link 906, and a card history page link 908. The order cards page link 904 can allow the content creator user to access a page and order content distribution cards, as described in more detail below. The initialize card page link 906 can allow the content creator user to access a page and initialize content distribution cards, as described in more detail below. The card history page link 908 can allow the content creator user to access a page and view the history of content distribution cards associated with the content creator user, as described in more detail below.

Figure 10:
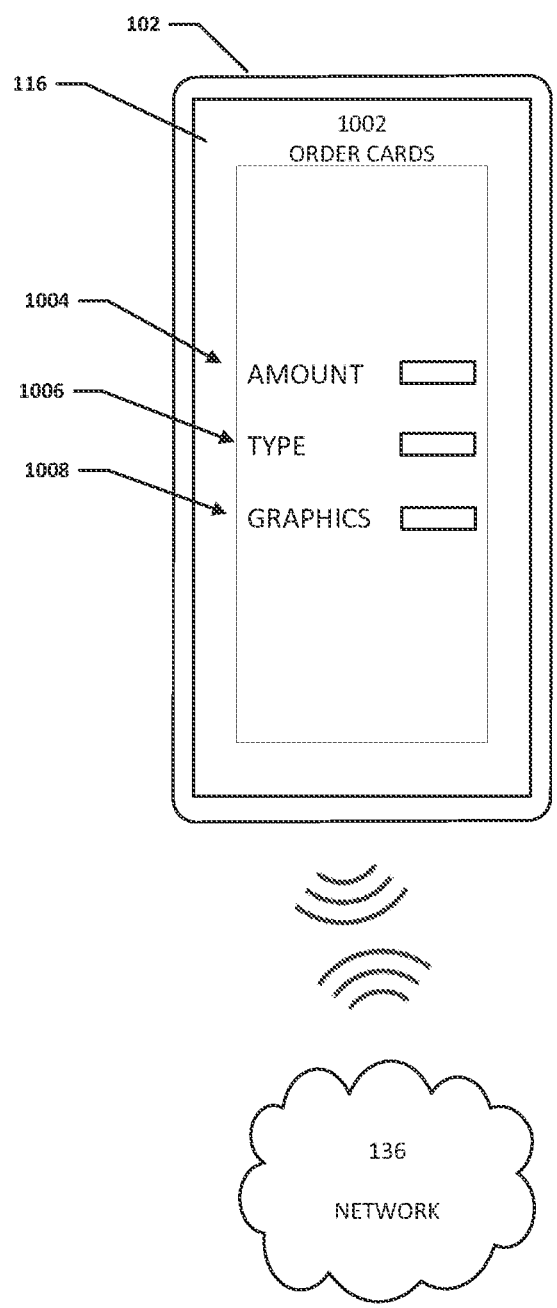
FIG. 10 is a simplified block diagram of a portion of a system to help enable the creation of, distribution of, and/or access to content, in accordance with an embodiment of the present disclosure.

Turning to FIG. 10, FIG. 10 is a simplified block diagram of an order cards page 1002 configured to help enable the creation of, distribution of, and/or access to content, in accordance with an embodiment of the present disclosure. The order cards page 1002 can be accessed by the content creator user using the order cards page link 904 in the card manager page 902 (illustrated in FIG. 9). The order cards page 1002 is a part of the content creator application 214 illustrated in FIG. 2.

As illustrated in FIG. 10, the order cards page 1002 can be displayed on the display 116 of the electronic device 102. The order cards page 1002 can include a card amount section 1004, a type of card section 1006, and a card graphic section 1008. The card amount section 1004 can include an input section that the content creator user can use to indicate how many content distribution cards the content creator user wants to order. More specifically, the card amount section 1004 can include a drop-down menu, input field, or some other means that allows the content creator user to indicate how many content distribution cards the content creator user wants to order. The type of card section 1006 can include an input section that the content creator user can use to indicate the type of content distribution card the content creator user wants to order. More specifically, the type of card section 1006 can include a drop-down menu, input field or some other means that allows the content creator user to indicate the type of content distribution card the content creator user wants to order. In a specific example, the content distribution card can have different shapes and sizes and the content creator user can select the shape and/or size the content creator user wants to order. The card graphic section 1008 can include an input section that allows the content creator user to select graphics, images, artwork, etc. the content creator user may want on the content distribution card. More specifically, the card graphic section 1008 can include a drop-down menu of stock graphics, images, artwork, etc. to use on the content distribution card or an option for the content creator user to upload graphics, images, artwork, etc. created by or for the content creator user to use on the content distribution card.

Figure 11:
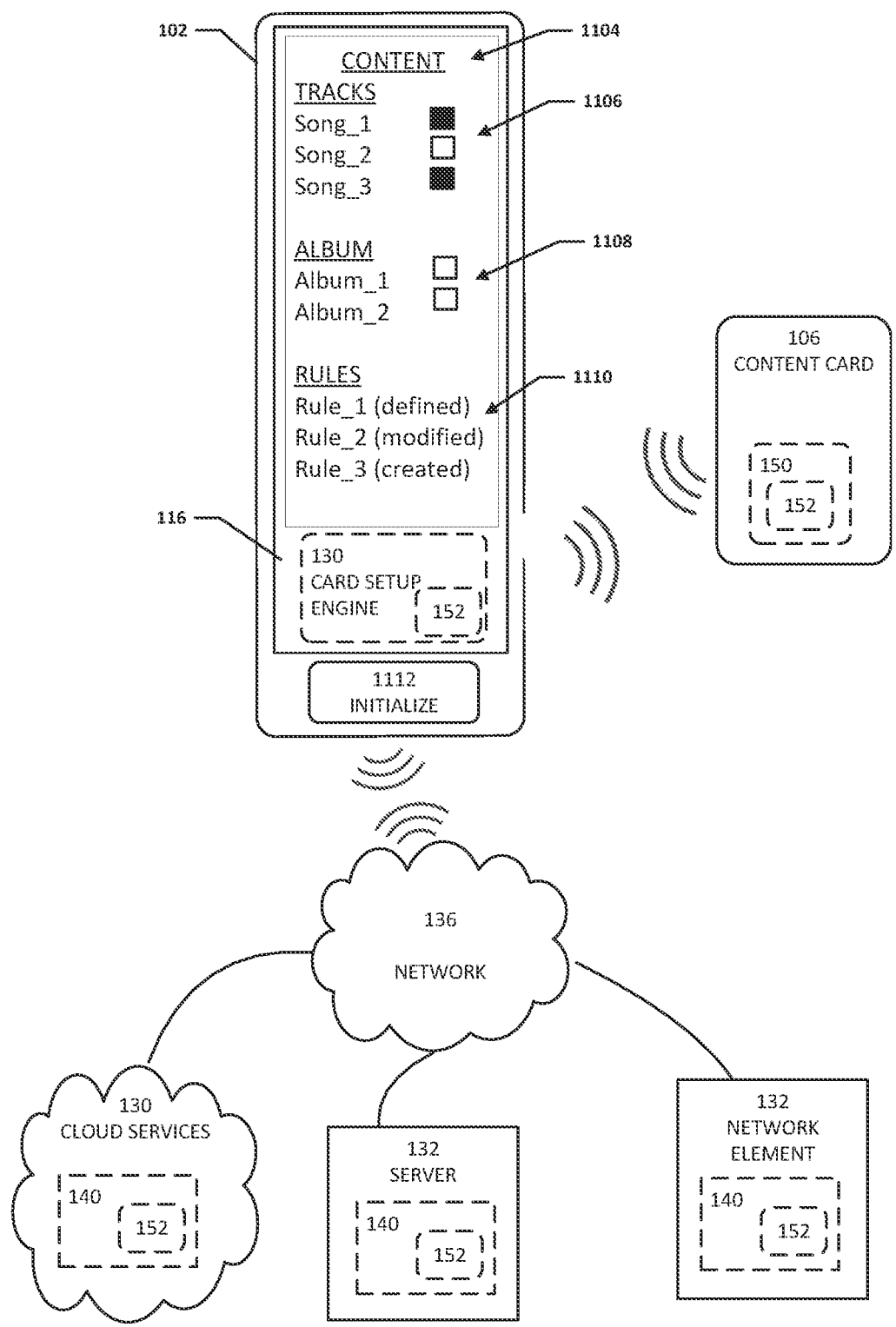
FIG. 11 is a simplified block diagram of a portion of a system to help enable the creation of, distribution of, and/or access to content, in accordance with an embodiment of the present disclosure.

Turning to FIG. 11, FIG. 11 is a simplified block diagram of an initialize card page 1102 configured to help enable the creation of, distribution of, and/or access to content, in accordance with an embodiment of the present disclosure. The initialize card page 1102 can be accessed by the content creator user using the initialize card page link 906 in the card manager page 902 (illustrated in FIG. 9). The initialize card page 1102 is a part of the content creator application 214 illustrated in FIG. 2.

As illustrated in FIG. 11, the initialize card page 1102 can be displayed on the display 116 of the electronic device 102. The initialize card page 1102 can include a content section 1104, a rules section 1110, and a start initialize card process selector 1112. The content section 1104 can include content that the content creator user can select to be accessed by the content distribution card 106. For example, if the content creator user is a musician, as illustrated in FIG. 11, the content section 1104 can include a tracks section 1106 and an album section 1108. Note that if the content creator user had one or more videos and/or NTFs associated with the content creator user, then the content section 1104 could include a video section and/or an NTF section. The tracks section 1106 can include a list of tracks or songs associated with the content creator user. The album section 1108 can include a list of albums associated with the content creator user. In an illustrative example, the content creator user can select one or more songs and/or one or more albums to be accessed by the content distribution card. For example, as illustrated in FIG. 11, the content creator user can select song_1 and song_2.

In some examples, rules for access to the content can be created using the rules section 1110. Using the rules section 1110, the content creator user can select one or more predefined rules, can modify the predefined rules, or can create their own rules. For example, a predefined rule may be the content can only be accessed three times. The content creator user can modify the predefined rule so that the content can only be accessed five times, ten times, one time, etc. Also, the content creator user can create their own rules, for example, the content can be accessed three times within a week, unlimited times within a week, only once a day for five days, etc.

After the content that will be accessed by the content distribution card 106 has been selected by the content creator user and any rules for access to the content has been selected, the content creator user can activate (e.g., by touch if the display is a touchscreen) the start initialize card process selector 1112. The start initialize card process selector 1112 can communicate with the content distribution card initialization engine 130 to begin the card initialization process. During the card initialization process, the content distribution card initialization engine 130 creates the content identifier 152 and associates the content identifier 152 with the content selected by the content creator user (e.g., song_1 and song_2). The content distribution card initialization engine 130 communicates the content identifier 152 to the short-ranged communication module 150 in the content distribution card 106 and the content identifier 152 is stored on the content distribution card 106. The content distribution card initialization engine 130 also communicates the content identifier 152, the content, and any rules associated with access to the content to the cloud services 108, the server 110, and/or the one or more network element 112 using the network 114. The cloud services 108, the server 110 and/or the one or more network element 112 stores the content identifier 152 and any rules associated with access to the content in the network content database 140. In some examples, the content distribution card initialization engine 130 does not generate the content identifier 152 and instead, the content distribution card initialization engine 130 requests the content identifier 152 from the network content creation and distribution system 104. The network content creation and distribution system 104 can generate the content identifier 152, associate the content identifier 152 with the selected content and any rules associated with the content, and communicates the content identifier 152 to the content distribution card initialization engine 130.

Figure 14:
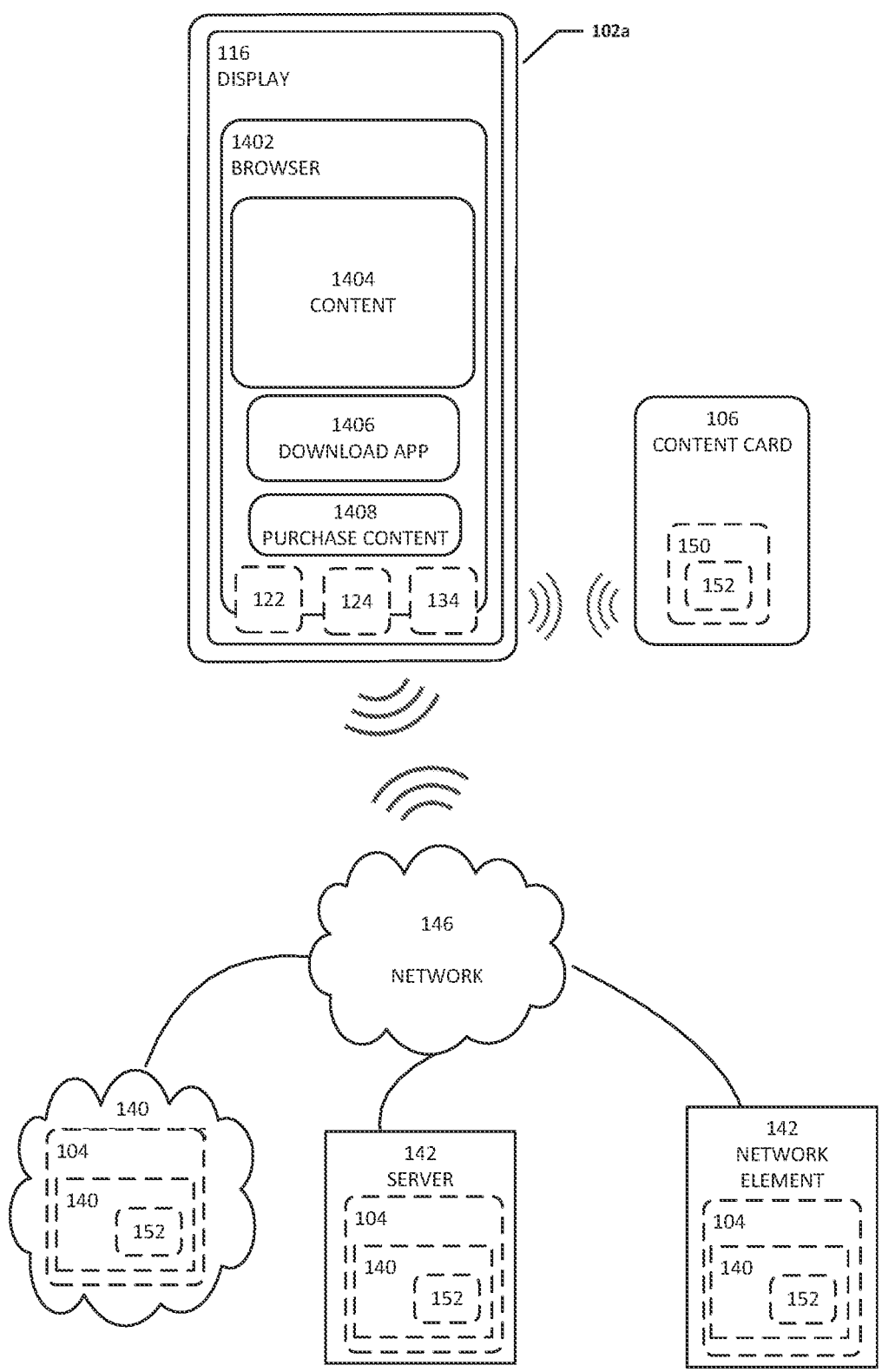
FIG. 14 is a simplified block diagram of a portion of a system to help enable the creation of, distribution of, and/or access to content, in accordance with an embodiment of the present disclosure.

As described in more detail in FIGS. 13 and 14, when the content distribution card 106 is used to access the content selected by the content creator user (e.g., song_1 and song_2), the content identifier 152 in the content distribution card 106 is read by or sent to a content consumer's user device, the content consumer's user device communicates the content identifier 152 to the cloud services 108, the server 110 and/or the one or more network element 112 using the network 114, and if any rules associated with access to the content allow access to the content, the content (e.g., song_1 and song_2) associated with the content identifier 152 is sent to the content consumer's user device.

Turning to FIG. 12, FIG. 12 is a simplified block diagram of a card history page 1202 configured to help enable the creation of, distribution of, and/or access to content, in accordance with an embodiment of the present disclosure. The card history page 1202 can be accessed by the content creator user using the card history page link 908 in the card manager page 902 (illustrated in FIG. 9). The card history page 1202 is a part of the content creator application 214 illustrated in FIG. 2.

As illustrated in FIG. 12, the card history page 1202 can be displayed on the display 116 of the electronic device 102. The card history page 1202 can include a content distribution card management section 1204 for each content distribution card associated with the content creator user. For example, as illustrated in FIG. 12, for a content_1 card, the card history page 1202 can include a content distribution card management section 1204a, for a content_2 card, the card history page 1202 can include a content distribution card management section 1204b, and for a content_3 card, the card history page 1202 can include a content distribution card management section 1204c.

The content distribution card management section 1204 can include specific details related to the associated content distribution card. More specifically, for the content_1 card, the content distribution card management section 1204 can include the number of content_1 cards ordered, the number of content_1 cards distributed, sold, or given to potential content distribution card users, and the number of content_1 cards activated. The content distribution card management section 1204, can help the content creator user determine if their content is being accessed and can help the content creator user determine if their content is reaching a targeted audience.

Turning to FIG. 13, FIG. 13 is a simplified block diagram of a marketing page 1302 configured to help enable the creation of, distribution of, and/or access to content, in accordance with an embodiment of the present disclosure. The marketing page 1302 can be accessed by the content creator user using the marketing page link in the content creator interface page 202 (illustrated in FIG. 2). The marketing page 1302 is a part of the content creator application 214 illustrated in FIG. 2.

As illustrated in FIG. 13, the marketing page 1302 can be displayed on the display 116 of the electronic device 102. The marketing page 1302 can include a merchandise link 1304, a patronage link 1306, a VIP membership page link 1308, a sponsorships link 1310, and a crowdfunding link 1312. The marketing page 1302 helps the content creator user to manage various marketing strategies and merchandise. For example, each of the merchandise link 1304, the patronage link 1306, the VIP membership page link 1308, the sponsorships link 1310, and the crowdfunding link 1312 can be used by the content creator user to help raise money to support the content creator user.

More specifically, the merchandise link 1304 can be used access an online store that sells merchandise related to the content creator user and/or content of the content creator user, a partnership business or a business that sells licensed merchandise related to the content creator user and/or the content of the content creator user, or some other commercial entity that sells merchandise related to the content creator user and/or content of the content creator user. The patronage link 1306 can be used to access a webpage where the content creator user can solicit and manage patrons related to the content creator user and/or content of the content creator user. The VIP membership page link 1308 can be used to access a webpage where the content creator user can solicit and manage VIP memberships related to the content creator user and/or the content of the content creator user. For example, if the content creator user is a musician, a VIP membership may give the VIP member first access to new content, concert tickets, backstage passes, meet and greet events, etc. The sponsorship link 1310 can be used to access a webpage where the content creator user can solicit and manage sponsorships related to the content creator user and/or content of the content creator user. For example, if the content creator user is a musician, using the sponsorship link 1310, the content creator user may solicit and mange a sponsorship from a guitar or drum company. The crowdfunding link 1312 can be used to access a webpage where the content creator user can solicit and manage crowdfunding efforts. For example, if the content creator user is a musician, the crowdfunding link 1312 can be used by the content creator user to crowdfund a concert or music festival.

Turning to FIG. 14, FIG. 14 is a simplified block diagram of a content consumer's electronic device 102a configured to help enable the creation of, distribution of, and/or access to content, in accordance with an embodiment of the present disclosure. The content consumer's electronic device 102a is a device that does not have a content consumer application installed (as compared to a content consumer's electronic device 102b illustrated in FIG. 14 that does have a content consumer application installed). In an illustrative example, the content distribution card 106 is brought near the content consumer's electronic device 102a. The content distribution card reader engine 134 can communicate with the short-ranged communication module 150 and obtain the content identifier 152 from the content distribution card 106. The short-ranged communication module 150 can be a near field communication (NFC) module, a radio frequency identification (RFID) module, or some other type of short ranged communication module. In some examples, the short-ranged communication module 150 may be a quick response code (QR code), a bar code, or some other type of symbol, letters, numbers, etc. imprinted onto the content distribution card 106.

After the content distribution card reader engine 134 has obtained the content identifier 152 from the content distribution card 106, the communication engine 124 can send the content identifier 152 to the network content creation and distribution system 104 located in the cloud services 108, the server 110, or the one or more network elements 112. The network content creation and distribution system 104 uses the content identifier 152 to search the network content database 140 and determine the location of the content associated with the content identifier 152 (e.g., in memory of the cloud services 108, the server 110, or the one or more network elements 112 that received the content identifier 152 or some other location). The cloud services 108, the server 110, or the one or more network elements 112 that received the content identifier 152 from the content consumer's electronic device 102a then sends the content associated with the content identifier 152 to the content consumer's electronic device 102a.

The content consumer's electronic device 102a can open the content in a browser 1402 and display the content 1404 on the display 116 of the content consumer's electronic device 102a. If the content 1404 is music or includes sound, the content consumer's electronic device 102a can use the speakers 122 of the content consumer's electronic device 102a to play the music or sound for the content consumer user. In some examples, while the content 1404 is being displayed in the browser 1402 on the display 116, the display 116 can also display a download content consumer application option 1406 and/or a purchase content option 1408 to the content consumer user. The download content consumer application option 1406 allows the content consumer user to download the content consumer application (as shown in FIG. 14). The purchase content option 1408 allows the consumer user to purchase the content 1404. In some examples, the content 1404 is streamed to the content consumer's electronic device 102a. In other examples, the content 1404 is downloaded and stored on the content consumer's electronic device 102a. The content 1404 may be stored on the electronic device for a limited amount of time. More specifically, the content 1404 may be cached and not stored in memory, the content 1404 may be stored in the content database 128 (not shown) for predetermined amount of time (e.g., one day, one week, etc.) and then removed or deleted from the content database 128. The cache allows fast retrieval of frequently requested content and/or data.

Figure 15:
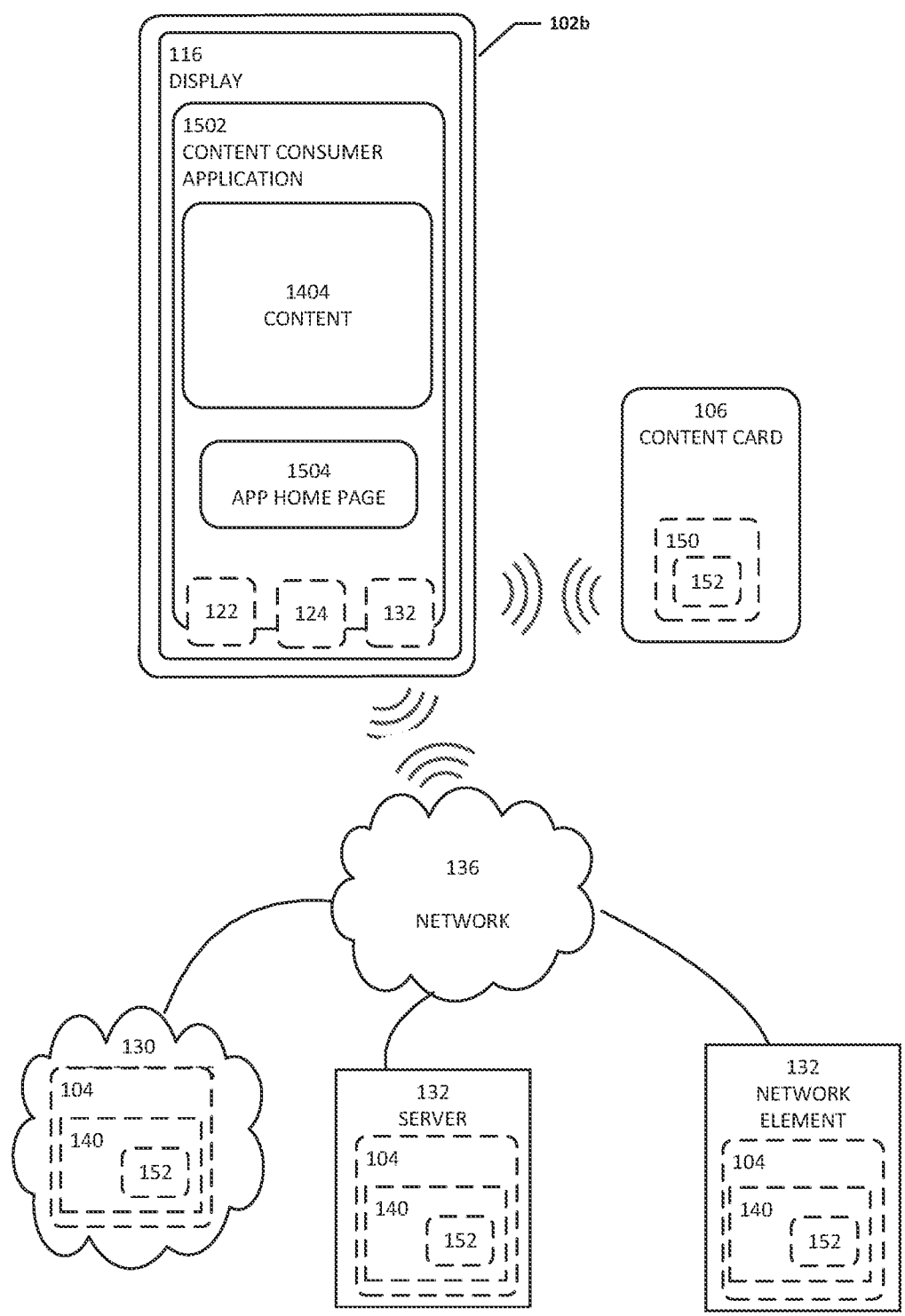
FIG. 15 is a simplified block diagram of a portion of a system to help enable the creation of, distribution of, and/or access to content, in accordance with an embodiment of the present disclosure.

Turning to FIG. 15, FIG. 15 is a simplified block diagram of a content consumer's electronic device 102b configured to help enable the creation of, distribution of, and/or access to content, in accordance with an embodiment of the present disclosure. The content consumer's electronic device 102b is a device that does have a content consumer application 1502 installed (as compared to the content consumer's electronic device 102a illustrated in FIG. 15 that does have the content consumer application 1502 installed). The content consumer application 1502 can be a part of a content creator/consumer application (e.g., the content creator/consumer application 1902 illustrated in FIG. 19). In some examples, the content consumer application 1502 is a web-based application accessed using the network 136.

In an illustrative example, the content distribution card 106 is brought near the content consumer's electronic device 102b. The content distribution card reader engine 134 can communicate with the short-ranged communication module 150 and obtain the content identifier 152 from the content distribution card 106. The short-ranged communication module 150 can be a near field communication (NFC) module, a radio frequency identification (RFID) module, or some other type of short ranged communication module. In some examples, the short-ranged communication module 150 may be a quick response code (QR code), a bar code, or some other type of symbol, letters, numbers, etc. imprinted onto the content distribution card 106.

After the content distribution card reader engine 134 has obtained the content identifier 152 from the content distribution card 106, the communication engine 124 can send the content identifier 152 to the network content creation and distribution system 104 located in the cloud services 108, the server 110, or the one or more network elements 112. The network content creation and distribution system 104 uses the content identifier 152 to search the network content database 140 and determine the location of the content associated with the content identifier 152. The cloud services 108, the server 110, or the one or more network elements 112 that received the content identifier 152 from the content consumer's electronic device 102b then sends the content associated with the content identifier 152 to the content consumer's electronic device 102b. The content distribution card 106 is associated with the content consumer user or owner of the content consumer application 1502.

The content consumer's electronic device 102b can open the content in the content consumer application 1502 and display the content 1404 on the display 116 of the content consumer's electronic device 102b. If the content 1404 is music or includes sound, the content consumer's electronic device 102b can use the speakers 122 of the content consumer's electronic device 102b to play the music or sound for the content consumer user. In some examples, while the content 1404 is being displayed in the content consumer application 1502 on the display 116, the display 116 can also display an application home page link 1504. The application home page link 1504 can be used to access a content consumer interface page (e.g., the content consumer interface page 2002 illustrated in FIG. 20). In some examples, the content 1404 is streamed to the content consumer's electronic device 102b. In other examples, the content 1404 is downloaded and stored on the content consumer's electronic device 102b. The content 1404 may be stored on the electronic device for a limited amount of time. More specifically, the content 1404 may be cached and not stored in memory, the content 1404 may be stored in the content database 128 (not shown) for predetermined amount of time (e.g., one day, one week, etc.) and then removed or deleted from the content database 128.

Turning to FIG. 16, FIG. 16 is a simplified block diagram of the network content database 140 configured to help enable the creation of, distribution of, and/or access to content, in accordance with an embodiment of the present disclosure. The network content database 140 can include a content identifier column 1602, a location of content column 1604, an owner of content column 1606, a rules column 1608, an access to content count column 1610, and a number of licensed users column 1612. Changes, substitutions, variations, alterations, and modifications of the network content database 140 may be ascertained to one skilled in the art and it is intended that the present disclosure encompass all such changes, substitutions, variations, alterations, and modifications as falling within the scope of the appended claims.

The content identifier column 1602 includes each unique content identifier 152 stored on a corresponding unique content distribution card 106. The location of content column 1604 includes a location of the content. The location of the content may be a specific memory address in memory, a web address, or some other location where the content can be stored and later retrieved. The owner of content column 1606 includes the content creator user that created the content. For example, if the content is music, the owner may be a band name or the name of the musician that created the music. The rules column 1608 includes any rules that may be associated with the content. For example, some rules may include that the content can only be accessed a certain number of times (e.g., 3 times), the content can only be accessed for a specific amount of time (e.g., unlimited times in one week), the content is of a lower quality compared to the quality of the content if the content is purchased or the content is a higher quality if the content is purchased, etc. The access to content count column 1610 includes a count of the number of times the content has been accessed. For example, popular content will have a higher content count as compared to content that is not popular and is only accessed a few times. In some examples, the content count column 1610 can also identify the number of unique content consumer user devices that have accessed the content. The number of licensed users column 1612 includes a count of the number of users that have purchased the content (e.g., a license to access the content). For example, the number of licensed users column 1612 can help determine the number of times the content associated with the content identifier has been purchased Turning to FIG. 17, FIG. 17 is a simplified block diagram of the network user database 138 configured to help enable the creation of, distribution of, and/or access to content, in accordance with an embodiment of the present disclosure. The network user database 138 can include a user ID column 1702, a device ID column 1704, a content owned column 1706, a content access frequency column 1708, and a last content access date column 1710. Changes, substitutions, variations, alterations, and modifications of the network user database 138 may be ascertained to one skilled in the art and it is intended that the present disclosure encompass all such changes, substitutions, variations, alterations, and modifications as falling within the scope of the appended claims.

The content consumer user ID column 1702 includes a unique ID for a content consumer user. The unique ID may be an email address, a phone number, a user name, or some other unique ID for the content consumer user. In some examples, the unique ID for the content consumer user is the user's name of the content consumer user when the content consumer user is logged into the content consumer application 1502 (illustrated in FIG. 15). The device ID column 1704 includes the ID of the electronic device associated with the unique ID for the content consumer user. For example, the device ID may be a MAC address of the electronic device associated with the unique ID for the content consumer user or some other unique identifier of the electronic device. In some examples, the system does not collect or store the ID of the electronic device associated with the unique ID for the content consumer user. The content owned column 1706 includes content that the content consumer user associated with the unique ID has purchased or accessed using a content distribution card. The content access frequency column 1708 includes a number of times the content consumer user associated with the unique ID has accessed each of the owned content or content accessed using a content distribution card. The last content access date column 1710 includes the last time the content consumer user associated with the unique ID has accessed each of the owned content or content accessed using a content distribution card.

Figure 18:
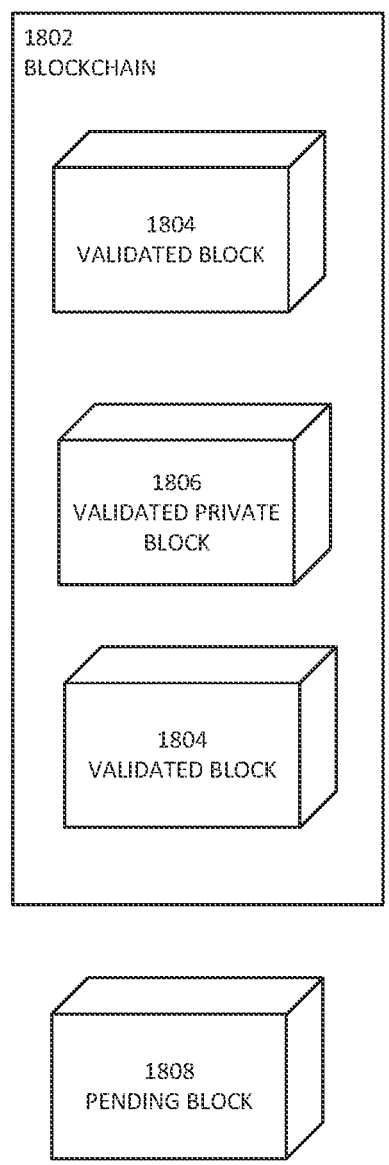
FIG. 18 is a simplified block diagram of a portion of a system to help enable the creation of, distribution of, and/or access to content, in accordance with an embodiment of the present disclosure.

Turning to FIG. 18, FIG. 18 is a simplified block diagram of a content blockchain 1802 configured to help enable the creation of, distribution of, and/or access to content, in accordance with an embodiment of the present disclosure. The content blockchain 1802 can include one or more validated bocks 1804. In addition, the content blockchain 1802 can include one or more validated private blocks 1806. In an example, the content blockchain 1802 can include any combination of one or more validated blocks 1804 and/or one or more validated private blocks 1806. One or more validated private blocks 1806 may be used in a Hyperledger blockchain where the private data in validated private block is only shared with authorized network elements and/or users.

When a block in a blockchain is created, the new block is a pending block 1808 and the pending block is marked as "PENDING" until validating nodes in the blockchain network validate the pending block 1808 and the content related details included in the pending block 1808. Once the pending block 1808 is validated, then the pending block 1808 can be added to the content blockchain 1802 and will become a validated block 1804 or a validated private block 1806. The data in each validated block 1804 and/or each validated private block 1806 can provide insights to help enable the creation of, distribution of, and/or access to content.

In an example, using the blockchain engine 144 (not shown), one or more of the cloud services 108 (not shown), the server 110 (not shown), and/or the one or more network elements 112 (not shown) can generate blocks for the content blockchain 1802 and each may be a validating node. More specifically, one or more of the cloud services 108, the server 110, and/or the one or more network elements 112 can create a block that includes details regarding the content and publish the block as the pending block 1808 for addition to the content blockchain 1802. Validating nodes (one or more of the cloud services 108, the server 110, the one or more network elements 112, and/or some other element acting as a validating node) can be notified about the pending block 1808 and one or more of the validating nodes can validate the pending block 1808 for addition to the content blockchain 1802. After the pending block 1808 has been validated and added to the content blockchain 1802, the data in the content blockchain 1802 can be analyzed to help enable the creation of, distribution of, and/or access to content.

In an illustrative example, using the blockchain engine 144, for each content identifier, one or more of the cloud services 108, the server 110, and/or the one or more network elements 112 can generate a block for the content blockchain 1802 that is specific for the content associated with the content identifier (e.g., the block includes specific details related to the content such as the owner, location of the content, rules related to access of the content, data or information related to content distribution cards associated with the content, etc.). In another illustrative example, using the blockchain engine 144, for each creator (e.g., artist, musician, band, etc.) of content, one or more of the cloud services 108, the server 110, and/or the one or more network elements 112 can generate block for the content blockchain 1802 that is specific for the content creator user or creator of the content (e.g., the block includes specific details related to the content creator user such as the content, the content identifier, location of the content, rules related to access of the content, data or information related to content distribution cards associated with the content creator user, etc.).

Figure 19:
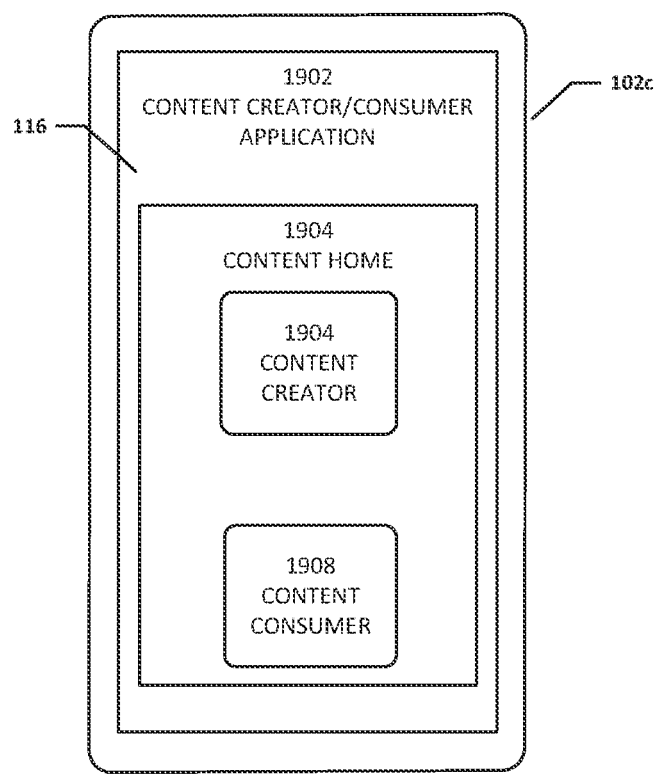
FIG. 19 is a simplified block diagram of a portion of a system to help enable the creation of, distribution of, and/or access to content, in accordance with an embodiment of the present disclosure.

Turning to FIG. 19, FIG. 19 is a simplified block diagram of a content application home page 1904 of a content creator/consumer application 1902 configured to help enable the creation of, distribution of, and/or access to content, in accordance with an embodiment of the present disclosure. The content application home page 1904 can be a home page that is first displayed to the user when the user opens the content creator/consumer application 1902. The content creator/consumer application 1902 can include all or one or more pages of the content creator application 214 and/or the content consumer application 1502.

As illustrated in FIG. 19, the content application home page 1904 can be displayed on the display 116 of an electronic device 102c. The content application home page 1904 can include a content creator interface page link 1906 and a content consumer interface page link 1908. The content creator interface page link 1906 can allow the content creator user to access the content creator interface page 202 of the content creator application 214 illustrated in FIG. 2. The content consumer interface page link 1908 can allow the content consumer user to access a content consumer interface page (e.g., the content consumer interface page 2002 of the content consumer application 1502 illustrated in FIG. 20). Note that the content creator/consumer application 1902, the content creator application 214, and the content consumer application 1502 can be web-based applications. Also, the content creator application 214 and the content consumer application 1502 can each be a stand-alone web-based application.

Figure 20:
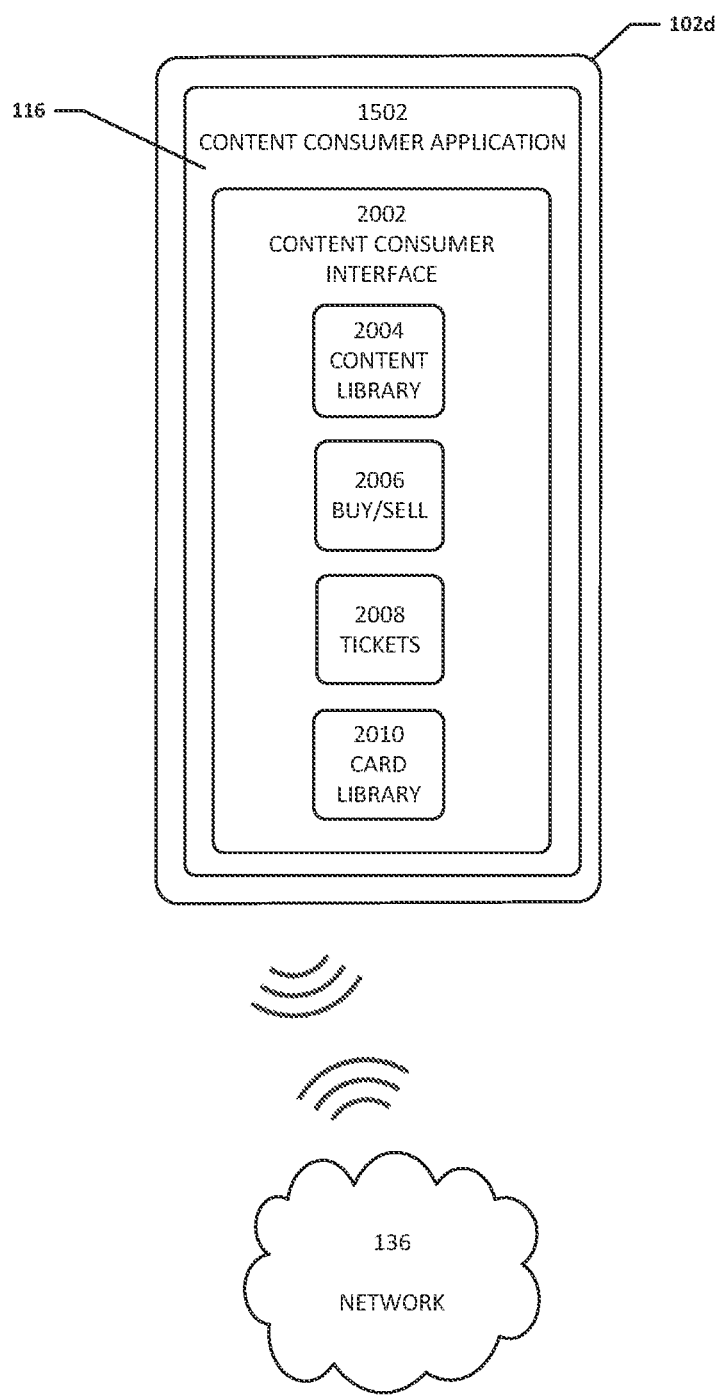
FIG. 20 is a simplified block diagram of a portion of a system to help enable the creation of, distribution of, and/or access to content, in accordance with an embodiment of the present disclosure.

Turning to FIG. 20, FIG. 20 is a simplified block diagram of a content consumer interface page 2002 configured to help enable the creation of, distribution of, and/or access to content, in accordance with an embodiment of the present disclosure. The content consumer interface page 2002 can be accessed by the application home page link 1504 (illustrated in FIG. 15) and the content consumer interface page link 1908 (illustrated in FIG. 19). The content consumer interface page 2002 is a part of the content consumer application 1502 illustrated in FIG. 15. As illustrated in FIG. 20, the content consumer interface page 2002 can be displayed on the display 116 of an electronic device 102d. The content consumer interface page 2002 can include a content library page link 2004, a buy/sell content page link 2006, a tickets page link 2008, and a card library page link 2010.

It should be noted that the system may include a login page (not shown) to verify the content creator user and allow the content creator user to access the content consumer interface page 2002. For example, the login page can be configured to authenticate the content creator user and allow the content creator user to access the content consumer interface page 2002. The login process can use biometric authentication, alphanumeric authentication, and/or some other type of authentication that can be used to verify the identity of the content creator user. Once the identity of the content creator user is verified, the content creator user can be allowed to access the content consumer interface page 2002. In some examples, the system does not include a login page. For example, the system may not require a login or the system may use the electronic device's user authentication system. More specifically, if the content creator user is using the electronic device, the system can determine that the content creator user has already been authenticated by the content creator user device.

Figure 21:
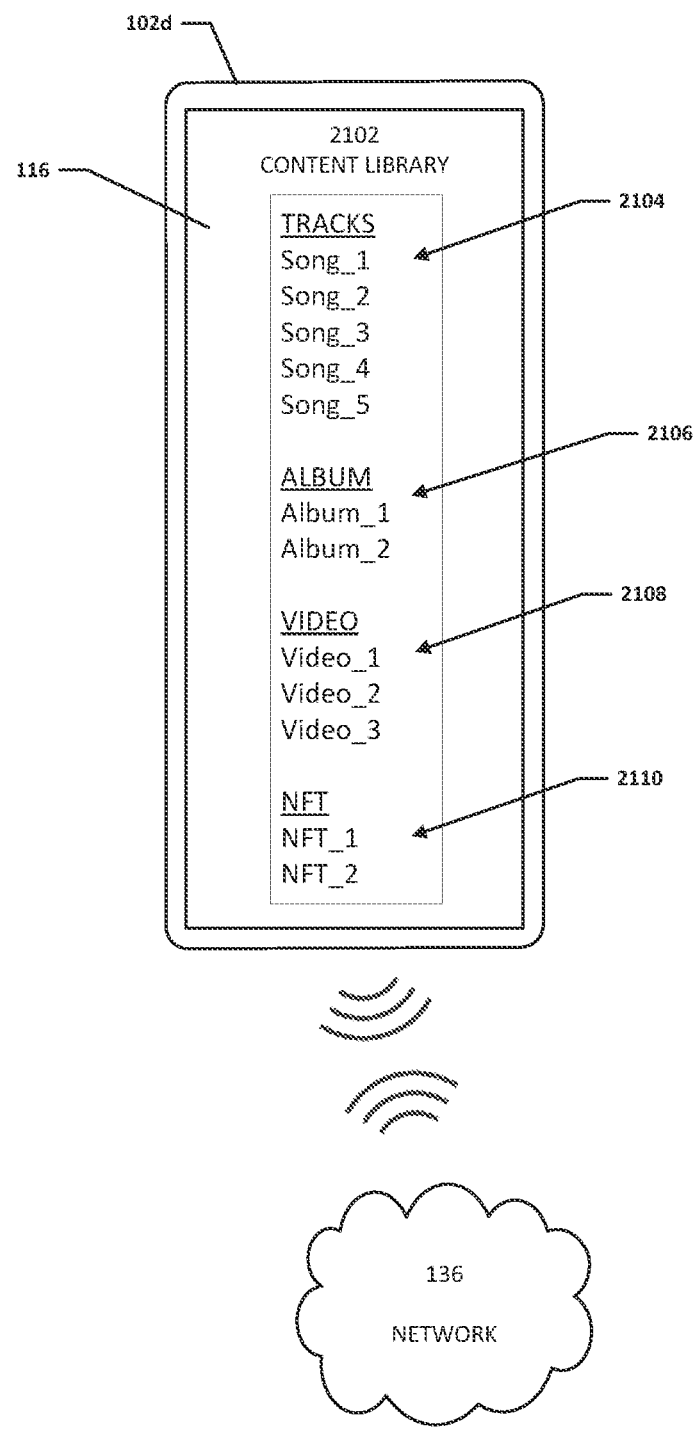
FIG. 21 is a simplified block diagram of a portion of a system to help enable the creation of, distribution of, and/or access to content, in accordance with an embodiment of the present disclosure.

Turning to FIG. 21, FIG. 21 is a simplified block diagram of a content library page 2102 configured to help enable the creation of, distribution of, and/or access to content, in accordance with an embodiment of the present disclosure. The content library page 2102 can be accessed by the content consumer user using the content library page link 2004 in the content consumer interface page 2002 (illustrated in FIG. 20). The content library page 2102 is a part of the content consumer application 1502 illustrated in FIG. 15.

As illustrated in FIG. 21, the content library page 2102 can be displayed on the display 116 of the electronic device 102d. In an illustrative example, if the content is content from one or more musicians, the content library page 2102 can include a song or track section 2104, an album section 2106, a video section 2108, and an NFT 2110 section. The track section 2104 can include one or more songs or music (e.g., a baseline, instrument solo, vocal recordings, etc.) that have been purchased by the content consumer user and/or downloaded onto the electronic device 102d when a content distribution card was activated. If the content consumer user has not purchased any songs or music or has not activated a content distribution card, then the track section 2104 may be blank. The album section 2106 can include one or more albums that have been purchased by the content consumer user and/or downloaded onto the electronic device 102d when a content distribution card was activated. If the content consumer user has not purchased any albums or has not activated a content distribution card, then the album section 2106 may be blank. The video section 2108 can include one or more videos that have been purchased by the content consumer user and/or downloaded onto the electronic device 102d when a content distribution card was activated. If the content consumer user has not purchased any videos or has not activated a content distribution card, then the video section 2108 may be blank. The NFT section 2110 can include artwork, performances, pictures, video recordings, voice recordings, etc. that have been purchased by the content consumer user and/or downloaded onto the electronic device 102d when a content distribution card was activated. If the content consumer user has not purchased any NFTs or has not activated a content distribution card, then the NFT section 2110 may be blank. The information, data, etc., or at least a portion of the information, data, etc., on the content library page 2102 can be stored, created, and/or accessed from the cloud services 108 (not shown), the server 110 (not shown), and/or one or more network elements 112 (not shown) using the network 136.

Figure 22:
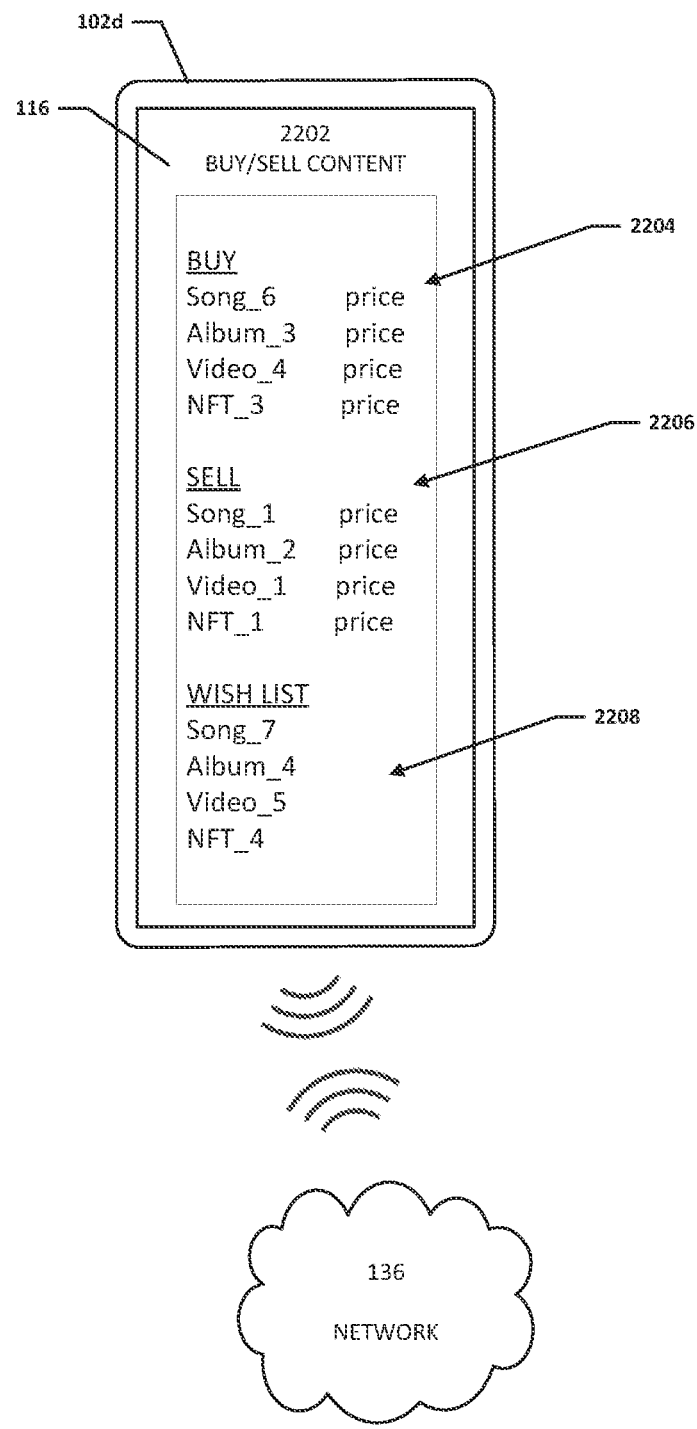
FIG. 22 is a simplified block diagram of a portion of a system to help enable the creation of, distribution of, and/or access to content, in accordance with an embodiment of the present disclosure.

Turning to FIG. 22, FIG. 22 is a simplified block diagram of a buy/sell content page 2202 configured to help enable the creation of, distribution of, and/or access to content, in accordance with an embodiment of the present disclosure. The buy/sell content page 2202 can be accessed by the content consumer user using the buy/sell content page link 2006 on the content consumer interface page 2002 (illustrated in FIG. 20). The buy/sell content page 2202 is a part of the content consumer application 1502 illustrated in FIG. 15.

As illustrated in FIG. 22, the buy/sell content page 2202 can be displayed on the display 116 of the electronic device 102d. The buy/sell content page 2202 can include a list of content for purchase section 2204, a list of content the content consumer user is trying to sell section 2206, and a wish list of content section 2208. The list of items for purchase section 2204 can include a listing of items that the content user can purchase. More specifically, if the content is music, sound, or from a musician, the list of content for purchase section 2204 can include songs, albums, videos, NFTs, and other content from one or more musicians. The content for sale may be from the musician or from other content consumer users. The list of content the content consumer user is trying to sell section 2206 can include a listing of content that the content consumer user is trying to sell. More specifically, if the content is music, sound, or from a musician, the list of content the content consumer user is trying to sell section 2206 can include songs, albums, videos, NFTs, and other content from one or more musicians. The wish list of content section 2208 can include a list of content the content consumer user wants to purchase. More specifically, if the content is music, sound, or from a musician, the wish list of content section 2208 can include songs, albums, videos, NFTs, and other content from one or more musicians that the content consumer user wants to acquire. The information, data, etc., or at least a portion of the information, data, etc., on the buy/sell content page 2202 can be stored, created, and/or accessed from the cloud services 108 (not shown), the server 110 (not shown), and/or one or more network elements 112 (not shown) using the network 136.

Figure 23:
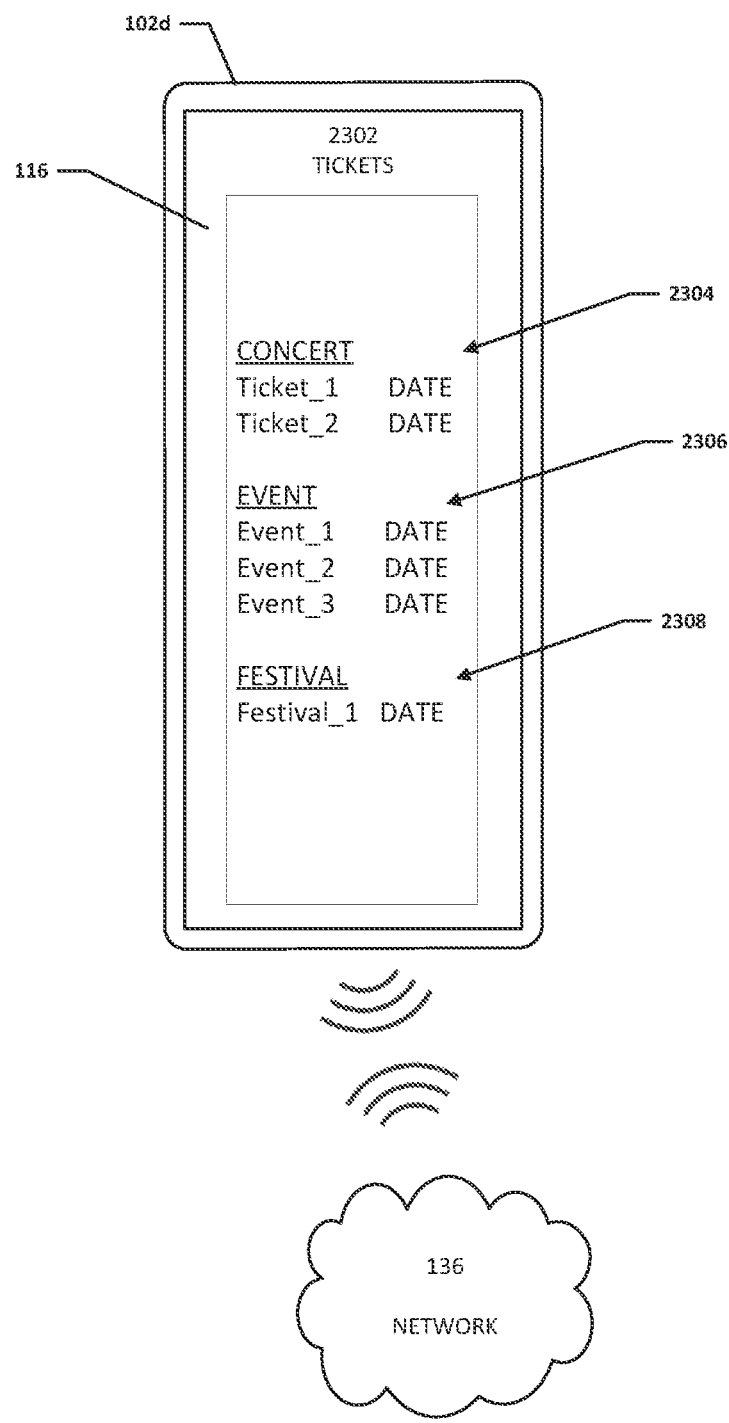
FIG. 23 is a simplified block diagram of a portion of a system to help enable the creation of, distribution of, and/or access to content, in accordance with an embodiment of the present disclosure.

Turning to FIG. 23, FIG. 23 is a simplified block diagram of a tickets page 2302 configured to help enable the creation of, distribution of, and/or access to content, in accordance with an embodiment of the present disclosure. The tickets page 2302 can be accessed by the content consumer user using the tickets page link 2008 on the content consumer interface page 2002 (illustrated in FIG. 20). The tickets page 2302 is a part of the content consumer application 1502 illustrated in FIG. 15.

As illustrated in FIG. 23, the tickets page 2302 can be displayed on the display 116 of the electronic device 102d. The tickets page 2302 can include a list of concerts section 2304, a list of events section 2306, and a list of festival section 2308. The list of concerts section 2304 can include a listing of concerts that the content consumer user has a ticket to attend and/or has attended. The list of events section 2306 can include a listing of events that the content consumer user has a ticket to attend and/or has attended. The events in the list of events section 2306 can include meet and greet events, special promotion events, release dates of new content, etc. that the user has a ticket to attend and/or has attended. The list of festival section 2308 can include a list of festivals that the content consumer user has a ticket to attend or has attended. Note that the term "ticket" includes, tickets, passes, entry credentials, etc. that will allow the content consumer access or entry to view, attend, participate in, etc. the content. The information, data, etc., or at least a portion of the information, data, etc., on the tickets page 2302 can be stored, created, and/or accessed from the cloud services 108 (not shown), the server 110 (not shown), and/or one or more network elements 112 (not shown) using the network 136.

Figure 24:
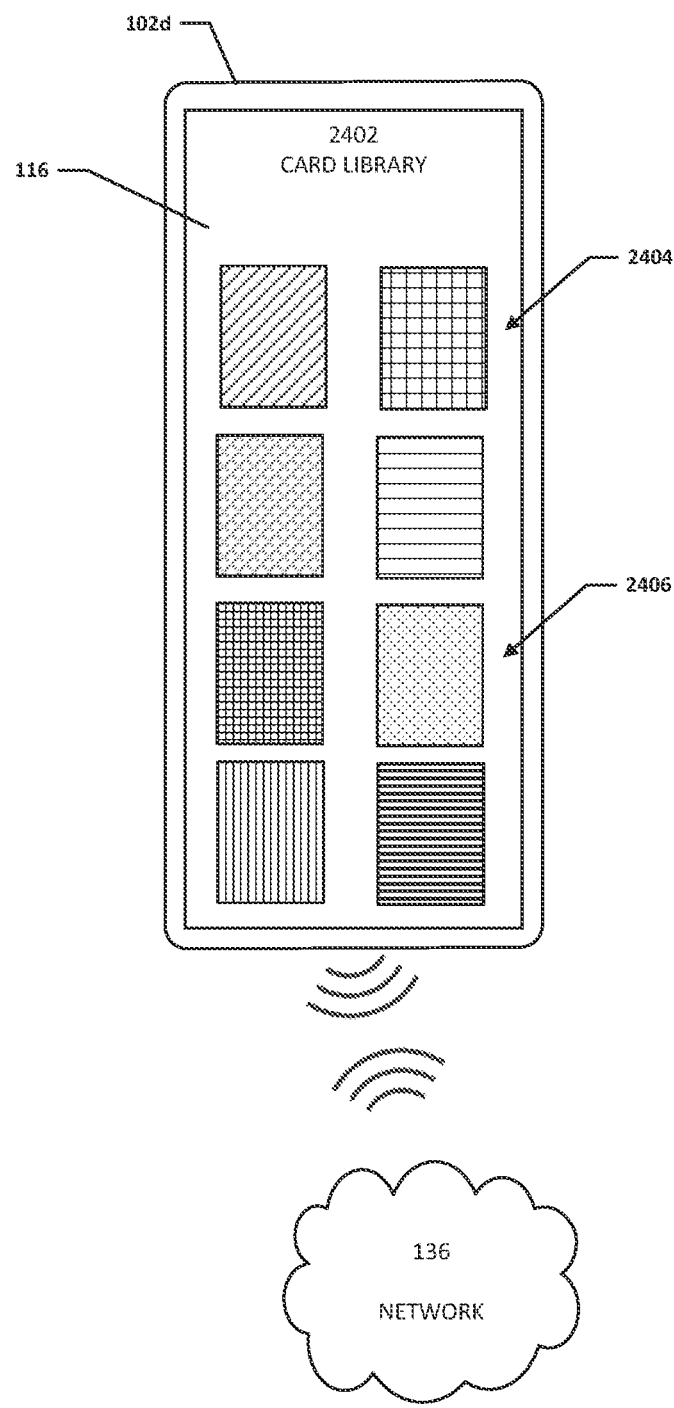
FIG. 24 is a simplified block diagram of a portion of a system to help enable the creation of, distribution of, and/or access to content, in accordance with an embodiment of the present disclosure.

Turning to FIG. 24, FIG. 24 is a simplified block diagram of a card library page 2402 configured to help enable the creation of, distribution of, and/or access to content, in accordance with an embodiment of the present disclosure. The card library page 2402 can be accessed by the content consumer user using the card library page link 2010 on the content consumer interface page 2002 (illustrated in FIG. 20). The card library page 2402 is a part of the content consumer application 1502 illustrated in FIG. 15.

As illustrated in FIG. 24, the card library page 2402 can be displayed on the display 116 of the electronic device 102d. The card library page 2402 can include a list of content distribution cards section 2404 and a list of ticket content distribution cards section 2406. The card library page 2402 allows the content consumer user to "show off" or display content distribution cards the content consumer as purchased. For example, if a special concert was attended by the content consumer user, the card library page 2402 allows the content consumer user to display or "show off" that they had attended the special concert.

The list of content distribution cards section 2404 can include a digital representation of the content distribution cards that the content consumer user has purchased. More specifically, if the content is music, sound, or from a musician, the list of content distribution cards section 2404 can include a digital representation of content distribution cards associated with songs, albums, videos, NFTs, and other content from one or more musicians that the content consumer user has purchased. The list of ticket content distribution cards section 2406 can include a listing of ticket content distribution cards that the content consumer user has purchased. More specifically, if the content is music, sound, or from a musician, the list of ticket content distribution cards section 2406 can include tickets content distribution cards for concerts, events, festivals and other tickets associated with one or more musicians that the content consumer user has purchased. The information, data, etc., or at least a portion of the information, data, etc., on the card library page 2402 can be stored, created, and/or accessed from the cloud services 108 (not shown), the server 110 (not shown), and/or one or more network elements 112 (not shown) using the network 136.

Figure 25:
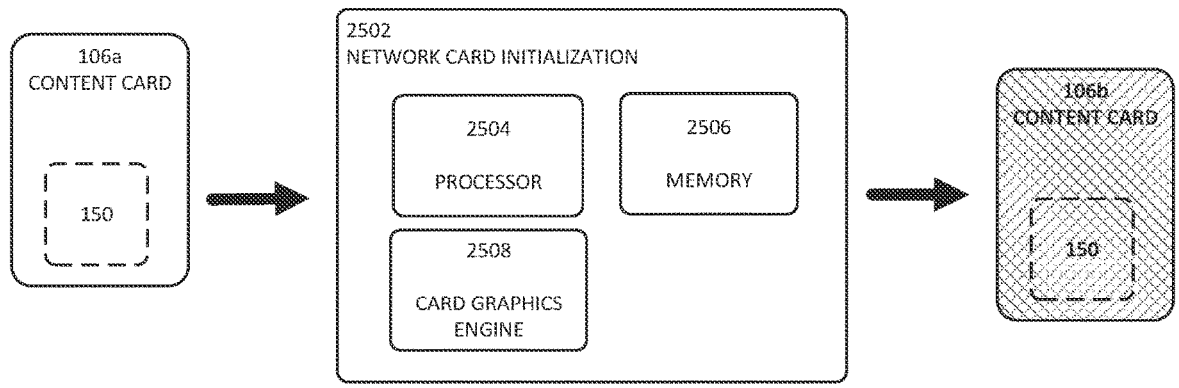
FIG. 25 is a simplified block diagram of a portion of a system to help enable the creation of, distribution of, and/or access to content, in accordance with an embodiment of the present disclosure.

Turning to FIG. 25, FIG. 25 is a simplified block diagram of a network card initialization device 2502 configured to help enable the creation of, distribution of, and/or access to content, in accordance with an embodiment of the present disclosure. The network card initialization device 2502 can include one or more processors 2504, memory 2506, and a card graphics engine 2508. The card graphics engine 2508 can be configured to print graphics on a content distribution card 106. More specifically, as illustrated in FIG. 25, the network card initialization device 2502 can receive a blank content distribution card 106a without any graphics on the blank content distribution card 106a. Using the card graphics engine 2508, the network card initialization device 2502 can print or cause a graphic or image to be printed onto the blank content distribution card 106a to create a graphic content distribution card 106b. More specifically, using the card graphic section 1008 on the order cards page 1002 (illustrated in FIG. 10), the content creator user can select graphics, images, artwork, etc. the content creator user may want on the content distribution card. The card graphics engine 2508 can use the graphics, images, artwork, etc. selected by the content creator user and print the graphics, images, artwork, etc. onto the blank content distribution card 106a to create the graphic content distribution card 106b. The graphics, images, artwork, etc. imprinted on the graphic content distribution card 106b does not interfere with the short-ranged communication module 150.

Figure 26:
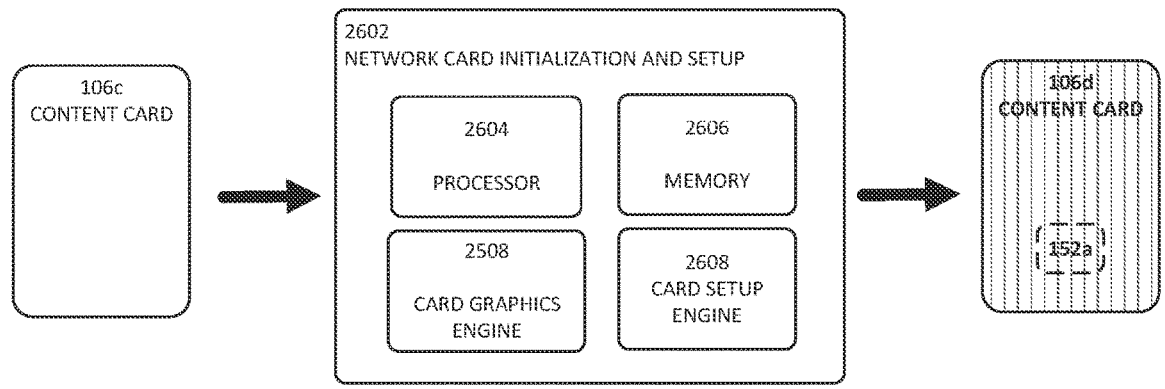
FIG. 26 is a simplified block diagram of a portion of a system to help enable the creation of, distribution of, and/or access to content, in accordance with an embodiment of the present disclosure.

Turning to FIG. 26, FIG. 26 is a simplified block diagram of a network card initialization and setup device 2602 configured to help enable the creation of, distribution of, and/or access to content, in accordance with an embodiment of the present disclosure. The network card initialization and setup device 2602 can include one or more processors 2604, memory 2606, a card graphics engine 2508, and a content distribution card setup engine 2608. The card graphics engine 2408 can be configured to print graphics on a content distribution card 106. The content distribution card setup engine 2608 is configured to print a content identifier 152a onto a content distribution card 106.

More specifically, as illustrated in FIG. 26, the network card initialization and setup device 2602 can receive a blank content distribution card 106c without any graphics on the blank content distribution card 106c or a short-ranged communication module 150 in the blank content distribution card 106c. Using the card graphics engine 2408, the network card initialization and setup device 2602 can print or cause a graphic or image to be printed onto the blank content distribution card 106c. In addition, the content distribution card setup engine 2608 can print the content identifier 152a onto the blank content distribution card 106c to create a graphic content identifier content distribution card 106d. The content identifier 152a can be a QR code, bar code, or some other type of symbol, letters, numbers, etc. imprinted onto the graphic content identifier content distribution card 106d. In an example, the content identifier 152a is generated by the content distribution card initialization engine 130 in the electronic device 102 (illustrated in FIG. 11). The electronic device 102 communicates the content identifier 152a and the graphics to be imprinted on the blank content distribution card 106c to the network card initialization and setup device 2602. In other examples, the content distribution card initialization engine 130 in the electronic device 102 (Illustrated in FIG. 11) does not generate the content identifier 152a. Instead, the content distribution card setup engine 2608 communicates with the network content creation and distribution system 104 (not shown) and requests the content identifier 152a from the network content creation and distribution system 104.

Figure 27:
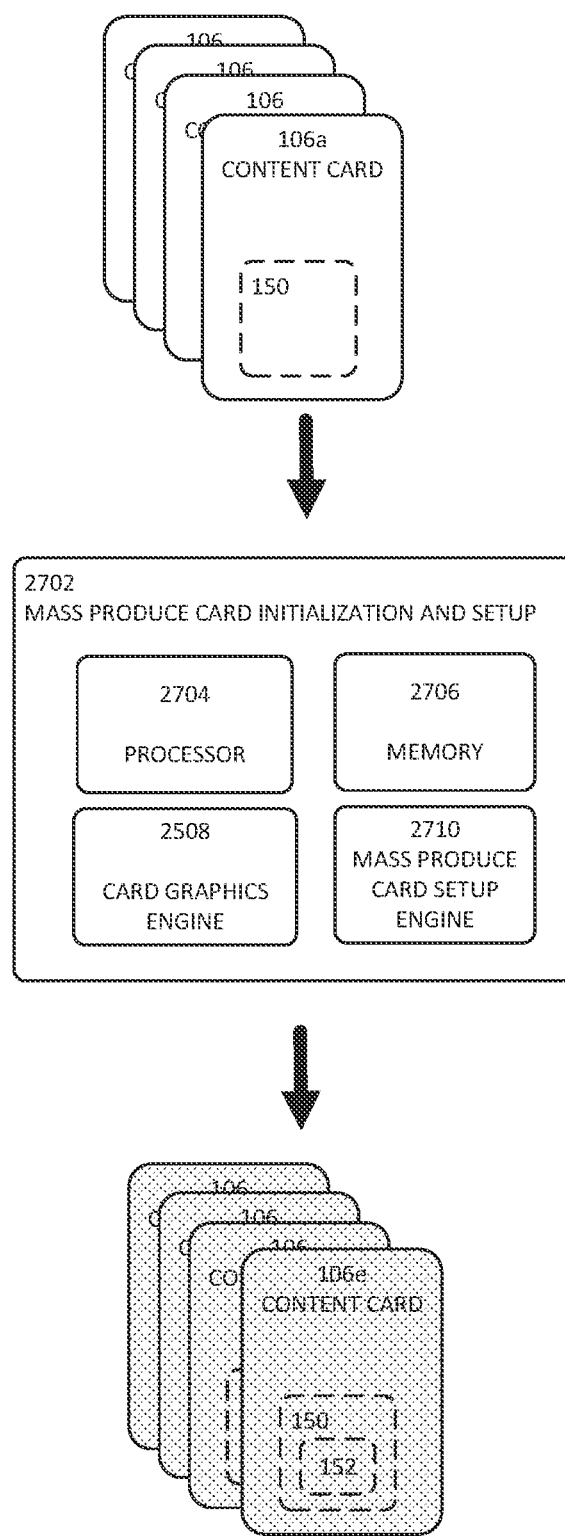
FIG. 27 is a simplified block diagram of a portion of a system to help enable the creation of, distribution of, and/or access to content, in accordance with an embodiment of the present disclosure.

Turning to FIG. 27, FIG. 27 is a simplified block diagram of a mass produce card initialization and setup device 2702 configured to help enable the creation of, distribution of, and/or access to content, in accordance with an embodiment of the present disclosure. The mass produce card initialization and setup device 2702 can include one or more processors 2704, memory 2706, a card graphics engine 2408, and a mass produce card setup engine 2710. The card graphics engine 2408 can be configured to print graphics on a content distribution card 106. The mass produce card setup engine 2710 can write the content identifier 152 to the content distribution card 106. The mass produce card initialization and setup device 2702 can be configured to mass produce, or generate 10 s or 100 s of content distribution cards 106 in a relatively short amount of time (e.g., less than about 1 minute).

As illustrated in FIG. 27, the mass produce card initialization and setup device 2702 can receive the blank content distribution card 106a without any graphics on the blank content distribution card 106a. Using the card graphics engine 2408, the mass produce card initialization and setup device 2702 can print or cause a graphic or image to be printed onto the blank content distribution card 106a. In addition, the mass produce card setup engine 2710 communicates the content identifier 152 to the short-ranged communication module 150 in the content distribution card 106 and the content identifier 152 is stored on the content distribution card 106.

In an example, the content identifier 152 is generated by the content distribution card initialization engine 130 in the electronic device 102 (illustrated in FIG. 11). The electronic device 102 communicates the content identifier 152a and the graphics to be imprinted on the blank content distribution card 106c to the mass produce card initialization and setup device 2702. In other examples, the content distribution card initialization engine 130 in the electronic device 102 (Illustrated in FIG. 11) does not generate the content identifier 152a. Instead, the mass produce card initialization and setup device 2702 communicates with the network content creation and distribution system 104 (not shown) and requests the content identifier 152a from the network content creation and distribution system 104. The graphics, images, artwork, etc. imprinted on the graphic content distribution card 106b does not interfere with the short-ranged communication module 150.

Turning to FIGS. 28A-28F, FIGS. 28A-28F are a simplified block diagrams of different embodiments of content distribution cards 106 configured to help enable the creation of, distribution of, and/or access to content, in accordance with an embodiment of the present disclosure. Changes, substitutions, variations, alterations, and modifications of the content distribution card 106 as disclosed herein may be ascertained to one skilled in the art and it is intended that the present disclosure encompass all such changes, substitutions, variations, alterations, and modifications as falling within the scope of the appended claims. In addition, changes, substitutions, variations, alterations, and modifications of the electronic device 102 as disclosed herein may be ascertained to one skilled in the art and it is intended that the present disclosure encompass all such changes, substitutions, variations, alterations, and modifications as falling within the scope of the appended claims.

Figure 28A:
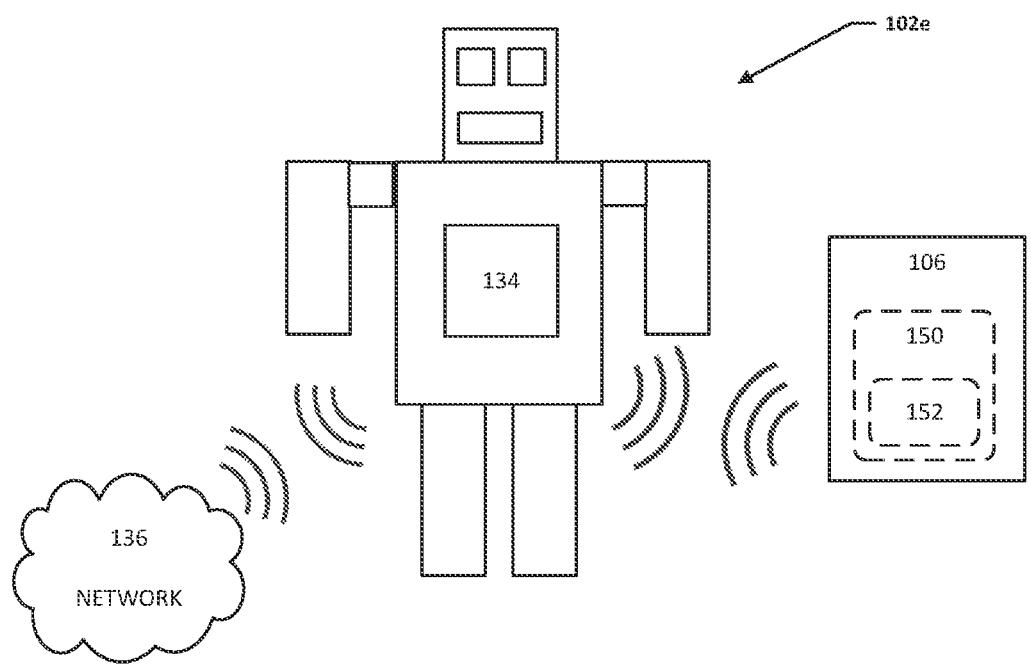
FIGS. 28A-28F are simplified block diagrams illustrating example details of a portion of a system to help enable the creation of, distribution of, and/or access to content, in accordance with an embodiment of the present disclosure.

As illustrated in FIG. 28A, an electronic device 102e can be in the shape of a robot. The electronic device 102e can include the content distribution card reader engine 134 along with one or more processors, memory, speakers, etc. In an example, the content distribution card 106 may be in the shape of a robot or have a graphic of a robot. The content distribution card 106 can include the short-ranged communication module 150 and the content identifier 152. When the content distribution card 106 is brought near the electronic device 102e. The content distribution card reader engine 134 can communicate with the short-ranged communication module 150 and obtain the content identifier 152 from the content distribution card 106. After the content distribution card reader engine 134 has obtained the content identifier 152 from the content distribution card 106, the content identifier 152 is sent (e.g., using the communication engine 124, not shown), using the network 114, to the network content creation and distribution system 104 (not shown) located in the cloud services 108 (not shown), the server 110 (not shown), or the one or more network elements 112 (not shown). The network content creation and distribution system 104 uses the content identifier 152 to search the network content database 140 (not shown) and determine the location of the content associated with the content identifier 152. The cloud services 108, the server 110, or the one or more network elements 112 that received the content identifier 152 from the content consumer's electronic device 102a then sends the content associated with the content identifier 152 to the content consumer's electronic device 102a. In an example, the content may be a song or story that the content consumer's electronic device 102a, shaped like a robot, then communicates to a content consumer user. The content consumer's electronic device 102a may be configured to have movement, such are arm, leg, and eye movement that go along with the story. In a specific example, the content may be a story related to the robot shape of the content consumer's electronic device 102a.

Figure 28B:
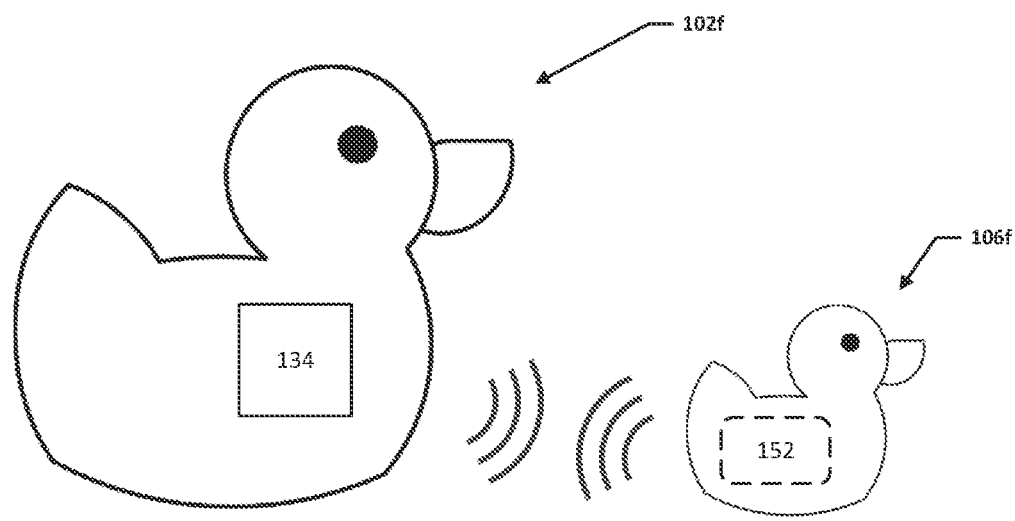

As illustrated in FIG. 28B, an electronic device 102f can be in the shape of a duck. The electronic device 102f can include the content distribution card reader engine 134 along with one or more processors, memory, speakers, etc. In an example, a content distribution card 106f may be in a similar shape of a duck. The content distribution card 106f can include the short-ranged communication module 150 (not shown) and the content identifier 152. When the content distribution card 106f is brought near the electronic device 102f. The content distribution card reader engine 134 can communicate with the short-ranged communication module 150 and obtain the content identifier 152 from the content distribution card 106. After the content distribution card reader engine 134 has obtained the content identifier 152 from the content distribution card 106, the content distribution card reader engine 134 can obtain the content associated with the content identifier 152 (e.g., using the network 114 and the network content creation and distribution system 104 as described above). In an example, the content may be a song or story that the content consumer's electronic device 102a, shaped like a duck, then communicates to a content consumer user.

Figure 28C:
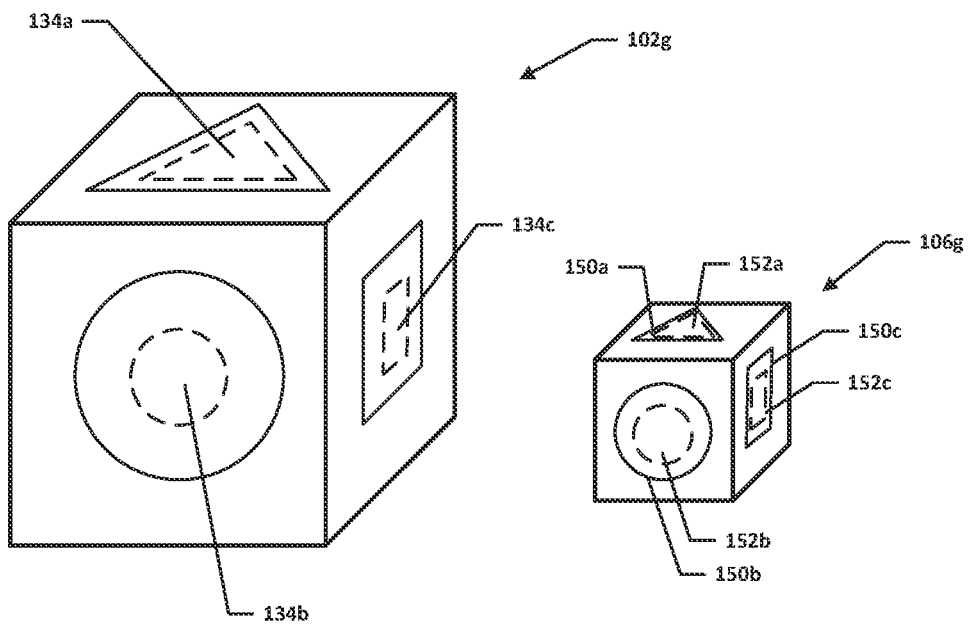

As illustrated in FIG. 28C, an electronic device 102g can be in the shape of a three-dimensional cube. The electronic device 102g can include a plurality of content distribution card reader engines 134 along with one or more processors, memory, speakers, etc. More specifically, as illustrated in FIG. 28C the electronic device 102g can include at least a content distribution card reader engine 134a, a content distribution card reader engine 134b, and a content distribution card reader engine 134c. In some examples, each side of the cube can have the content distribution card reader engine 134. Also, each side of the cube may have a unique shape.

A cubed content distribution card 106g can have a similar shape of a cube with each side of the cubed content distribution card 106g having a corresponding shape that matches a shape on the electronic device 102g. The cubed content distribution card 106g can include a plurality of short ranged communication modules 150 and a plurality of content identifiers 152. More specifically, as illustrated in FIG. 28C the cubed content distribution card 106g can include at least a short-ranged communication module 150a and a content identifier 152b, a short-ranged communication module 150b and a content identifier 152c, and a short-ranged communication module 150c and a content identifier 152d. In some examples, each side of the cube can include the short-ranged communication module 150 and a content identifier 152. Each of the short-ranged communication modules 150 can have a unique shape that corresponds to a unique shape on the electronic device 102g.

When the cubed content distribution card 106g is brought near the electronic device 102g, if the shape on the side of the matches the shape on the side of the cube, then the content distribution card reader engine 134 is triggered and reads the corresponding content identifier in the cubed content distribution card 106g. For example, if the side of the cubed content distribution card 106g that includes the content identifier 152b is brought near the side of the electronic device 102g that includes a similar shape as the short-ranged communication module 150a (e.g., a triangle), the content distribution card reader engine 134a can communicate with the short-ranged communication module 150a and obtain the content identifier 152b from the cubed content distribution card 106g. If the side of the cubed content distribution card 106g that include the content identifier 152b is brought near the side of the electronic device 102g that does not include a similar shape as the short-ranged communication module 150a (e.g., a circle or square), the content distribution card reader engine 134a does not communicate with the short-ranged communication module 150a and the content identifier 152b is not obtained from the cubed content distribution card 106g. After the content distribution card reader engine 134 has obtained the content identifier 152b from the content distribution card 106, the content distribution card reader engine 134 can obtain the content associated with the content identifier 152 (e.g., using the network 114 and the network content creation and distribution system 104 as described above). In an example, the content may be a song or story that the content consumer's electronic device 102a then communicates to a content consumer user. In some examples, the content may be a simple phrase like "you matched the triangles" and then a short song is communicated to the content consumer user.

Figure 28D:
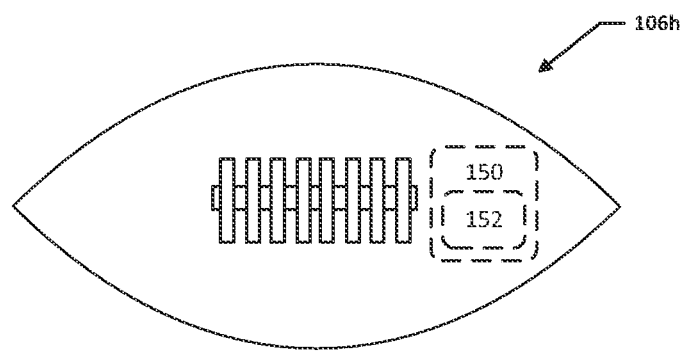

As illustrated in FIG. 28D, a content distribution card 106h can be in the shape of a football or some other shape that matches or is associated with a specific event. The content distribution card 106h can include the short-ranged communication module 150 and the content identifier 152. In some examples, the content identifier 152 is a ticket to the specific event that is associated with the content distribution card 106h (e.g., an American football game). When the content distribution card 106h is brought near the entry gate to the specific event that is associated with the content distribution card 106h, a content distribution card reader engine (e.g., the content distribution card reader engine 134 located in an electronic device at the entry gate) can communicate with the short-ranged communication module 150 and obtain the content identifier 152 from the content distribution card 106h and allow the content consumer user of the content distribution card 106h to enter the specific event.

In some examples, after the content consumer user has gained entry to the specific event, when the content distribution card 106h is brought near the content consumer user's electronic device (e.g., a smart phone), a content distribution card reader engine in the content consumer user's electronic device can communicate with the short-ranged communication module 150 and obtain the content identifier 152 from the content distribution card 106h. After the content distribution card reader engine has obtained the content identifier 152 from the content distribution card 106h, the content distribution card reader engine in the content consumer user's electronic device can obtain the content associated with the content identifier 152 (e.g., using the network 114 and the network content creation and distribution system 104 as described above). In an example, the content may be a map to the ticketed seats of the content consumer user, a backstage pass, special VIP content for the specific event, a summary and/or analysis (e.g., in real time or near real time) of the specific event, etc.

Figure 28E:
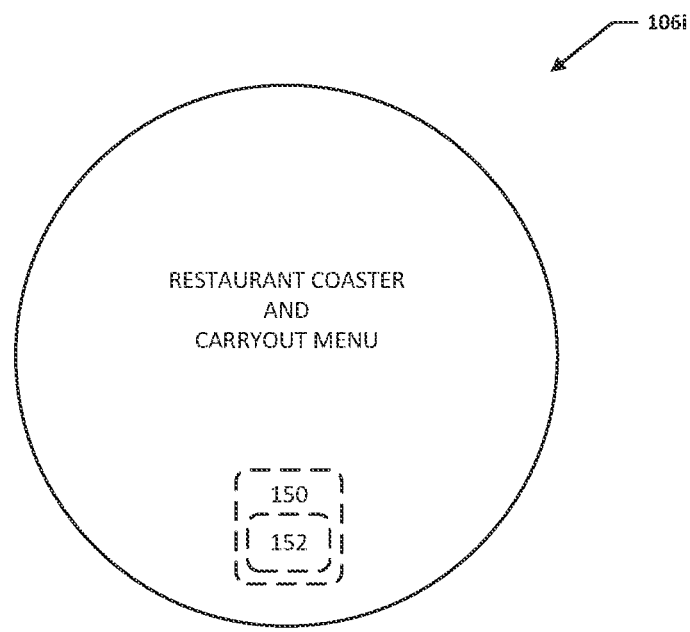

As illustrated in FIG. 28E, a content distribution card 106i can be in the shape of a coaster or some other shape that matches or is associated with a restaurant or drinking establishment. The content distribution card 106i can include the short-ranged communication module 150 and the content identifier 152. In some examples, the content identifier 152 is an online menu or take out menu. When the content distribution card 106i is brought near brought near a user's electronic device (e.g., a smart phone), a content distribution card reader engine (e.g., the content distribution card reader engine 134) can communicate with the short-ranged communication module 150 and obtain the content identifier 152 from the content distribution card 106i. After the content distribution card reader engine has obtained the content identifier 152 from the content distribution card 106i, the content distribution card reader engine can obtain the content associated with the content identifier 152 (e.g., using the network 114 and the network content creation and distribution system 104 as described above). In an example, the content may be an online menu or take out menu. Due to the functionality of the content distribution card 106i being in the shape of a coaster, a user may be more likely to keep the content distribution card 106i and use the content distribution card 106i as a coaster, thereby creating advertising for the restaurant or drinking establishment associated with the content distribution card 106i.

Figure 28F:
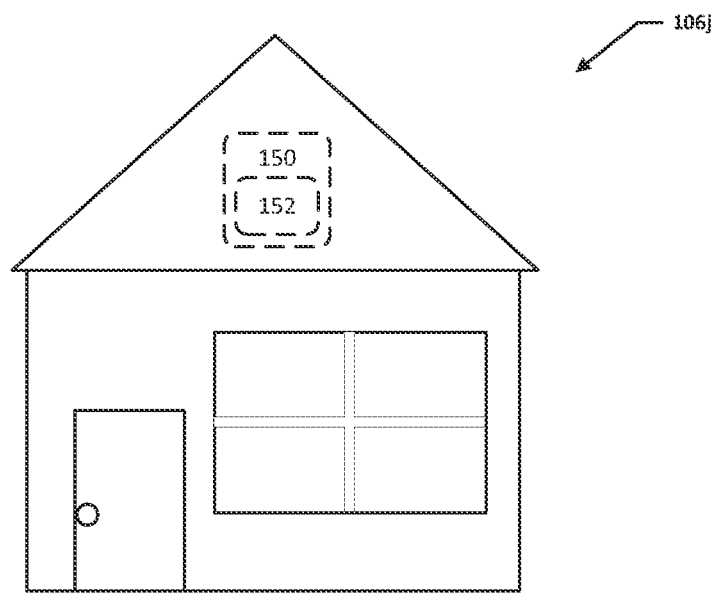

As illustrated in FIG. 28F, a content distribution card 106j can be in the shape of a promotional item or an item for sale. More specifically, as illustrated in FIG. 27F, the content distribution card 106j can be in the shape of a house for sale. The content distribution card 106j may have printed graphics that match the exterior of the house for sale. The content distribution card 106j can include the short-ranged communication module 150 and the content identifier 152. In some examples, the content identifier 152 is specific information related to the promotional item or item for sale that is associated with the content distribution card 106j.

When the content distribution card 106j is brought near brought near a user's electronic device (e.g., a smart phone), a content distribution card reader engine (e.g., the content distribution card reader engine 134) can communicate with the short-ranged communication module 150 and obtain the content identifier 152 from the content distribution card 106*j*. After the content distribution card reader engine has obtained the content identifier 152 from the content distribution card 106*j*, the content distribution card reader engine can obtain the content associated with the content identifier 152 (e.g., using the network 114 and the network content creation and distribution system 104 as described above). In an example, the content may be specific information related to the promotional item or item for sale that is associated with the content distribution card 106*j*. Due to the shape of the content distribution card 106*j*, and in some examples, the graphics on the content distribution card, being related to the specific promotional item or item for sale that is associated with the content distribution card 106*j*, a user may be more likely to keep the content distribution card 106*j* and thereby create more of an interest in the promotional item or item for sale that is associated with the content distribution card 106*j*.

Figure 29:
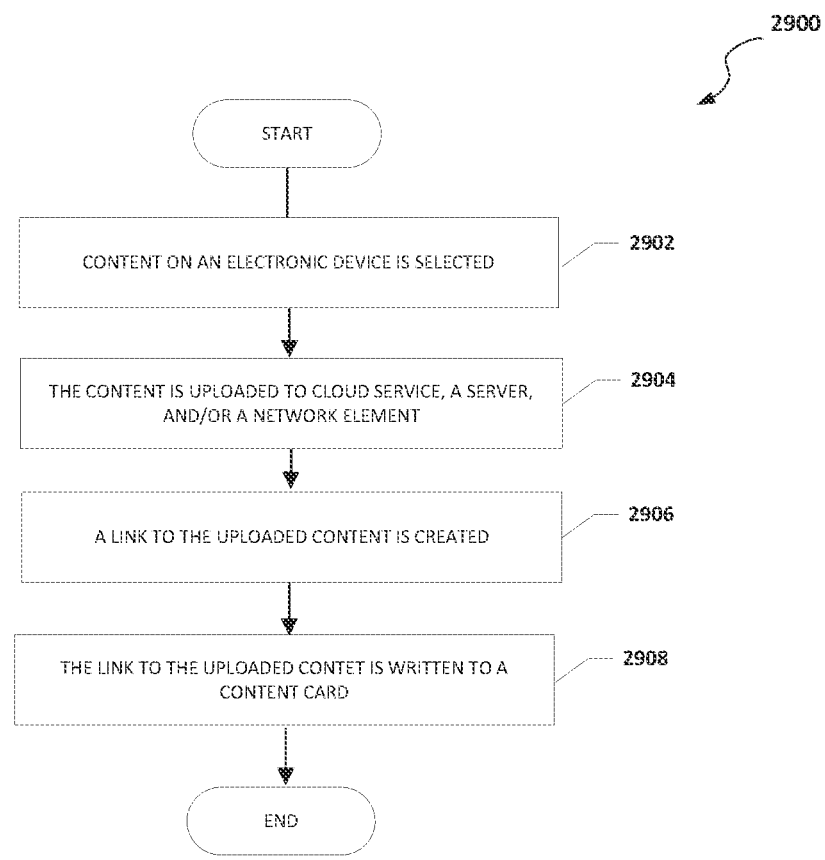
FIG. 29 is a simplified flowchart illustrating potential operations that may be associated with the system in accordance with an embodiment of the present disclosure.

Turning to FIG. 29, FIG. 29 is an example flowchart illustrating possible operations of a flow 2900 that may be associated with enabling the creation of, distribution of, and/or access to content, in accordance with an embodiment. In an embodiment, one or more operations of flow 2900 may be performed by the communication engine 124, the display engine 126, the content distribution card initialization engine 130, the content distribution card reader engine 134, the network content creation and distribution system 104 and the network marketplace engine 142. At 2902, content on an electronic device is selected. At 2904, the content is uploaded to cloud services, a server, and/or one or more network elements. At 2906, a link to the uploaded content is created. At 2908, the link to the uploaded content is written to a content distribution card. In some examples, a hash of the link to the uploaded content is written to the content distribution card.

Figure 30:
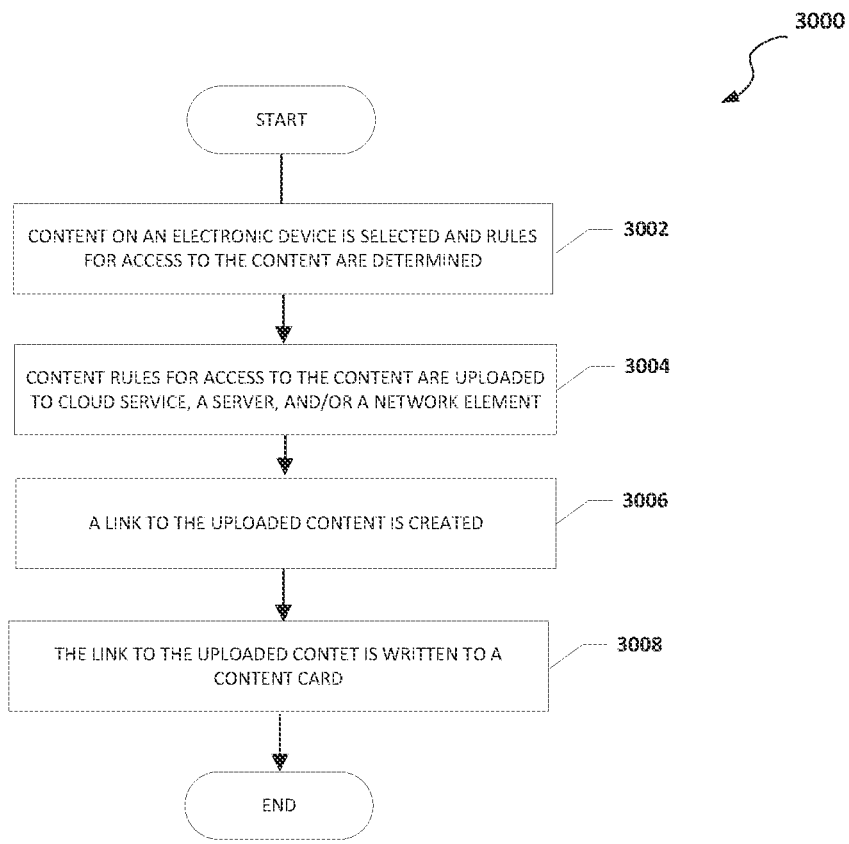
FIG. 30 is a simplified flowchart illustrating potential operations that may be associated with the system in accordance with an embodiment of the present disclosure.

Turning to FIG. 30, FIG. 30 is an example flowchart illustrating possible operations of a flow 3000 that may be associated with enabling the creation of, distribution of, and/or access to content, in accordance with an embodiment. In an embodiment, one or more operations of flow 3000 may be performed by the communication engine 124, the display engine 126, the content distribution card initialization engine 130, the content distribution card reader engine 134, the network content creation and distribution system 104 and the network marketplace engine 142. At 3002, content on an electronic device is selected and rules for access to the content are determined. At 3004, content rules for access to the content are uploaded to cloud services, a server, and/or one or more network elements. For example, the content rules may be that that content can only be accessed a certain number of times (e.g., 3 times), the content can only be accessed for a specific amount of time (e.g., unlimited times in one week), the content is of a lower quality compared to the quality of the content if the content is purchased or the content is a higher quality if the content is purchased, etc. At 3006, the content is uploaded to cloud services, a server, and/or one or more network elements. At 3006, a link to the uploaded content is created. At 3008, the link to the uploaded content is written to a content distribution card. In some examples, a hash of the link to the uploaded content is written to the content distribution card.

Figure 31:
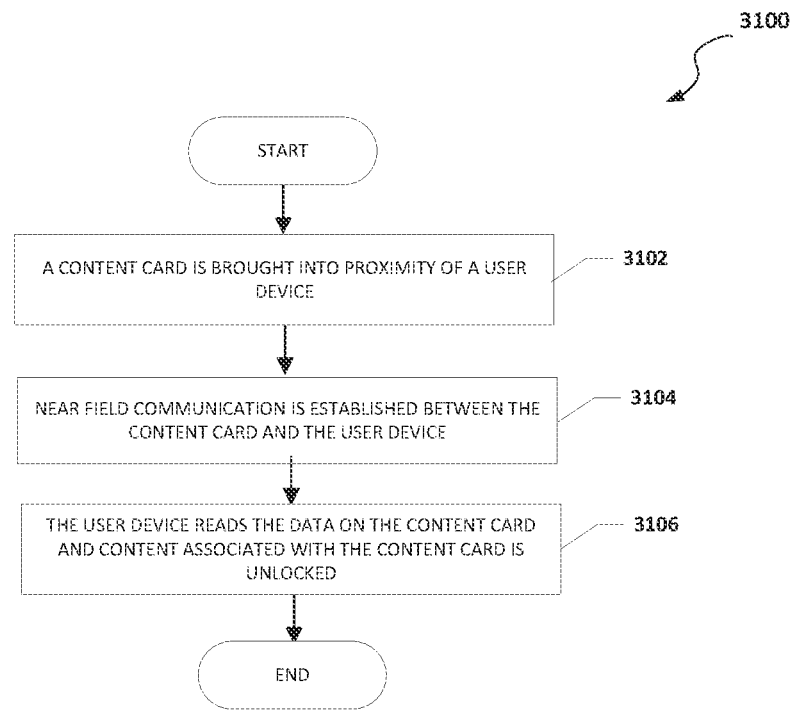
FIG. 31 is a simplified flowchart illustrating potential operations that may be associated with the system in accordance with an embodiment of the present disclosure.

Turning to FIG. 31, FIG. 31 is an example flowchart illustrating possible operations of a flow 3100 that may be associated with enabling the creation of, distribution of, and/or access to content, in accordance with an embodiment. In an embodiment, one or more operations of flow 3100 may be performed by the communication engine 124, the display engine 126, the content distribution card initialization engine 130, the content distribution card reader engine 134, the network content creation and distribution system 104 and the network marketplace engine 142. At 3102, a content distribution card is brought into proximity of a user device. At 3104, near field communication is established between the content distribution card and the content consumer user device. At 3106, the content consumer user device reads the data on the content distribution card and content associated with the content distribution card is unlocked.

Figure 32:
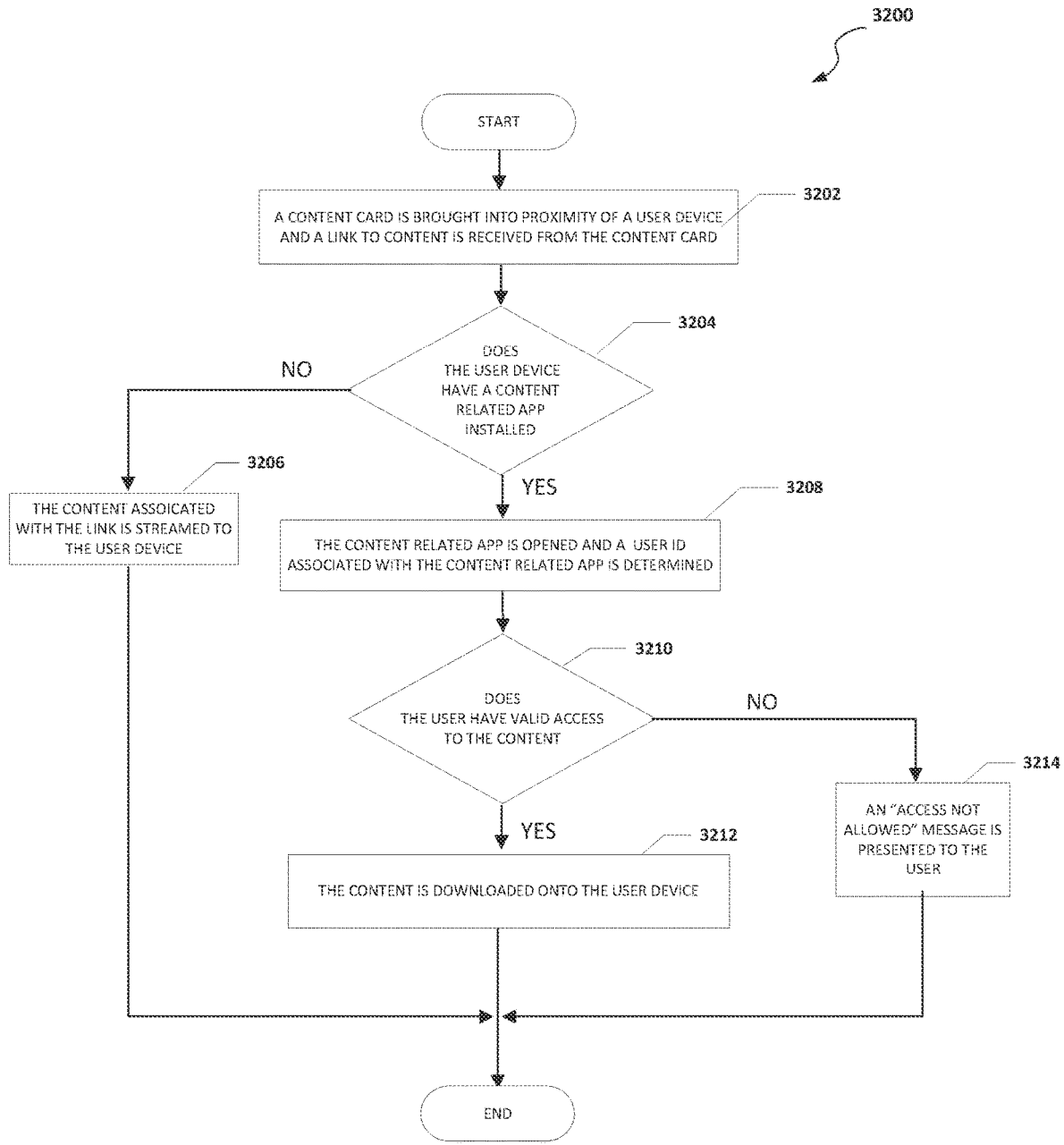
FIG. 32 is a simplified flowchart illustrating potential operations that may be associated with the system in accordance with an embodiment of the present disclosure.

Turning to FIG. 32, FIG. 32 is an example flowchart illustrating possible operations of a flow 3200 that may be associated with enabling the creation of, distribution of, and/or access to content, in accordance with an embodiment. In an embodiment, one or more operations of flow 3200 may be performed by the communication engine 124, the display engine 126, the content distribution card initialization engine 130, the content distribution card reader engine 134, the network content creation and distribution system 104 and the network marketplace engine 142. At 3202, a content distribution card is brought into proximity of a user device and a link to content is received from the content distribution card. At 3204, the system determines if the content consumer user device has a content related application installed on the content consumer user device. For example, the content related application may be the content consumer application 1502 illustrated in FIG. 15 on the content consumer's electronic device 102*b* or some other similar content related application. If the content consumer user device does not have the content related application installed on the content consumer user device, then the content associated with the link is streamed to the content consumer user device, as in 3206. In some examples, the content that is streamed to the content consumer user device is opened or played in a web browser.

If the content consumer user device has the content related application installed on the content consumer user device, then the content related application is opened and a user ID associated with the content related application is determined, as in 3208. At 320, the system determines if the content consumer user has valid access to the content. For example, based on the user ID associated with the content, the system can determine if the content consumer user has exceeded a number of times the content consumer user can access the content, if the content consumer user is a valid purchaser or owner of the content, etc. If the content consumer user has valid access to the content, then the content is downloaded onto the content consumer user device, as in 3212. In some examples, if the content is music or video, the content may be automatically started or "played" for the content consumer user. If the content consumer user does not have valid access to the content, then an "Access Not Allowed" message is presented to the content consumer user, as in 3214. In some examples, the content consumer user is given an option to correct the reasons why access to the content is not allowed. For example, if a rule associated with the content is such that the content consumer user is only allowed to access the content five times and the content consumer user has accessed the content five times, the content consumer user may be given an option to purchase the content.

Figure 33:
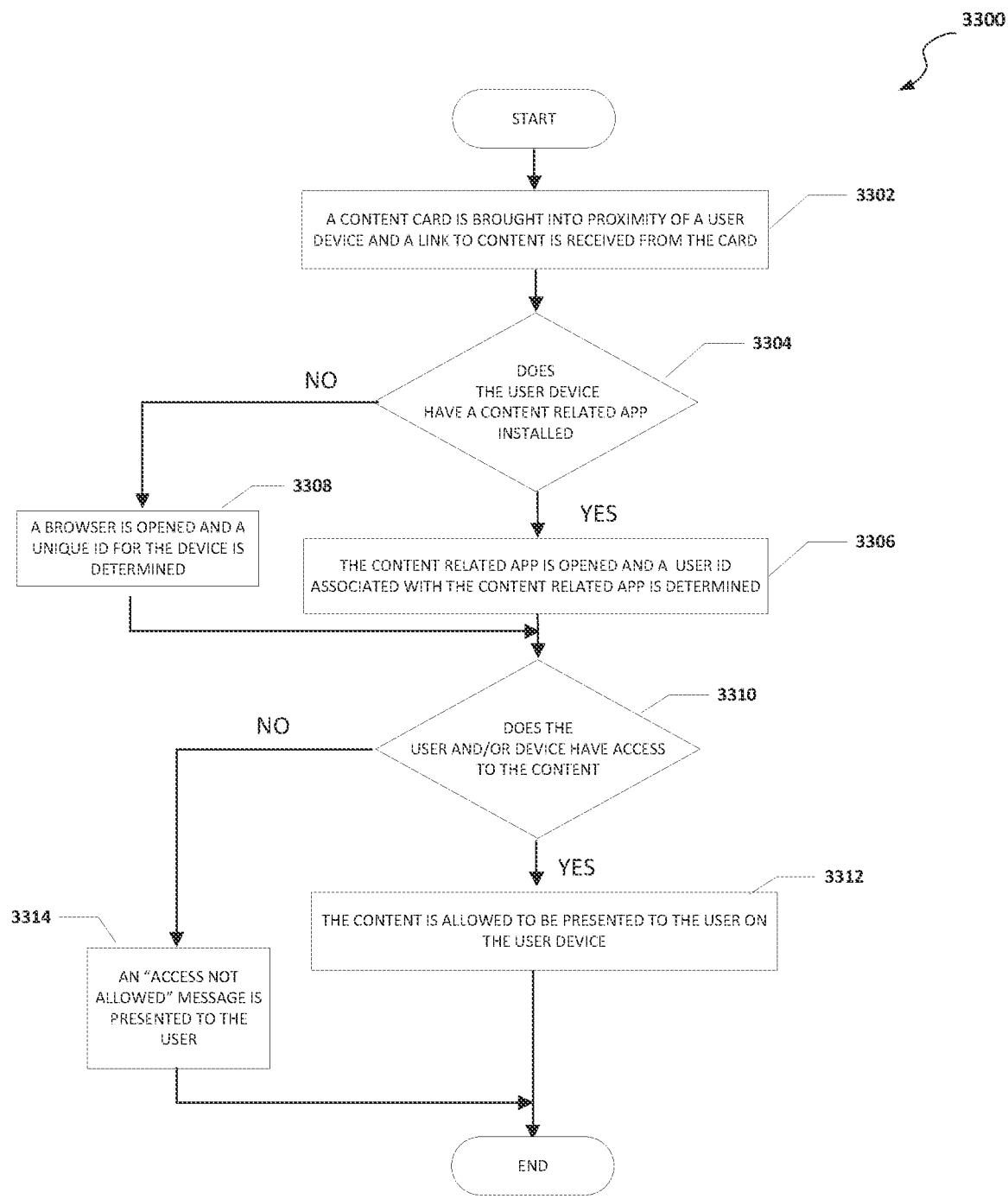
FIG. 33 is a simplified flowchart illustrating potential operations that may be associated with the system in accordance with an embodiment of the present disclosure.

Turning to FIG. 33, FIG. 33 is an example flowchart illustrating possible operations of a flow 3300 that may be associated with enabling the creation of, distribution of, and/or access to content, in accordance with an embodiment. In an embodiment, one or more operations of flow 3300 may be performed by the communication engine 124, the display engine 126, the content distribution card initialization engine 130, the content distribution card reader engine 134, the network content creation and distribution system 104 and the network marketplace engine 142. At 3302, a content distribution card is brought into proximity of a user device and a link to content is received from the content distribution card. At 3304, the system determines if the content consumer user device has a content related application installed on the content consumer user device. For example, the content related application may be the content consumer application 1502 illustrated in FIG. 15 on the content consumer's electronic device 102b or some other similar content related application. If the content consumer user device has the content related application installed on the content consumer user device, then the content related application is opened and a user ID associated with the content related application is determined, as in 3306. If the content consumer user device does not have the content related application installed on the content consumer user device, a web browser is opened on the content consumer user device and a unique ID for the content consumer user device is determined, as in 3308.

At 3310, the system determines if the content consumer user and/or the content consumer user device have valid access to the content. For example, based on the user ID associated with the content or the unique ID for the content consumer user device, the system can determine if the content consumer user and/or content consumer user device has exceeded a number of times the content consumer user and/or the content consumer user device can access the content, if the content consumer user is a valid purchaser or owner of the content, etc. If the content consumer user and/or the content consumer user device has valid access to the content, then the content is allowed to be presented to the content consumer user on the content consumer user device, as in 3312. For example, the content can be streamed to or downloaded onto the content consumer user device. In some examples, if the content is music or video, the content may be automatically started or "played" for the content consumer user. If the content consumer user does not have valid access to the content, then an "Access Not Allowed" message is presented to the content consumer user, as in 3314. In some examples, the content consumer user is given an option to correct the reasons why access to the content is not allowed. For example, if a rule associated with the content is such that the content consumer user is only allowed to access the content ten times and the content consumer user has accessed the content ten times, the content consumer user may be given an option to purchase the content.

Figure 34:
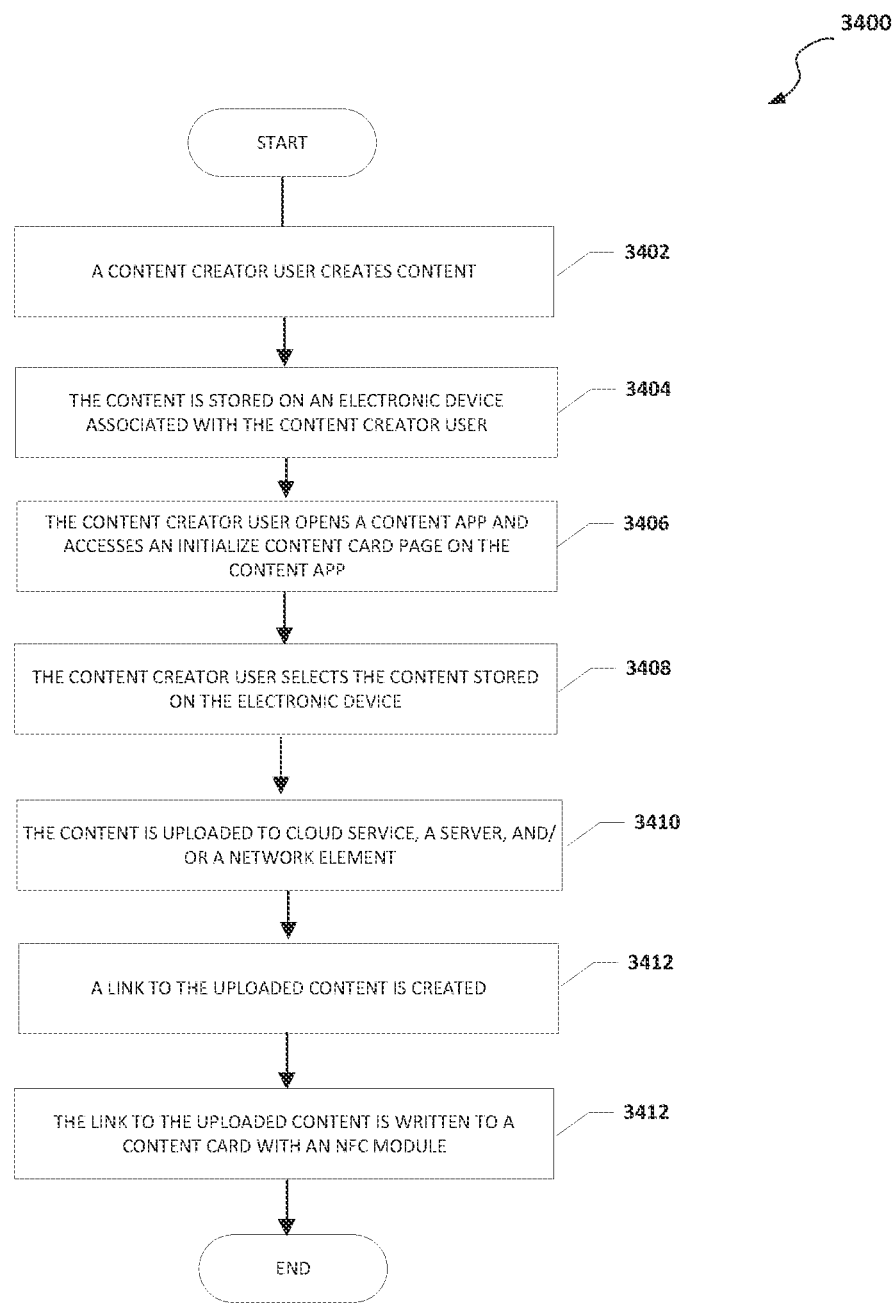
FIG. 34 is a simplified flowchart illustrating potential operations that may be associated with the system in accordance with an embodiment of the present disclosure.

Turning to FIG. 34, FIG. 34 is an example flowchart illustrating possible operations of a flow 3400 that may be associated with enabling the creation of, distribution of, and/or access to content, in accordance with an embodiment. In an embodiment, one or more operations of flow 3400 may be performed by the communication engine 124, the display engine 126, the content distribution card initialization engine 130, the content distribution card reader engine 134, the network content creation and distribution system 104 and the network marketplace engine 142. At 3402, a content creator user creates content. For example, a musician may create a song or album. At 3404, the content is stored on an electronic device associated with the content creator user. For example, the musician can store the song or album on their smartphone. At 3406, the content creator user opens a content application and accesses an initialize content distribution card page on the content application. For example, on their smartphone, the musician can open the content creator interface page 202 illustrated in FIG. 2 on the electronic device 102 and access the initialize card page 1102 illustrated in FIG. 11. At 3408, the content creator user selects the content stored on the electronic device. At 3410, the content is uploaded to cloud services, a server, and/or one or more network elements. At 3412, a link to the uploaded content is created. At 3414, the link to the uploaded content is written to a content distribution card with an NFC module. In some examples, a hash of the link to the uploaded content is written to the content distribution card with the NFC module.

Figure 35:
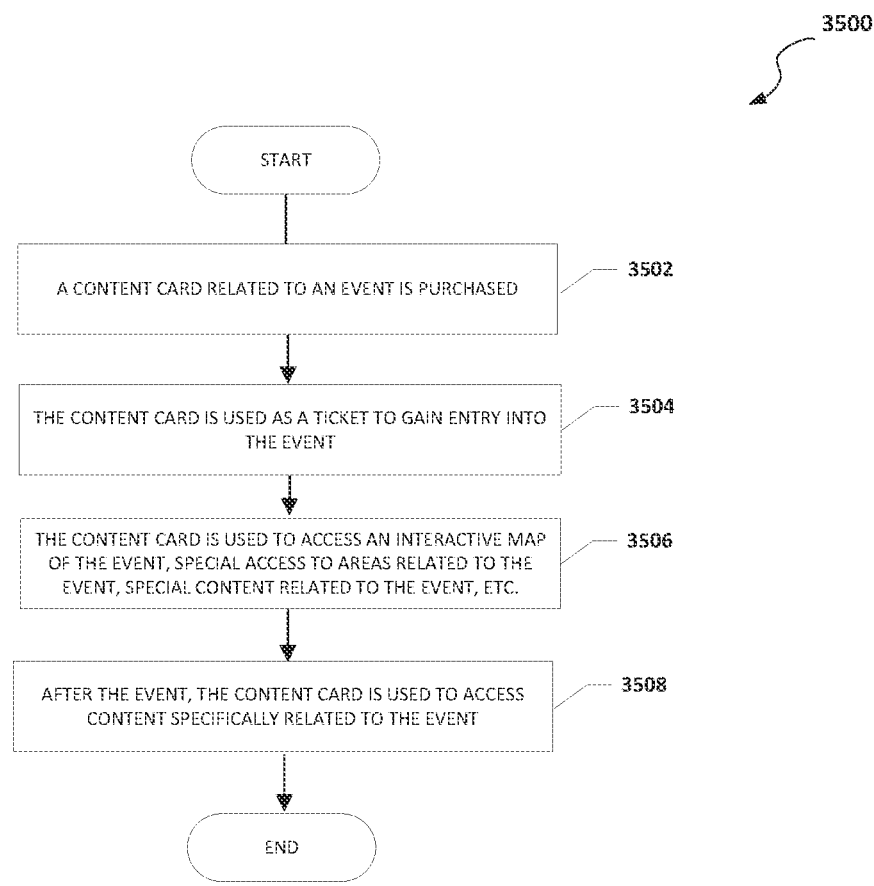
FIG. 35 is a simplified flowchart illustrating potential operations that may be associated with the system in accordance with an embodiment of the present disclosure.

Turning to FIG. 35, FIG. 35 is an example flowchart illustrating possible operations of a flow 3500 that may be associated with enabling the creation of, distribution of, and/or access to content, in accordance with an embodiment. In an embodiment, one or more operations of flow 3500 may be performed by the communication engine 124, the display engine 126, the content distribution card initialization engine 130, the content distribution card reader engine 134, the network content creation and distribution system 104 and the network marketplace engine 142. At 3502, a content distribution card related to an event is purchased. For example, the event may be a concert by a band or musician. At 3504, the content distribution card is used as a ticket to gain entry into the event. At 3506, the content distribution card is used to access an interactive map of the event, special access to areas associated with the event, special content related to the event, etc. For example, the content may be a map to the ticketed seats of the content consumer user for the event, a backstage pass for the event, special VIP content for the specific event, a summary and/or analysis (e.g., in real time or near real time) of the specific event, etc. At 3508, after the event, the content distribution card is used to access content specifically related to the event. For example, if the event was a concert, the content distribution card may be used to access a recording of the concert that was attended by the content consumer user.

To access the interactive map of the event, special access to areas associated with the event, special content related to the event, etc. and/or the content specifically related to the event, the content distribution card can be brought near an electronic device (e.g., a smart phone) associated with the content consumer user. When the content distribution card is brought near brought near the content consumer user's electronic device, a content distribution card reader engine can obtain the content identifier from the content distribution card. After the content distribution card reader engine has obtained the content identifier from the content distribution card, the content distribution card reader engine can obtain the content associated with the content identifier using a network content creation and distribution system (e.g., the network content creation and distribution system 104) as described above.

Figure 36:
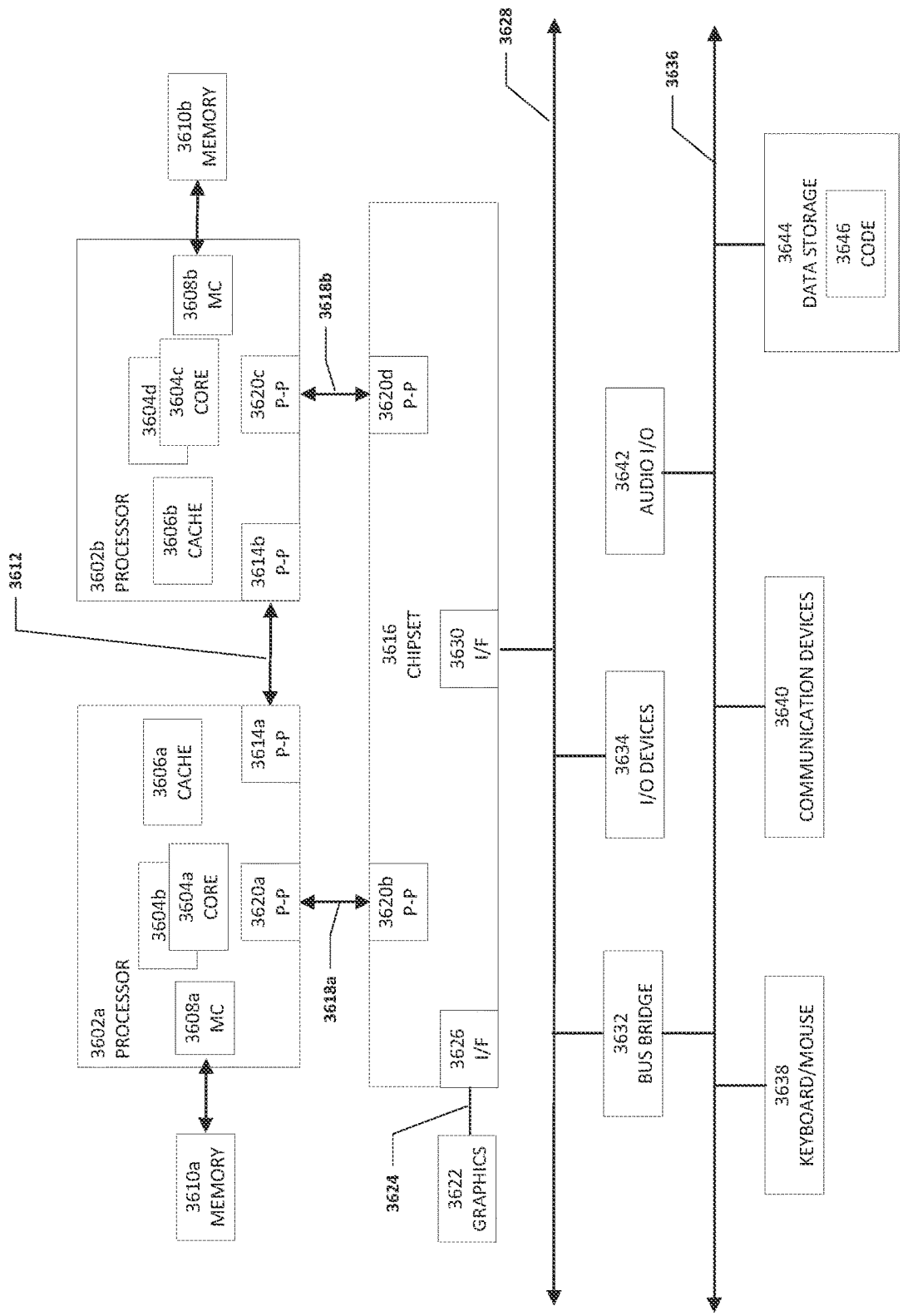
FIG. 36 is a block diagram illustrating an example computing system that is arranged in a point-to-point configuration in accordance with an embodiment.

Turning to FIG. 36, FIG. 36 illustrates a computing system 3600 that may be used by at least a portion of the system 100 and is arranged in a point-to-point (PtP) configuration according to an embodiment. In particular, FIG. 36 shows a system where processors, memory, and input/output devices are interconnected by a number of point-to-point interfaces. Generally, one or more of the network elements of the system 100 may be configured in the same or similar manner as computing system 3600.

As illustrated in FIG. 36, system 3600 may include several processors, of which only two, processors 3602a and 3602b, are shown for clarity. While two processors 3602a and 3602b are shown, it is to be understood that an embodiment of system 3600 may also include only one such processor. Processors 3602a and 3602b may each include a set of cores (i.e., processors cores 3604a and 3604b and processors cores 3604c and 3604d) to execute multiple threads of a program. The cores may be configured to execute instruction code in a manner similar to that discussed above with reference to FIGS. 1-8. Each processor 3602a and 3602b may include at least one shared cache 3606a and 3606b respectively. Shared caches 3606a and 3606b may each store data (e.g., instructions) that are utilized by one or more components of processors 3602a and 3602b, such as processor cores 3604a and 3604b of processor 3602a and processor cores 3604c and 3604d of processor 3602b.

Processors 3602a and 3602b may also each include integrated memory controller logic (MC) 3608a and 3608b respectively to communicate with memory elements 3610a and 3610b. Memory elements 3610a and/or 3610b may store various data used by processors 3602a and 3602b. In alternative embodiments, memory controller logic 3608a and 3608b may be discreet logic separate from processors 3602a and 3602b.

Processors 3602a and 3602b may be any type of processor and may exchange data via a point-to-point (PtP) interface 3612 using point-to-point interface circuits 3614a and 3614b respectively. Processors 3602a and 3602b may each exchange data with a chipset 3616 via individual point-to-point interfaces 3618a and 3618b using point-to-point interface circuits 3620a-3620d. Chipset 3616 may also exchange data with a high-performance graphics circuit 3622 via a high-performance graphics interface 3624, using an interface circuit 3626, which could be a PtP interface circuit. In alternative embodiments, any or all of the PtP links illustrated in FIG. 36 could be implemented as a multi-drop bus rather than a PtP link.

Chipset 3616 may be in communication with a bus 3628 via an interface circuit 3630. Bus 3628 may have one or more devices that communicate over it, such as a bus bridge 3632 and I/O devices 3634. Via a bus 3636, bus bridge 3632 may be in communication with other devices such as a keyboard/mouse 3638 (or other input devices such as a touch screen, trackball, etc.), communication devices 3640 (such as modems, network interface devices, or other types of communication devices that may communicate through a network), audio I/O devices 3642, and/or a data storage device 3644. Data storage device 3644 may store code 3646, which may be executed by processors 3602a and/or 3602b. In alternative embodiments, any portions of the bus architectures could be implemented with one or more PtP links.

The computer system depicted in FIG. 36 is a schematic illustration of an embodiment of a computing system that may be utilized to implement various embodiments discussed herein. It will be appreciated that various components of the system depicted in FIG. 36 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 37:
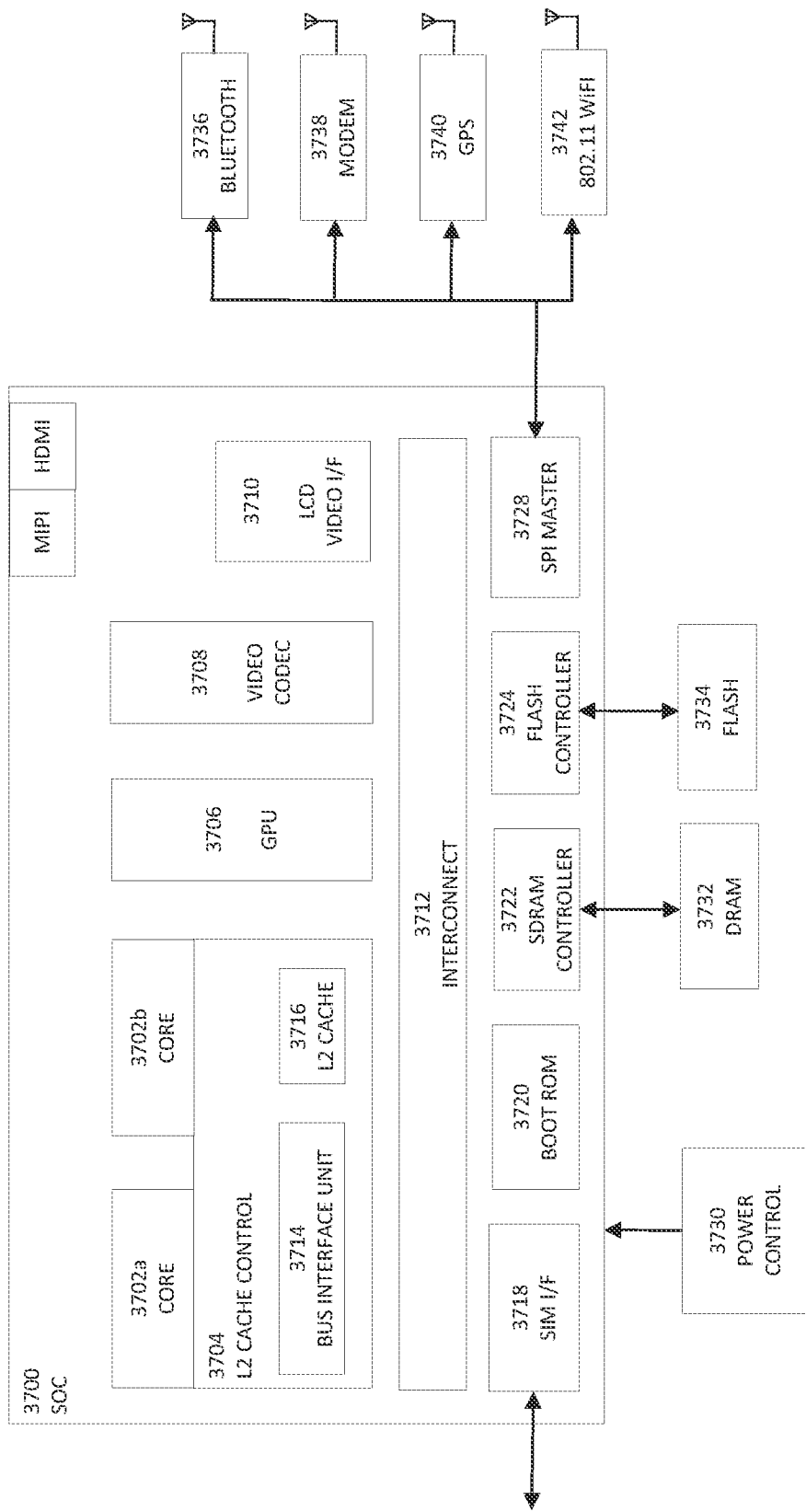
FIG. 37 is a simplified block diagram associated with an example ARM ecosystem system on chip (SOC) of the present disclosure.

Turning to FIG. 37, FIG. 37 is a simplified block diagram associated with an example ecosystem SOC 3700 that may be utilized by the system 100 to implement various embodiments of the present disclosure. At least one example implementation of the present disclosure can include the creation of, distribution of, and/or access to content features discussed herein and an ARM component. For example, the example of FIG. 37 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 37, ecosystem SOC 3700 may include multiple cores 3702a and 3702b, an L2 cache control 3704, a graphics processing unit (GPU) 3706, a video codec 3708, a liquid crystal display (LCD) I/F 3710 and an interconnect 3712. L2 cache control 3704 can include a bus interface unit 3714, a L2 cache 3716. Liquid crystal display (LCD) I/F 3710 may be associated with mobile industry processor interface (MIPI)/high-definition multimedia interface (HDMI) links that couple to an LCD.

Ecosystem SOC 3700 may also include a subscriber identity module (SIM) I/F 3718, a boot read-only memory (ROM) 3720, a synchronous dynamic random-access memory (SDRAM) controller 3722, a flash controller 3724, a serial peripheral interface (SPI) master 3728, a suitable power control 3730, a dynamic RAM (DRAM) 3732, and flash 3734. In addition, one or more embodiments include one or more communication capabilities, interfaces, and features such as instances of Bluetooth™ 3736, a 3G modem 3738, a global positioning system (GPS) 3740, and an 802.11 Wi-Fi 1042.

In operation, the example of FIG. 37 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 38:
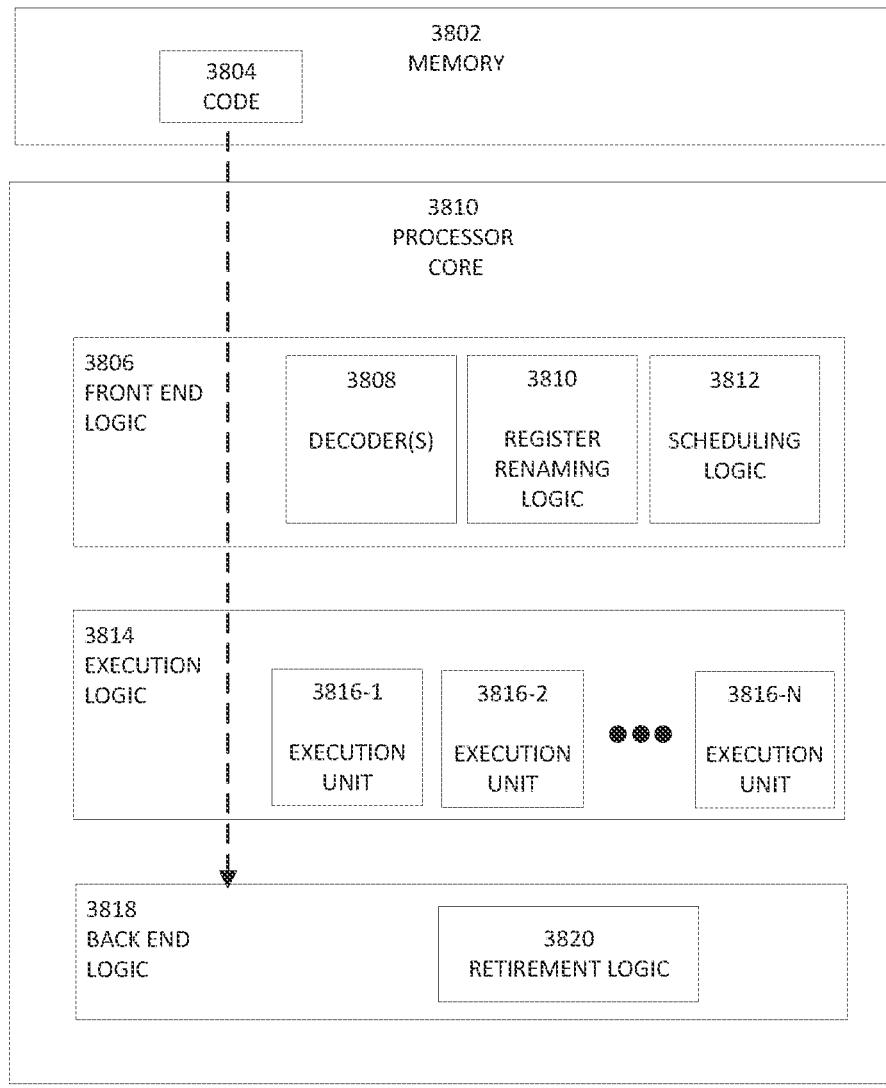
FIG. 38 is a block diagram illustrating an example processor core in accordance with an embodiment.

Turning to FIG. 38, FIG. 38 illustrates a processor core 3800 that may be part of the one or more processors 120 and/or the system 100 according to an embodiment. Processor core 3800 may be the core for any type of processor, such as a micro-processor, an embedded processor, a digital signal processor (DSP), a network processor, or other device to execute code. Although only one processor core 3800 is illustrated in FIG. 38, a processor may alternatively include more than one of the processor core 3800 illustrated in FIG. 38. For example, processor core 3800 represents one example embodiment of processors cores 3604a-3604d shown and described with reference to processors 3602a and 3602b of FIG. 38. Processor core 3800 may be a single-threaded core or, for at least one embodiment, processor core 3800 may be multithreaded in that it may include more than one hardware thread context (or "logical processor") per core.

FIG. 38 also illustrates a memory 3802 coupled to processor core 3800 in accordance with an embodiment. Memory 3802 may be any of a wide variety of memories (including various layers of memory hierarchy) as are known or otherwise available to those of skill in the art. Memory 3802 may include code 3804, which may be one or more instructions, to be executed by processor core 3800. Processor core 3800 can follow a program sequence of instructions indicated by code 3804. Each instruction enters a front-end logic 3806 and is processed by one or more decoders 3808. The decoder may generate, as its output, a micro-operation such as a fixed width micro-operation in a predefined format, or may generate other instructions, microinstructions, or control signals that reflect the original code instruction. Front-end logic 3806 also includes register renaming logic 3480 and scheduling logic 3462, which generally allocate resources and queue the operation corresponding to the instruction for execution.

Processor core 3800 can also include execution logic 3464 having a set of execution units 3486-1 through 3486-N. Some embodiments may include a number of execution units dedicated to specific functions or sets of functions. Other embodiments may include only one execution unit or one execution unit that can perform a particular function. Execution logic 3484 performs the operations specified by code instructions.

After completion of execution of the operations specified by the code instructions, back-end logic 3488 can retire the instructions of code 3804. In one embodiment, processor core 3800 allows out of order execution but requires in order retirement of instructions. Retirement logic 3820 may take a variety of known forms (e.g., re-order buffers or the like). In this manner, processor core 3800 is transformed during execution of code 3804, at least in terms of the output generated by the decoder, hardware registers and tables utilized by register renaming logic 3480, and any registers (not shown) modified by execution logic 3484.

Although not illustrated in FIG. 38, a processor may include other elements on a chip with processor core 3800, at least some of which were shown and described herein with reference to FIG. 38. For example, as shown in FIG. 38, a processor may include memory control logic along with processor core 3800. The processor may include I/O control logic and/or may include I/O control logic integrated with memory control logic.

It is important to note that the operations in the preceding flow diagram (i.e., FIGS. 29-35) illustrate only some of the possible correlating scenarios and patterns that may be executed by, or within, the system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, because the content identifier refers to a location of the content associated with the unique content identifier, the content stored at the location associated with the content identifier can be changed. For example, if the content is promotional facts, the promotional facts can be added, modified, or replaced without having to change the content identifier. This allows a content card with a content identifier to still be usable and deliver updated content to the content consumer user. More specifically, if the content distribution card is a promotional item (e.g., a coaster) for a restaurant and the content identifier is associated with a menu for the restaurant, the menu can be updated without having to change the content identifier in the content distribution card. Also, the content distribution card does not need to be a blank content distribution card and a content identifier in the content distribution card can be overwritten with a new content identifier. Moreover, certain components may be combined, separated, eliminated, or added based on particular needs and implementations. Additionally, although the system 100 has been illustrated with reference to particular elements and operations, these elements and operations may be replaced by any suitable architecture, protocols, and/or processes that achieve the intended functionality of the system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by at least one processor, cause the at least one processor to receive, from a content creator user device, content created by a content creator user and one or more rules associated with access to the content, create a content identifier for the content, communicate a hash of the content identifier to the content creator user device, where the content creator user device writes the hash of the content identifier to a content distribution card using near field communication, receive, from a content consumer user device, the hash of the content identifier, determine the content associated with the content identifier, apply the one or more rules associated with access to the content, and if the one or more rules allow, communicate the content to the content consumer user device.

In Example C2, the subject matter of Example C1 can optionally include where the content distribution card is a promotional card for a musician and the content is a sample of work by the musician.

In Example C3, the subject matter of any one of Examples C1-C2 can optionally include where one of the one or more rules is to download the content to the consumer user device if a content consumer application is installed on the content consumer user device and to stream the content to the content consumer user device if the content consumer application is not installed on the content consumer user device.

In Example C4, the subject matter of any one of Examples C1-C3 can optionally include where the content consumer user device is a smartphone.

In Example C5, the subject matter of any one of Examples C1-C4 can optionally include one or more instructions that, when executed by the at least one processor, causes the at least one processor to determine a number of times the content associated with the content identifier has been communicated to a unique content consumer user device.

In Example C6, the subject matter of any one of Examples C1-C5 can optionally include one or more instructions that, when executed by the at least one processor, causes the at least one processor to determine a number of times the content associated with the content identifier has been purchased.

Example M1 is a method including receiving, from a content creator user device, content created by a content creator user and one or more rules associated with access to the content, creating a content identifier for the content, writing, using the content creator user device, the content identifier to a content distribution card using near field communication, receiving, from a content consumer user device, the content identifier, determining the content associated with the content identifier, applying the one or more rules associated with access to the content, and if the one or more rules allow, communicating the content to the content consumer user device.

In Example M2, the subject matter of Example M1 can optionally include where the content creator user device created the content identifier for the content.

In Example M3, the subject matter of any one of the Examples M1-M2 can optionally include creating a hash of the content identifier, where the content creator user device writes the hash of the content identifier to a content distribution card using near field communication.

In Example M4, the subject matter of any one of the Examples M1-M3 can optionally include where the content is musical content.

In Example M5, the subject matter of any one of the Examples M1-M4 can optionally include where the content distribution card is a promotional card for a musician and the content is a sample of work by the musician.

In Example M6, the subject matter of any one of Examples M1-M5 can optionally include where one of the one or more rules is to download the content to the consumer user device if a content consumer application is installed on the content consumer user device and to stream the content to the content consumer user device if the content consumer application is not installed on the content consumer user device.

In Example M7, the subject matter of any one of Examples M1-M6 can optionally include where received content is streamed to the content consumer user device and opened in browser the content consumer user device.

In Example M8, the subject matter of any one of Examples M1-M7 can optionally include where the content is opened in a content consumer application installed on the content consumer user device and stored in memory of the content consumer user device.

In Example M9, the subject matter of any one of Examples M1-M8 can optionally include where the received content is a free sample of the content and rules associated with the free sample of the content limit a number of times the content can be accessed.

Example S1 is a system to help enable creation of, distribution of, and/or access to content, the system including a content creator user device including memory to store content, a communication engine to communicate the content and one or more rules associated with access to the content to a network content creation and distribution system, and a content distribution card setup engine to write a content identifier associated with the content to a content distribution card. The system also including a network content creation and distribution system, where the network content creation and distribution system receives, from the content creator user device, the content created by a content creator user and the one or more rules associated with access to the content, stores the content and the one or more rules associated with access to the content in memory, and associates the content and the one or more rules with the content identifier.

In Example S2, the subject matter of Example S1 can optionally include where at least one of the one or more rules is a limited number of times the content can be accessed or a limited amount of time the content can be accessed.

In Example S3, the subject matter of any one of the Examples S1-S2 can optionally include where the content is musical content.

In Example S4, the subject matter of any one of the Examples S1-S3 can optionally include where the content distribution card is a promotional card for a musician and the content is a sample of work by the musician.

In Example S5, the subject matter of any one of the Examples S1-S4 can optionally include where the network content creation and distribution system to creates the content identifier and sends the content identifier to the content creator user device.

Example A1 is an apparatus including means for receiving, from a content creator user device, content created by a content creator user and one or more rules associated with access to the content, creating a content identifier for the content, writing, using the content creator user device, the content identifier to a content distribution card using near field communication, receiving, from a content consumer user device, the content identifier, determining the content associated with the content identifier, applying the one or more rules associated with access to the content, and if the one or more rules allow, communicating the content to the content consumer user device.

In Example A2, the subject matter of Example A1 can optionally include where the content creator user device created the content identifier for the content.

In Example A3, the subject matter of any one of Examples A1-A2 can optionally include means for creating a hash of the content identifier, where the content creator user device writes the hash of the content identifier to a content distribution card using near field communication.

In Example A4, the subject matter of any one of Examples A1-A3 can optionally include where the content is musical content.

In Example A5, the subject matter of any one of Examples A1-A4 can optionally include where the content distribution card is a promotional card for a musician and the content is a sample of work by the musician.

In Example A6, the subject matter of any one of Examples A1-A5 can optionally include where one of the one or more rules is to download the content to the consumer user device if a content consumer application is installed on the content consumer user device and to stream the content to the content consumer user device if the content consumer application is not installed on the content consumer user device.

In Example A7, the subject matter of any one of Examples A1-A6 can optionally include where received content is streamed to the content consumer user device and opened in browser the content consumer user device.

In Example A8, the subject matter of any one of Examples A1-A9 can optionally include where the content is opened in a content consumer application installed on the content consumer user device and stored in memory of the content consumer user device.

In Example A9, the subject matter of any one of Examples A1-A8 can optionally include where the received content is a free sample of the content and rules associated with the free sample of the content limit a number of times the content can be accessed.

Example X1 is a machine-readable storage medium including machine-readable instructions to implement a method or realize an apparatus as in any one of the Examples C1-C6, M1-M9, or A1-A9. Example Y1 is an apparatus comprising means for performing any of the Example methods M1-M9. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A network content creation and distribution system comprising at least one non-transitory machine readable medium including one or more instructions that, when executed by at least one processor, causes the at least one processor to:
   receive, from a content creator user device, content from a content creator user and a creator identifier that identifies the content creator user;
   create a content identifier for the content, wherein the content identifier is linked to the creator identifier;
   receive, from the content creator user device, one or more rules associated with access to the content;
   link the one or more rules to the content identifier;
   store the content identifier, the creator identifier that identifies the content creator user, and the one or more rules associated with access to the content in a content distribution database, wherein the content distribution database also includes an access count identifier that represents how many times the content has been accessed and a licensed user count that represents a number of users that have purchased a license to access the content;
   communicate a hash of the content identifier to the content creator user device, wherein the content creator user device writes the hash of the content identifier to a tangible content distribution card using near field communication;
   communicate, to a content consumer user device from the tangible content distribution card, the hash of the content identifier using near field communication;
   receive, from the content consumer user device, the hash of the content identifier;
   determine the content associated with the content identifier;
   apply the one or more rules associated with access to the content;
   determine whether a content related application is installed on the consumer user device;
   if the content related application is installed on the content consumer user device, receive a content consumer identifier associated with the content related application, launch the content related application if the content related application is not already opened, communicate the content to the content consumer through the content related application, and increase the access count identifier; and
   if the content related application is not installed on the content consumer user device, launch a web browser on the content consumer user device, stream the content to the content consumer though the web browser, and increase the access count identifier.

2. The network content creation and distribution system of claim 1, wherein the content distribution card is a promotional card for a musician and the content is a sample of work by the musician.

3. The network content creation and distribution system of claim 1, wherein the content consumer user device is a smartphone.

4. The network content creation and distribution system of claim 1, further comprising one or more instructions that, when executed by the at least one processor, causes the at least one processor to:
   determine a number of times the content associated with the content identifier has been communicated to a unique content consumer user device.

5. The network content creation and distribution system of claim 4, further comprising one or more instructions that, when executed by the at least one processor, causes the at least one processor to:
   determine a number of times the content associated with the content identifier has been purchased.

6. The network content creation and distribution system of claim 1, wherein the content consumer identifier is associated with the content identifier and stored in the content distribution database.

7. A method, comprising:
   receiving, from a content creator user device, content from a content creator user and a creator identifier that identifies the content creator user;
   creating a content identifier for the content, wherein the content identifier is linked to the creator identifier that identifies the content creator user;
   receiving, from the content creator user device, one or more rules associated with access to the content;
   linking the one or more rules to the content identifier;
   storing the content identifier, the creator identifier that identifies the content creator user, and the one or more rules associated with access to the content in a content distribution database, wherein the content distribution database also includes an access count identifier that represents how many times the content has been accessed and a licensed user count that represents a number of users that have purchased a license to access the content;
   writing, using the content creator user device, the content identifier to a content distribution card using near field communication;
   communicating, to a content consumer user device from the content distribution card, the content identifier using near field communication;
   receiving, from the content consumer user device, the content identifier and, if a content related application is installed on the content consumer user device, a content consumer identifier associated with the content related application;
   determining the content associated with the content identifier;
   applying the one or more rules associated with access to the content; and
   determining whether a content related application is installed on the consumer user device;
   if the content related application is installed on the content consumer user device, receiving a content consumer identifier associated with the content related application, launch ing the content related application if the content related application is not already opened, communicating the content to the content consumer through the content related application, and increasing the access count identifier; and
   if the content related application is not installed on the content consumer user device, launching a web browser on the content consumer user device, streaming the content to the content consumer though the web browser, and increasing the access count identifier.

8. The method of claim 7, wherein the content creator user device created the content identifier for the content.

9. The method of claim 7, further comprising:
creating a hash of the content identifier, wherein the content creator user device writes the hash of the content identifier to a content distribution card using near field communication.

10. The method of claim 7, wherein the content is musical content.

11. The method of claim 7, wherein the content distribution card is a promotional card for a musician and the content is a sample of work by the musician.

12. The method of claim 7, wherein the content is streamed to the content consumer user device and opened in a browser of the content consumer user device.

13. The method of claim 7, wherein the content is opened in the content consumer related application installed on the content consumer user device after the content is downloaded to and stored in memory of the content consumer user device.

14. The method of claim 7, wherein the content communicated to the content consumer user device is a free sample of the content and rules associated with the free sample of the content limit a number of times the content can be accessed.

15. The method of claim 7, wherein the content consumer identifier is associated with the content identifier and stored in the content distribution database.

16. A system to help enable creation of, distribution of, and/or access to content, the system comprising:
a content creator user device including:
memory to store content created by a content creator user and a creator identifier that identifies the content creator user;
a communication engine to communicate the content, the creator identifier that identifies the content creator user, and one or more rules associated with access to the content to a network content creation and distribution system; and
a content distribution card setup engine to write a content identifier associated with the content to a content distribution card;
the content distribution card, wherein the content distribution card communicates the content identifier to a content consumer user device using near field communication; and
the network content creation and distribution system, wherein the network content creation and distribution system includes a content distribution database, wherein the network content creation and distribution system:
receives, from the content creator user device, the content, the creator identifier that identifies the content creator user, and the one or more rules associated with access to the content,
links the content identifier to the content, the creator identifier that identifies the content creator user, and the one or more rules associated with access to the content,
stores the contentidentifier, the creator identifier, and the one or more rules associated with access to the content in the content distribution database, wherein the content distribution database also includes an access count identifier that represents how many times the content has been accessed and a licensed user count that represents a number of users that have purchased a license to access the content; and
receives, from the content consumer user device, the content identifier;
determines whether a content related application is installed on the consumer user device;
if the content related application is installed on the content consumer user device, receive a content consumer identifier associated with the content related application, launch the content related application, communicate the content to the content consumer through the content related application, and increase the access count identifier; and
if the content related application is not installed on the content consumer user device, launch a web browser on the content consumer user device, stream the content to the content consumer though the web browser, and increase the access count identifier.

17. The system of claim 16, wherein at least one of the one or more rules is a limited number of times the content can be accessed or a limited amount of time the content can be accessed.

18. The system of claim 16, wherein the content distribution card is a promotional card for a musician and the content is a sample of work by the musician.

19. The system of claim 16, wherein the network content creation and distribution system sends the content identifier to the content creator user device.

20. The network content creation and distribution system of claim 1, wherein the content distribution database includes a plurality of unique content identifiers linked to the content creator user, wherein each of the plurality of unique content identifiers identify a specific unique content from the content creator user.

* * * * *